(12) United States Patent
Wakai

(10) Patent No.: US 9,551,566 B2
(45) Date of Patent: Jan. 24, 2017

(54) COORDINATE MEASURING DEVICE

(71) Applicant: Keyence Corporation, Osaka (JP)

(72) Inventor: Tatsuro Wakai, Osaka (JP)

(73) Assignee: Keyence Corporation, Osaka (JP)

( * ) Notice: Subject to any disclaimer, the term of this patent is extended or adjusted under 35 U.S.C. 154(b) by 99 days.

(21) Appl. No.: 14/698,871

(22) Filed: Apr. 29, 2015

(65) Prior Publication Data

US 2015/0345932 A1 Dec. 3, 2015

(30) Foreign Application Priority Data

May 30, 2014 (JP) .................................. 2014-112969

(51) Int. Cl.
| | | |
|---|---|---|
| *G01B 11/03* | (2006.01) | |
| *G01B 21/04* | (2006.01) | |
| *G01B 11/00* | (2006.01) | |

(52) U.S. Cl.
CPC ........... *G01B 11/007* (2013.01); *G01B 21/047* (2013.01)

(58) Field of Classification Search
None
See application file for complete search history.

(56) References Cited

U.S. PATENT DOCUMENTS

| | | | |
|---|---|---|---|
| 5,440,392 A | 8/1995 | Pettersen et al. | |
| 5,805,287 A | 9/1998 | Pettersen et al. | |
| 5,831,735 A * | 11/1998 | Corby, Jr. ............ | G01B 11/007 250/559.29 |
| 5,973,788 A | 10/1999 | Pettersen et al. | |
| 6,166,809 A | 12/2000 | Pettersen et al. | |
| 6,288,785 B1 * | 9/2001 | Frantz ...................... | A61B 5/06 250/559.29 |
| 6,389,158 B1 | 5/2002 | Pettersen et al. | |
| 7,307,737 B1 * | 12/2007 | Kling, III ............... | G01B 11/16 356/614 |
| 7,557,936 B2 * | 7/2009 | Dickinson ............ | G01B 11/005 356/620 |
| 7,908,757 B2 * | 3/2011 | Ferrari ................... | G01B 5/012 33/503 |
| 8,581,996 B2 * | 11/2013 | Inomata ............... | G02B 21/367 348/207.11 |
| 8,832,954 B2 * | 9/2014 | Atwell ................. | G01B 11/005 33/503 |
| 8,874,406 B2 | 10/2014 | Rotvold et al. | |

(Continued)

*Primary Examiner* — Christopher Fulton
(74) *Attorney, Agent, or Firm* — Kilyk & Bowersox, P.L.L.C.

(57) ABSTRACT

Provided is a coordinate measuring device which can easily perform accurate measurement. A coordinate measuring device is provided with a sub-imaging unit, a display unit, and a probe. The probe includes a stylus. The stylus has a contact part that is brought into contact with a measurement target in order to measure the measurement target. The sub-imaging unit is provided in the probe so as to have constant positional relationships, and captures an image of at least part of the measurement target. The image of the measurement target obtained by the sub-imaging unit is displayed as a captured image on the display unit. Based on calculated positions of the probe and the positional relationships of the sub-imaging unit, an image showing a measurement position on the measurement target, with which the contact part is to be brought into contact, is displayed on the captured image.

13 Claims, 45 Drawing Sheets

(56) References Cited

U.S. PATENT DOCUMENTS

| | | | |
|---|---|---|---|
| 9,354,042 B2 * | 5/2016 | Tsujii | G01B 11/002 |
| 2007/0086620 A1 * | 4/2007 | Arai | G01B 5/008 |
| | | | 382/100 |
| 2013/0222816 A1 * | 8/2013 | Briggs | G01B 11/005 |
| | | | 356/614 |
| 2014/0043622 A1 * | 2/2014 | Vandenhoudt | G01S 3/78 |
| | | | 356/614 |
| 2015/0276389 A1 * | 10/2015 | Osaki | G01B 9/00 |
| | | | 348/136 |
| 2015/0300808 A1 * | 10/2015 | Osaki | G01B 11/005 |
| | | | 33/504 |

* cited by examiner

RE-MEASUREMENT DIALOG

PROBE WARNING DIALOG

COORDINATE MEASURING DEVICE

CROSS-REFERENCE TO RELATED APPLICATIONS

The present application claims foreign priority based on Japanese Patent Application No. 2014-112969, filed May 30, 2014, the contents of which is incorporated herein by reference.

BACKGROUND OF THE INVENTION

1. Field of the Invention

The present invention relates to a contact-type coordinate measuring device.

2. Description of Related Art

A contact-type coordinate measuring device is provided with a probe having a contact part. The contact part of the probe is brought into contact with a measurement target, and a contact position between the measurement target and the contact part is calculated. By calculating a plurality of positions on the measurement target, a size of a desired portion of the measurement target is measured.

JP 06-511555 A describes a system for point by point measurement of spatial coordinates, which includes a data processor, a contact probe, and an angle sensor. The contact probe is provided with a plurality of point light sources in addition to a contact point. The angle sensor is provided so as to allow observation of an essential portion of a measurement target and allow observation of the plurality of point light sources of the contact probe.

A spatial direction from the angle sensor toward each light source is recorded. Based on the recorded spatial direction, a position and an orientation of the contact probe with respect to the angle sensor are calculated by a data processor. The position of the contact probe and a position of the contact point are associated with a position of the measurement target.

By use of the system for point by point measurement in JP 06-511555 A, it is possible to measure a size of a previously set measurement target portion with respect to each of a plurality of measurement targets. This allows quality control of the plurality of measurement targets.

However, in the case of an unskilled measurement operator measuring a plurality of measurement targets, it is difficult to eliminate variation in actually measured place with respect to the plurality of measurement targets.

Further, when the measurement target portion is hardly recognized in an external appearance of the measurement target, it is difficult even for a skilled measurement operator to perform an accurate operation. As described above, in shape measurement for the measurement target, the accurate operation is difficult while skill is required.

SUMMARY OF THE INVENTION

An object of the present invention is to provide a coordinate measuring device which can easily perform accurate measurement.

(1) A coordinate measuring device according to the present invention includes: a probe that has a contact part which is brought into contact with a measurement target in order to measure a physical quantity of the measurement target; a first imaging unit that captures an image of at least part of the measurement target; a position and attitude acquiring unit that acquires a position and an attitude of the probe and a position and an attitude of the first imaging unit; a display unit that displays, as a captured image, the image of at least part of the measurement target obtained by the first imaging unit; and a control unit that controls the display unit to display, on the captured image, a first indicator showing a measurement position on the measurement target, with which the contact part is to be brought into contact, based on the position and the attitude of the probe and the position and the attitude of the first imaging unit obtained by the position and attitude acquiring unit.

In the coordinate measuring device, the position and the attitude of the probe and the position and the attitude of the first imaging unit are acquired by the position and attitude acquiring unit. An image of at least part of the measurement target is captured by the first imaging unit. The image of at least part of the measurement target obtained by the first imaging unit is displayed as a captured image on the display unit. Based on the acquired position and attitude of the probe and the acquired position and attitude of the first imaging unit, the first indicator showing a measurement position on the measurement target, with which the contact part is to be brought into contact, is displayed on the captured image.

Accordingly, the user views the first indicator on the captured image, and can thereby accurately recognize the measurement position on the measurement target. As a result, accurate measurement on the measurement target can be easily performed.

(2) The control unit may be configured to be operable in a setting mode and a measurement mode, the setting mode for generating setting information that includes a measurement condition and a measurement procedure for measuring a physical quantity of the measurement target, the measurement mode for measuring the physical quantity of the measurement target, and the first indicator may be displayed on the captured image in the measurement mode based on the setting information generated by the setting mode.

In this case, a manager who manages a measurement operation on the measurement target can set the measurement condition and the measurement procedure for the measurement target by the setting mode. In the measurement mode, the first indicator is displayed based on the set measurement condition and measurement procedure. Accordingly, an operator who performs the measurement operation on the measurement target views the first indicator, and can thereby measure a physical quantity of the measurement target by means of an accurate measurement condition and measurement procedure.

(3) The coordinate measuring device may further include a storage unit, wherein the control unit may store the setting information generated by the setting mode into the storage unit, and read the setting information stored in the storage unit in the measurement mode, and the first indicator may be displayed on the captured image based on the setting information read in the measurement mode.

In this case, setting information generated by the setting mode is stored into the storage unit. In the measurement mode, the setting information stored in the storage unit is read. The first indicator is displayed based on the read setting information. In such a manner, it is possible to measure the physical quantity of the measurement target by use of the setting information stored in the storage unit. Therefore, in the case of measuring the same physical quantity with respect to the same measurement target, it is not required to repeatedly create the setting information.

(4) The coordinate measuring device may further include an interface part in which the setting information is inputted into and outputted from the storage unit.

In this case, the setting information generated by the control unit can be outputted to the outside. Further, setting information generated outside can be inputted into the storage unit. Hence, it is possible to use common setting information among a plurality of coordinate measuring devices.

(5) The setting information may include captured image data generated by capturing an image of at least part of the measurement target which includes a measurement position by the first imaging unit in the setting mode, and the control unit may have the captured image displayed on the display unit based on the captured image data in the measurement mode.

According to the above configuration, the manager who manages a measurement operation on the measurement target can capture an image of the measurement target such that a captured image including an appropriate portion for showing the measurement position is displayed in the setting mode. Accordingly, the operator who performs the measurement operation on the measurement target views the captured image and the first indicator in the measurement mode, and can thereby easily and accurately recognize the measurement position with which the contact part is to be brought into contact.

(6) In the measurement mode, the control unit may control the display unit so as to display a second indicator showing a progress level of measurement of the physical quantity of the measurement target based on the measurement procedure for the setting information.

The operator who performs the measurement operation on the measurement target views the second indicator, and can thereby easily recognize the progress level of the measurement operation.

(7) The control unit may be configured to be operable in a single item measurement mode for measuring the physical quantity of the measurement target without using the setting information in a state where the first indicator is not displayed on the captured image.

In the single item measurement mode, the physical quantity of the measurement target is measured without using the setting information in the state where the first indicator is not displayed on the captured image. Accordingly, since the operation for creating setting information is not required, it is possible to measure a desired physical quantity in a short period of time.

(8) The storage unit may store a result of the measurement by the measurement mode, and the control unit may be configured to be operable in a statistical analysis mode for performing a statistical analysis process based on the measurement result stored in the storage unit.

In the statistical analysis mode, the statistical analysis process for the measurement result is performed. This leads to improvement in convenience of the coordinate measuring device.

(9) The position and attitude acquiring unit may calculate coordinates of a contact position between the measurement target and the contact part based on the acquired position and attitude of the probe, to measure the physical quantity of the measurement target based on a result of the calculation, and the control unit may set a reference coordinate system in which an arbitrary portion of the measurement target is taken as a reference by measurement of a previously set specific physical quantity of the measurement target, and control the position and attitude acquiring unit to measure the physical quantity of the measurement target in the set reference coordinate system.

In this case, by measurement of the specific physical quantity of the measurement target, the coordinate system which takes an arbitrary portion of the measurement target as a reference is set as the reference coordinate system. Accordingly, the coordinates of the contact position between the measurement target and the contact part are calculated in the set reference coordinate system, and the physical quantity of the measurement target is calculated. As a result, it is possible to acquire the coordinates of the contact position between the measurement target and the contact part in the reference coordinate system, and also possible to perform accurate measurement on the measurement target regardless of a position and an attitude of the measurement target.

(10) The setting information may include a measurement condition and a measurement procedure for measuring the specific physical quantity, and the first indicator may be displayed on the captured image such that the specific physical quantity is measured in the measurement mode.

In this case, the measurement condition and the measurement procedure for measuring the specific physical quantity in the setting mode are generated as the setting information, and hence the first indicator is displayed on the captured image such that the specific physical quantity is measured in the measurement mode. The operator who performs the measurement operation on the measurement target views the first indicator, and can thereby measure the specific physical quantity of the measurement target in an accurate measurement condition and measurement procedure. Hence, it is possible to accurately set the reference coordinate system with respect to each measurement target.

(11) The coordinate measuring device may include an acquirement possible region in which the position and the attitude of the probe and the position and the attitude of the first imaging unit can be acquired by the position and attitude acquiring unit, and the control unit may control the display unit to display a virtual image virtually representing the acquirement possible region viewed from an arbitrary position, and display on the virtual image at least one of the first indicator and a third indicator showing a position of the contact part.

In this case, by the first indicator being displayed on the virtual image, the user can easily recognize the coordinates of the measurement position in the reference coordinate system. Further, by the third indicator being displayed on the virtual image, the user can easily recognize the position of the contact part in the acquirement possible region.

(12) The coordinate measuring device may further include an operation unit that is operated for changing a viewpoint position for viewing the acquirement possible region, and when an operation for changing the viewpoint position is performed by the operation unit in a state where the captured image is displayed on the screen of the display unit, the control unit may control the display unit to display a virtual image at the time of viewing the acquirement possible region from an imaging position of the first imaging unit for obtaining the captured image in place of the captured image, and thereafter successively change the virtual image such that a position for viewing the acquirement possible region moves from the imaging position to the changed viewpoint position.

In this case, the user can change the viewpoint position by means of the operation unit. When the operation for changing the viewpoint position is performed in the state where the captured image is displayed on the display unit, the virtual image at the time of viewing the acquirement possible region from the imaging position of the first imaging unit for obtaining the captured image is displayed in place of the captured image. Subsequently, the virtual image is successively changed such that the position for viewing the acquirement possible region from the imaging position to the designated viewpoint position.

According to the above configuration, when the image displayed on the screen of the display unit is switched from the captured image to the virtual image, the viewpoint position for viewing the acquirement possible region remains unchanged between the captured image and the virtual image. This allows the user to smoothly perform the operation for changing the viewpoint position while accurately recognizing the viewpoint position.

(13) The probe may have a plurality of markers, the first imaging unit may be provided in the probe to have constant positional relationships with respect to the plurality of markers, the position and attitude acquiring unit may include a second imaging unit that is fixed to a previously set imaging position and captures images of the plurality of markers of the probe, and a calculation unit that respectively calculates positions of the plurality of markers based on image data showing the images of the plurality of markers obtained by the second imaging unit, and the control unit may control the display unit to display the first indicator on the captured image based on the positions of the plurality of markers calculated by the calculation unit and the positional relationships of the first imaging unit with respect to the plurality of markers.

In the above configuration, images of the plurality of markers of the probe are captured by the second imaging unit. The positions of the plurality of markers are respectively calculated based on the image data showing the images of the plurality of markers obtained by the second imaging unit. In this case, the calculated positions of the plurality of markers and the positional relationships of the first imaging unit with respect to the plurality of markers are used as information showing the position and the attitude of the probe and the position and the attitude of the first imaging unit. The first indicator is displayed based on the calculated positions of the plurality of markers and the positional relationships of the first imaging unit with respect to the plurality of markers. Therefore, in accordance with the first indicator, the measurement position on the measurement target can be accurately shown on the captured image.

According to the present invention, it is possible to easily and promptly perform accurate measurement.

BRIEF DESCRIPTION OF THE DRAWINGS

DETAILED DESCRIPTION OF PREFERRED EMBODIMENTS (1) Configuration of Coordinate Measuring Device FIG. 2 is a perspective view showing a configuration of a measurement head of a coordinate measuring device 300 of FIG. 1. FIG. 3 is a perspective view showing a configuration of a probe of a measurement head 100 of FIG. 2. FIG. 4A is a side view showing a configuration of a stylus provided in the probe 140 of FIG. 3, and FIG. 4B is a view for describing an attachment structure of the stylus in the probe 140 of FIG. 3. Hereinafter, the coordinate measuring device 300 according to the present embodiment will be described with reference to FIGS. 1 to 4. As shown in FIG. 1, the coordinate measuring device 300 is provided with the measurement head 100 and a processing device 200. The measurement head 100 includes a holding part 110, a placement table 120, a main imaging unit 130, a probe 140, a sub-imaging unit 150, a display unit 160, an operation unit 170, and a control board 180.

As shown in FIG. 2, the holding part 110 of the measurement head 100 includes an installation part 111 and a stand part 112. The installation part 111 has a horizontal flat shape and is installed on the installation surface. The stand part 112 is provided so as to extend upward from one end of the installation part 111.

The placement table 120 is provided at the other end of the installation part 111. The placement table 120 is an optical surface plate, for example. A measurement target S is placed on the placement table 120. In this example, the placement table 120 has a substantially square shape. On the placement table 120, a plurality of screw holes are formed so as to be arrayed at regular intervals in two directions orthogonal to each other. Hence, it is possible to fix the measurement target S to the placement table 120 by means of a clamp member and fixing screws. The placement table 120 may have magnetism. In this case, it is possible to fix the measurement target S to the placement table 120 by means of a fixing member using a magnet such as a magnet base. Further, the upper surface of the placement table 120 may have adhesiveness. Also in this case, the measurement target S can be easily fixed to the placement table 120.

Figure 2:
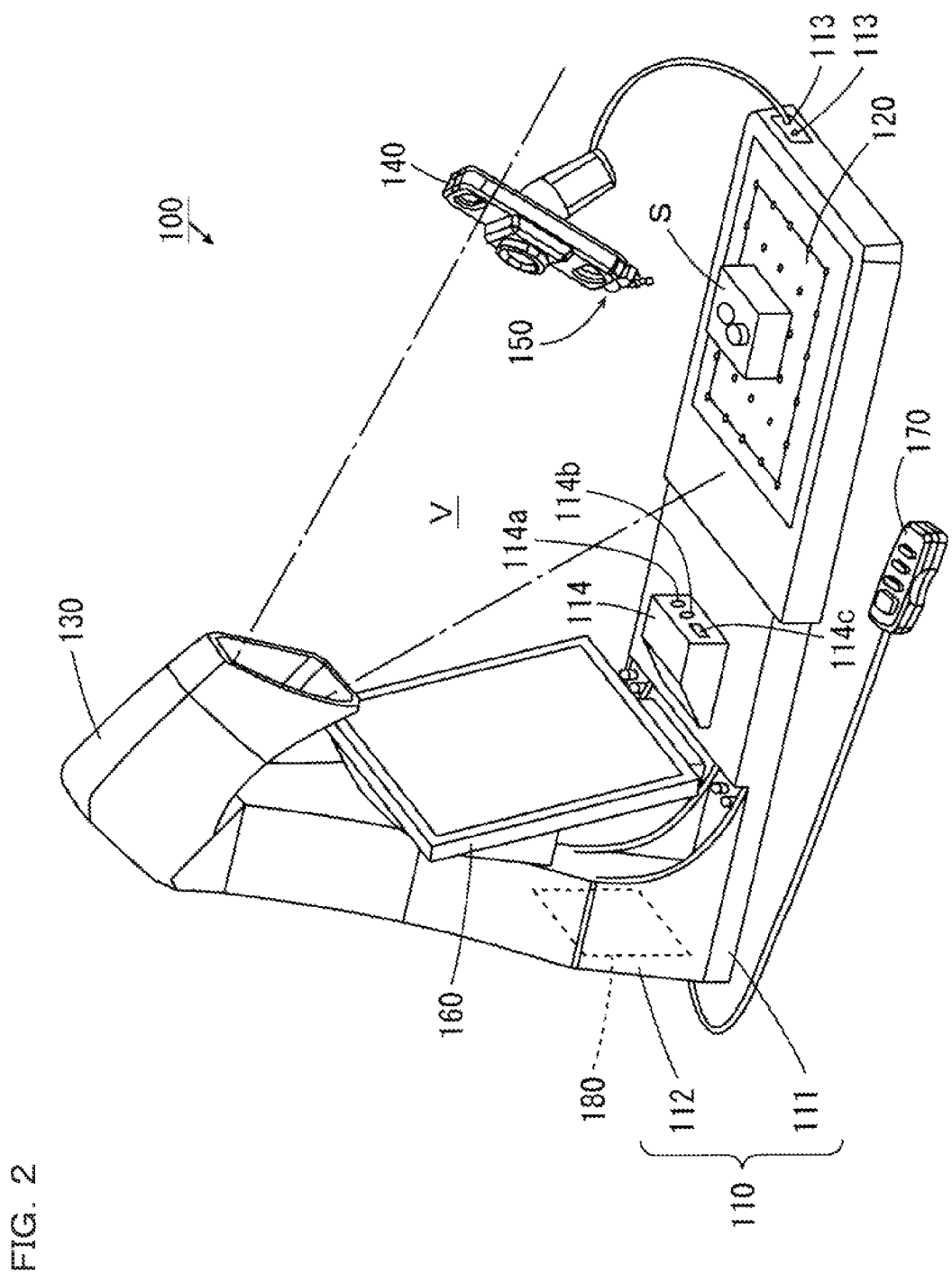
FIG. 2 is a perspective view showing a configuration of a measurement head of the coordinate measuring device of FIG. 1.

One or a plurality of connection terminals 113 are provided on an end surface on the placement table 120 side of the installation part 111. In the example of FIG. 2, two connection terminals 113 are provided. One connection terminal 113 and the probe 140 are connected through a cable. Further, each connection terminal 113 is electrically connected to the control board 180.

In portions of the installation part 111 between the stand part 112 and the placement table 120, an interface part 114 is formed so as to project upward. The interface part 114 is electrically connected to the control board 180. The interface part 114 is provided with a power switch 114a, an operation display lamp 114b, and a USB (universal serial bus) port 114c.

When a switch, not shown, of the processing device 200 is in the on-state, the user brings the power switch 114a into the on-state, to thereby start an operation of the measurement head 100. The operation display lamp 114b is configured by an LED (light-emitting diode), for example. The operation display lamp 114b is turned on when the power switch 114a is in the on-state, and turned off when the power switch 114a is in the off-state. Accordingly, the user can recognize whether or not the measurement head 100 is in operation by viewing the operation display lamp 114b. The user connects, for example, a USB memory to the USB port 114c, to thereby store information, which is stored in a storage unit 210 described later, into the USB memory. Further, information stored in the USB memory can be stored into the storage unit 210.

Figure 5A:
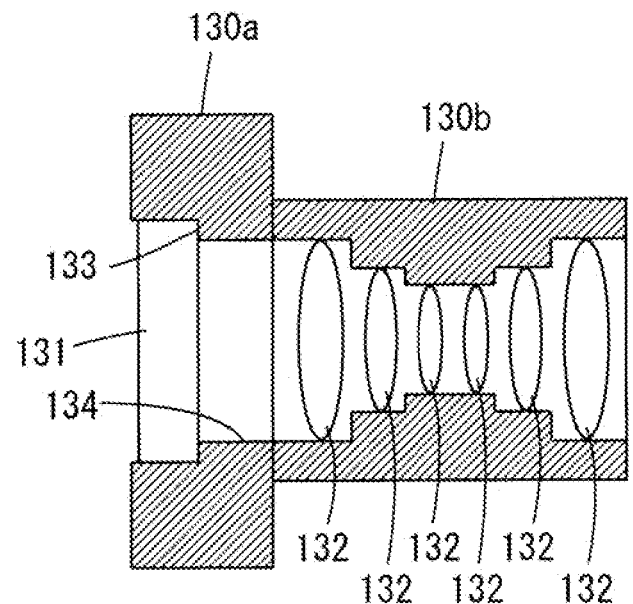
FIGS. 5A and 5B are views for describing a configuration of a main imaging unit.

The main imaging unit 130 is provided on an upper part of the stand part 112. The main imaging unit 130 may be detachably provided on the upper part of the stand part 112, or may be provided integrally with the stand part 112. The main imaging unit 130 includes an imaging element 131 (FIGS. 5A and 5B described later) and a plurality of lenses 132 (FIG. 5A described later). In the present embodiment, the imaging element 131 is a CMOS (complementary metal-oxide-semiconductor) image sensor capable of detecting infrared rays. The main imaging unit 130 is arranged so as to be turned obliquely downward such that it can detect infrared rays emitted from a previously set imaging region V.

Figure 1:
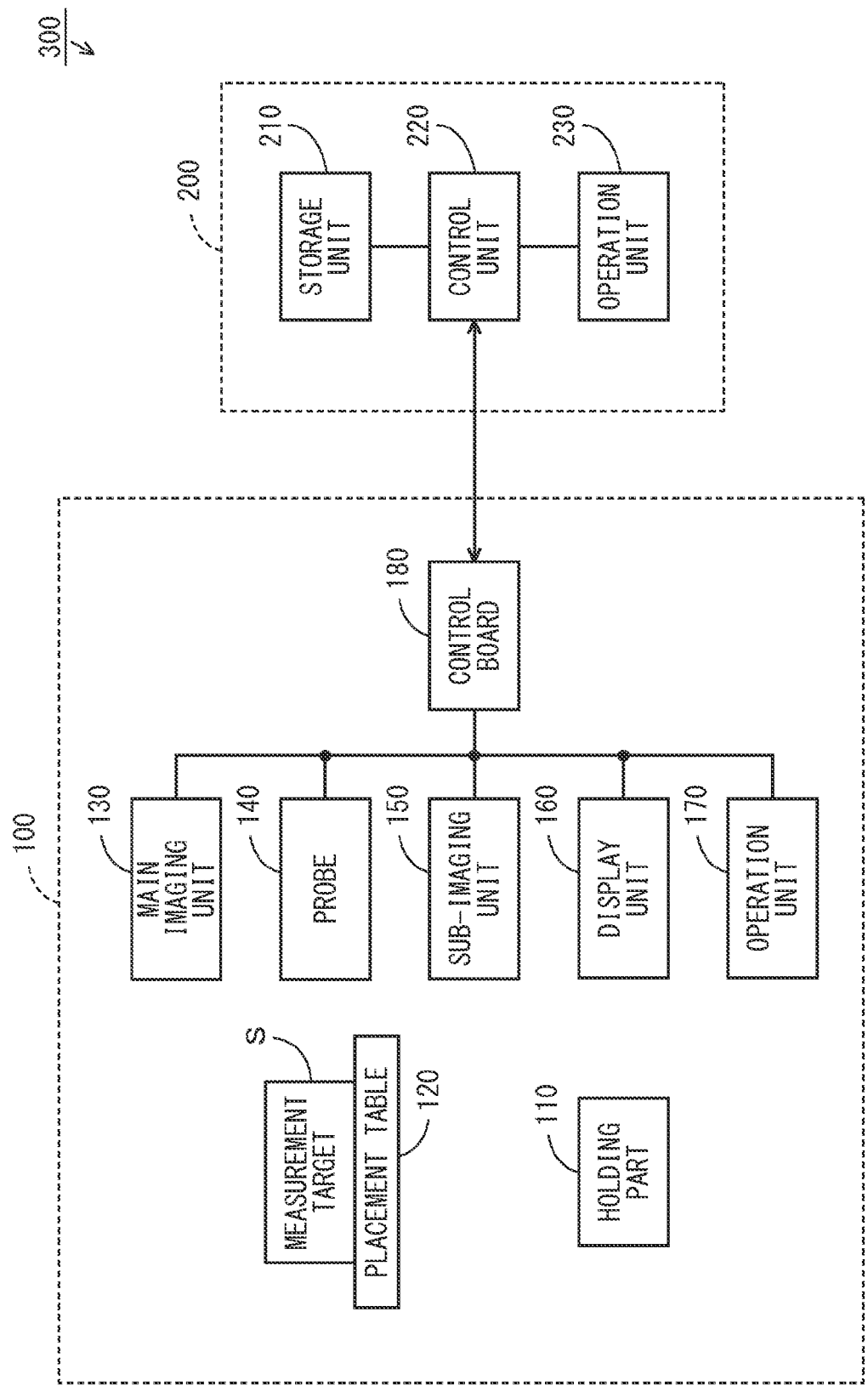
FIG. 1 is a block diagram showing a configuration of a coordinate measuring device according to one embodiment of the present invention.

The imaging region V is a certain region including the placement table 120 of the installation part 111 and its periphery. In the present embodiment, the placement table 120 of FIG. 1 and a region projecting from the placement table 120 only by a dimension of an overall length of the probe 140 of FIG. 1 are defined as the imaging region V. Note that the overall length of the probe 140 is approximately 150 mm, for example. An analog electric signal (hereinafter referred to as light reception signal) corresponding to a detected amount is outputted from each pixel of the main imaging unit 130 to the control board 180.

Figure 3:
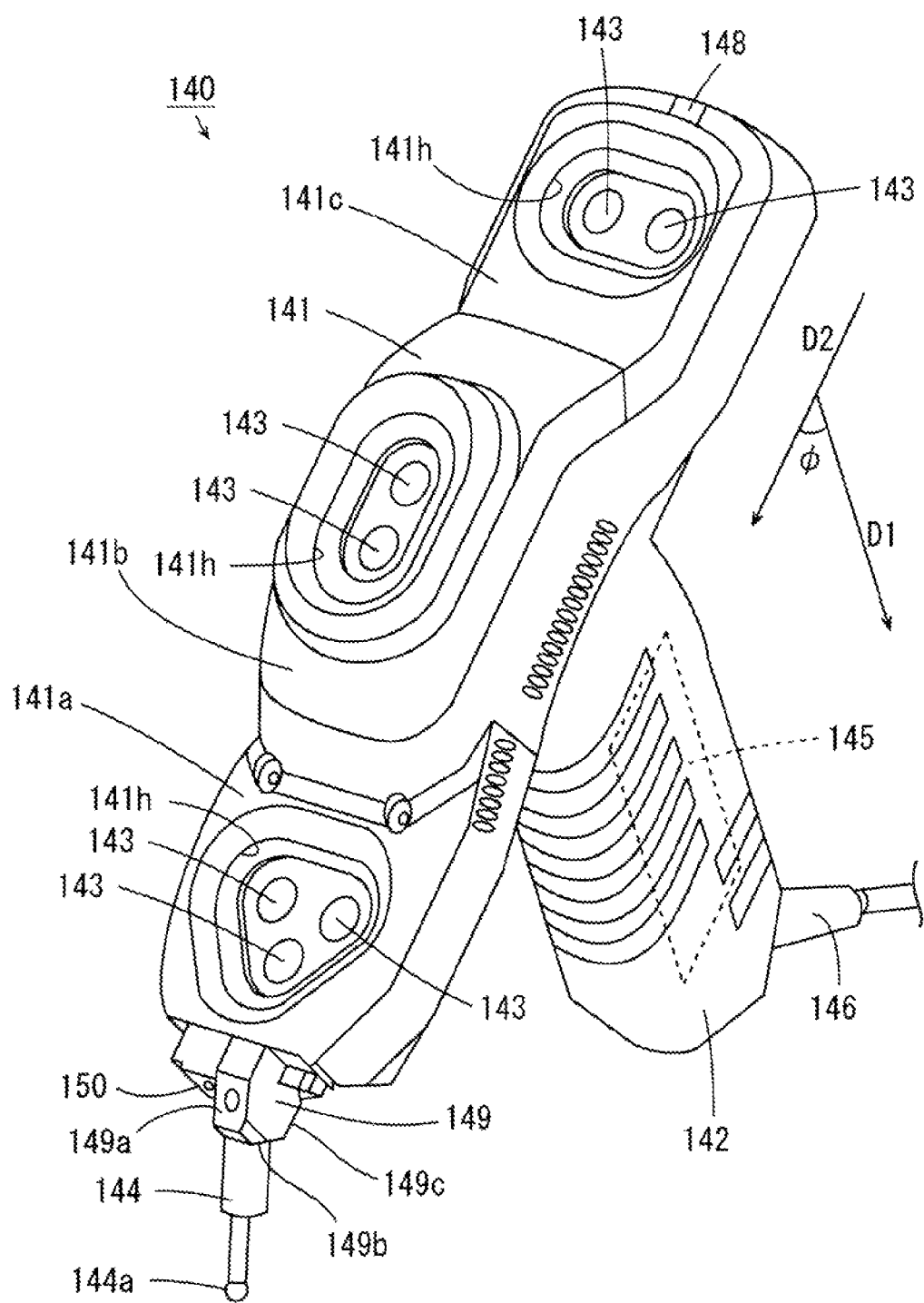
FIG. 3 is a perspective view showing a configuration of a probe of the measurement head of FIG. 2.

As shown in FIG. 3, the probe 140 includes a housing 141, a grip part 142, a plurality of light emitting units 143, a stylus 144, a power supply board 145, a connection terminal 146, a notification unit 148, and a stylus fixing member 149. The grip part 142 extends in a first direction D1, and the housing 141 extends in a second direction D2 intersecting with the first direction D1. A user grips the grip part 142 and operates the probe 140.

Hereinafter, unless specifically mentioned, the top, bottom, front, and rear of the probe 140 indicate the top, bottom, front, and rear of the probe 140 in a state where the user vertically holds the grip part 142 (state where the first direction D1 is a vertical direction).

The housing 141 is provided at the upper end of the grip part 142. The grip part 142 extends downward from the central part of the lower surface of the housing 141 such that a front portion of the housing 141 projects in front of the grip part 142 and a rear portion of the housing 141 projects behind the grip part 142. Here, an angle formed by the first direction D1 and the second direction D2 is defined as an angle φ formed by the grip part 142 and the front portion of the housing 141. In the present embodiment, the angle φ is an acute angle, being larger than 0° and smaller than 90°.

In the state where the grip part 142 is vertically held, the front end of the housing 141 is located below the rear end of the housing 141, and the upper surface of the housing 141 is inclined obliquely downward from the rear end to the front end. In this case, the user can easily turn the upper surface of the housing 141 obliquely upward.

In the present embodiment, the upper surface of the housing 141 includes a front-part upper surface 141a, a central-part upper surface 141b, and a rear-part upper surface 141c. The front-part upper surface 141a, the central-part upper surface 141b, and the rear-part upper surface 141c are parallel to the second direction D2. Further, the front-part upper surface 141a, the central-part upper surface 141b, and the rear-part upper surface 141c are vertical to a plane including the first and second directions D1, D2. The front-part upper surface 141a and the rear-part upper surface 141c are on the same plane, and the central-part upper surface 141b is on a plane higher than the front-part upper surface 141a and the rear-part upper surface 141c.

A glass-made holding member for holding the plurality of light emitting units 143 is housed inside the housing 141. The housing 141 is provided with a plurality of openings 141h through which the plurality of light emitting units 143 in the housing 141 are exposed.

In the example of FIG. 3, seven light emitting units 143 are provided in the housing 141. Three light emitting units 143 are arranged in the front end of the housing 141, two light emitting units 143 are arranged in the center, and two light emitting units 143 are arranged in the rear end. The front-part upper surface 141a, the central-part upper surface 141b, and the rear-part upper surface 141c of the housing 141 are respectively provided with an opening 141h through which the three light emitting units 143 in the front end are exposed, an opening 141h through which the two light emitting units 143 in the center are exposed, and an opening 141h through which the two light emitting units 143 in the rear end are exposed.

In this example, the three light emitting units 143 in the front end of the housing 141 and the two light emitting units 143 in the rear end are arranged so as to be located on the same plane. Further, the two light emitting units 143 in the center are arranged so as to be located on a plane higher than the plane where the other light emitting units 143 are located.

The three light emitting units 143 in the front end are arranged so as to be exposed upward from the front-part upper surface 141a. The two light emitting units 143 in the center are arranged so as to be exposed upward from the central-part upper surface 141b. The two light emitting units 143 in the rear end are arranged so as to be exposed upward from the rear-part upper surface 141c.

Each light emitting unit 143 includes a plurality of LEDs (light-emitting diodes). In this example, each LED is an infrared LED, and each light emitting unit 143 periodically emits infrared rays with a wavelength of 860 nm. The infrared rays emitted from the plurality of light emitting units 143 pass through the plurality of openings 141h of the housing 141, and images of the infrared rays are captured by the main imaging unit 130 of FIG. 2.

The main imaging unit 130 of FIG. 2 is located obliquely above the placement table 120. As described above, the user can easily turn the upper surface of the housing 141 obliquely upward. Therefore, the main imaging unit 130 can efficiently capture an image of infrared rays emitted from the plurality of light emitting units 143 of the probe 140 at the time of shape measurement of the measurement target S on the placement table 120.

Figure 4A:
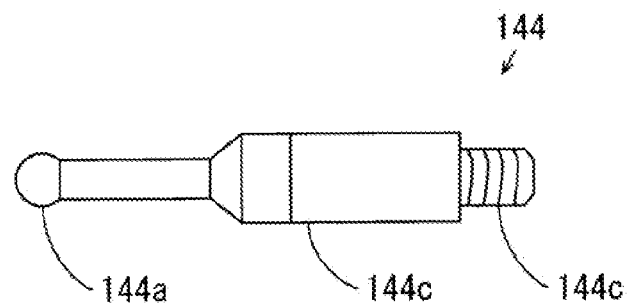
FIG. 4A is a side view showing a configuration of a stylus provided in the probe of FIG. 3.

The stylus fixing member 149 is provided so as to project forward from the front end of the housing 141. The stylus 144 is attached to the stylus fixing member 149. As shown in FIG. 4A, the stylus 144 is a stick member in which a contact part 144a, an axis part 144b, and a screw part 144c are integrally formed. The contact part 144a and the screw part 144c are respectively provided at one end (front end) and the other end (rear end) of the axis part 144b. The contact part 144a has a spherical shape.

Figure 4B:
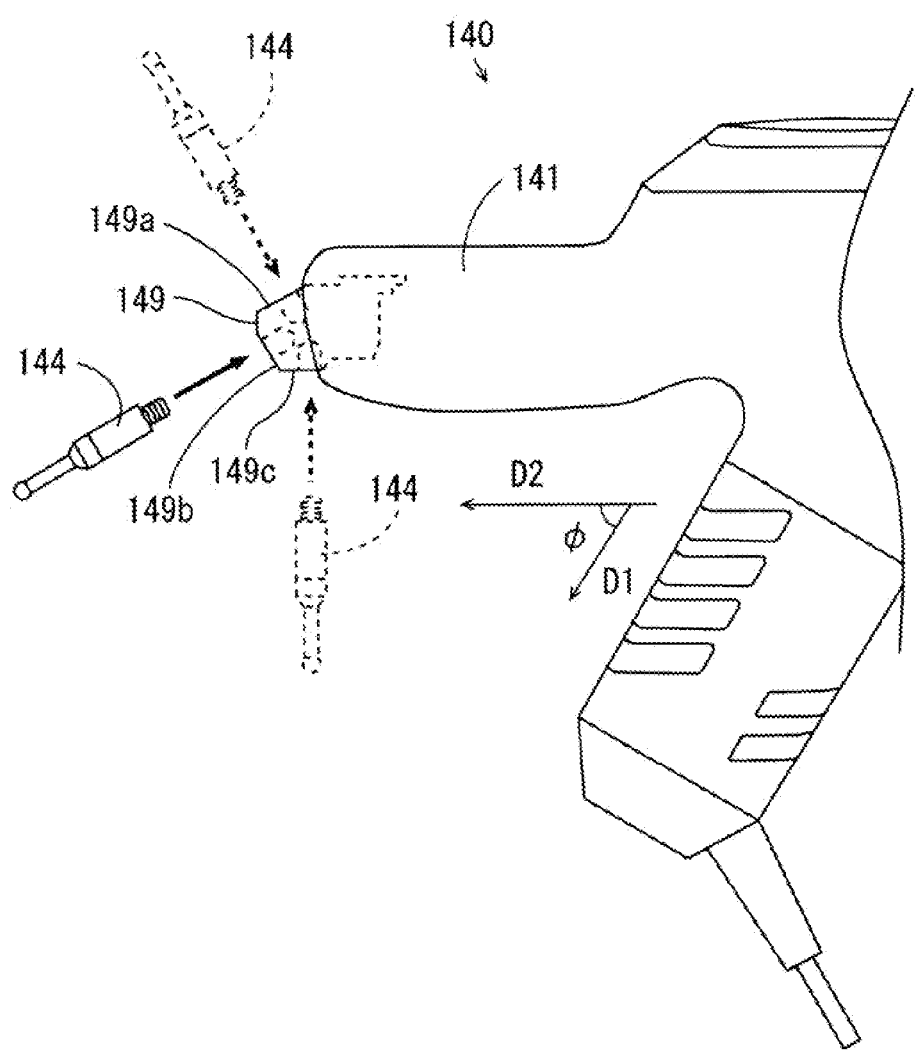
FIG. 4B is a view for describing an attachment structure of the stylus in the probe of FIG. 3.

As shown in FIG. 4B, the stylus fixing member 149 has a first attachment surface 149a, a second attachment surface 149b, and a third attachment surface 149c. In a state where the probe 140 is held such that the second direction D2 is horizontal, the first attachment surface 149a is formed so as to be turned obliquely upward, the second attachment surface 149b is formed so as to be turned obliquely downward, and the third attachment surface 149c is formed so as to be turned downward. A screw hole that can be attached with the screw part 144c of the stylus 144 is formed on each of the first to third attachment surfaces 149a to 149c.

The user can arbitrarily change an attachment surface of the stylus 144 among the first to third attachment surfaces 149a to 149c in accordance with the shape of the measurement target S. In the example of FIG. 3, the stylus 144 is attached to the second attachment surface 149b of the stylus fixing member 149.

As shown in FIG. 3, the power supply board 145 is housed inside the grip part 142, and supplies electric power to the plurality of light emitting units 143 and the notification unit 148. The connection terminal 146 is arranged on a lower part of the grip part 142. Operations of the plurality of light emitting units 143 and the notification unit 148 are controlled by the control board 180 of FIG. 1 through a cable connected to the connection terminal 146.

The notification unit 148 includes a plurality of green LEDs and a plurality of red LEDs, and is arranged in the vicinity of the rear end of the upper surface of the housing 141. When the plurality of light emitting units 143 exist within the imaging region V (FIG. 2) of the main imaging unit 130 (FIG. 2), the notification unit 148 emits green light. On the other hand, when the plurality of light emitting units 143 do not exist within the imaging region V of the main imaging unit 130, the notification unit 148 emits red light. Accordingly, the user can easily recognize whether or not the plurality of light emitting units 143 exist within the imaging region V of the main imaging unit 130.

When two probes 140 are respectively attached to the two connection terminals 113 of FIG. 2, the user can perform measurement of the measurement target S by selecting the probe 140 provided with the stylus 144 having an appropriate shape in an appropriate position in accordance with the shape of the measurement target S.

In a measurement mode described later, when the plurality of light emitting units 143 of the probe 140 to be used exist within the imaging region V (FIG. 2) of the main imaging unit 130, the notification unit 148 of this probe 140 emits green light. On the other hand, when the plurality of light emitting units 143 of the probe 140 to be used do not exist within the imaging region V of the main imaging unit 130, the notification unit 148 of this probe 140 emits red light. At this time, the notification unit 148 of the other probe 140 (probe 140 not to be used) does not emit light. Accordingly, the user can easily recognize the probe 140 to be used. Further, measurement by use of the probe 140 other than the probe 140 to be used is prevented.

The sub-imaging unit 150 is a CCD (charge coupled device) camera, for example. A resolution of the sub-imaging unit 150 may be lower than a resolution of the main imaging unit 130. The sub-imaging unit 150 is arranged in a position whose positional relationship with the contact part 144a of the stylus 144 of the probe 140 is known. In the present embodiment, the sub-imaging unit 150 is arranged on the end surface of the front end of the housing 141 of the probe 140. A light reception signal is outputted from each pixel of the sub-imaging unit 150 to the control board 180 through the cable connected to the connection terminal 146.

As shown in FIG. 2, the display unit 160 is supported by the stand part 112 of the holding part 110, and is provided on the installation part 111 such that a display screen of the display unit 160 is turned obliquely upward. Accordingly, the user can selectively view the measurement target S and the display unit 160 by minimum movement of his or her eyes, or view the measurement target S and the display unit 160 at the same time.

The display unit 160 is configured by a liquid crystal display panel or an organic EL (electroluminescence) panel, for example. On the display unit 160, an image generated by the processing device 200, an operating procedure screen for the coordinate measuring device 300, a measurement result, and the like are displayed based on control by the control board 180.

The operation unit 170 has a plurality of operation buttons, for example. The operation unit 170 can be operated by the user at the time of designating a portion of the measurement target S to be measured, or at some other time. The operation unit 170 may be provided integrally with the probe 140. For example, in the grip part 142 of FIG. 3, one or a plurality of operation buttons may be provided as the operation unit 170. In this case, the user can operate the operation unit 170 while holding the grip part 142 with one hand.

The control board 180 is provided in the stand part 112 of the holding part 110. The control board 180 is connected to the main imaging unit 130, the probe 140, the sub-imaging unit 150, the display unit 160, and the operation unit 170. The processing device 200 controls operations of the main imaging unit 130, the probe 140, the sub-imaging unit 150, the display unit 160, and the operation unit 170 via the control board 180.

The control board 180 is mounted with an A/D convertor (analog/digital convertor) and a FIFO (first in, first out) memory, which are not shown. Light reception signals outputted from the main imaging unit 130 and the sub-imaging unit 150 are sampled by the A/D convertor of the control board 180 in a constant sampling period and also converted to digital signals. The digital signals outputted from the A/D convertor are sequentially stored into the FIFO memory. The digital signals stored into the FIFO memory are sequentially transmitted as pixel data to the processing device 200.

In the present embodiment, the timing for light emission by the plurality of light emitting units 143 of FIG. 3 is synchronized with the timing for detection by the main imaging unit 130 of FIG. 2. Pixel data stored in a light emission period of the plurality of light emitting units 143 is transmitted from the control board 180 to the processing device 200 in a next quenching period of the light emitting units 143.

As shown in FIG. 1, the processing device 200 includes the storage unit 210, a control unit 220, and an operation unit 230. The storage unit 210 includes a ROM (read only memory), a RAM (random access memory), and a hard disk. A system program is stored into the storage unit 210. Further, the storage unit 210 is used for processing a variety of data and storing a variety of data such as pixel data from the measurement head 100.

The control unit 220 includes a CPU (central processing unit). In the present embodiment, the storage unit 210 and the control unit 220 are realized by a personal computer. The control unit 220 generates image data based on the pixel data from the measurement head 100. The image data is an aggregate of plurality of pieces of pixel data. The control unit 220 calculates a position of the contact part 144a of the stylus 144 of the probe 140 based on the generated image data.

The operation unit 230 includes a key board and a pointing device. For the pointing device of this example, a mouse having a wheel is used. The operation unit 230 is operated by the user.

(2) Configuration of Main Imaging Unit

Figure 5B:
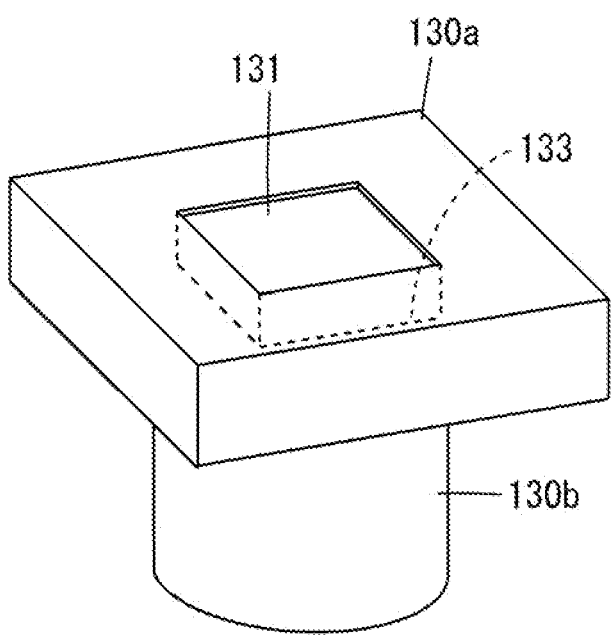

FIGS. 5A and 5B are views for describing a configuration of the main imaging unit 130. FIG. 5A is a schematic sectional view of the main imaging unit 130, and FIG. 5B is an external perspective view of the main imaging unit 130.

As shown in FIG. 5A, the main imaging unit 130 is provided with an element holding part 130a, a lens holding part 130b, an imaging element 131, and a plurality of lenses 132. The element holding part 130a and the lens holding part 130b are made of titanium, for example. The element holding part 130a and the lens holding part 130b may be provided as a common member by integral molding, or may be provided as separate bodies.

A recess 133 having a rectangular cross section is formed on one surface of the element holding part 130a. The imaging element 131 is fitted to the recess 133. In order to prevent positional displacement of the imaging element 131, the imaging element 131 may be fixed in the recess 133 by use of a fixing member such as a screw or a spring. A through hole 134 is formed from the bottom surface of the recess 133 to the other surface of the element holding part 130a which is parallel to the above one surface.

As shown in FIGS. 5A and 5B, the lens holding part 130b has a cylindrical shape. One end of the lens holding part 130b is fixed to the other surface of the element holding part 130a. The plurality of lenses 132 having various sizes are held in the lens holding part 130b. The plurality of lenses 132 overlap with the through hole 134 of the element holding part 130a, and arranged such that optical axes thereof agree with each other. Light is incident on the imaging element 131 from the other end of the lens holding part 130b through the plurality of lenses 132.

(3) Detection by Main Imaging Unit

Figure 6:
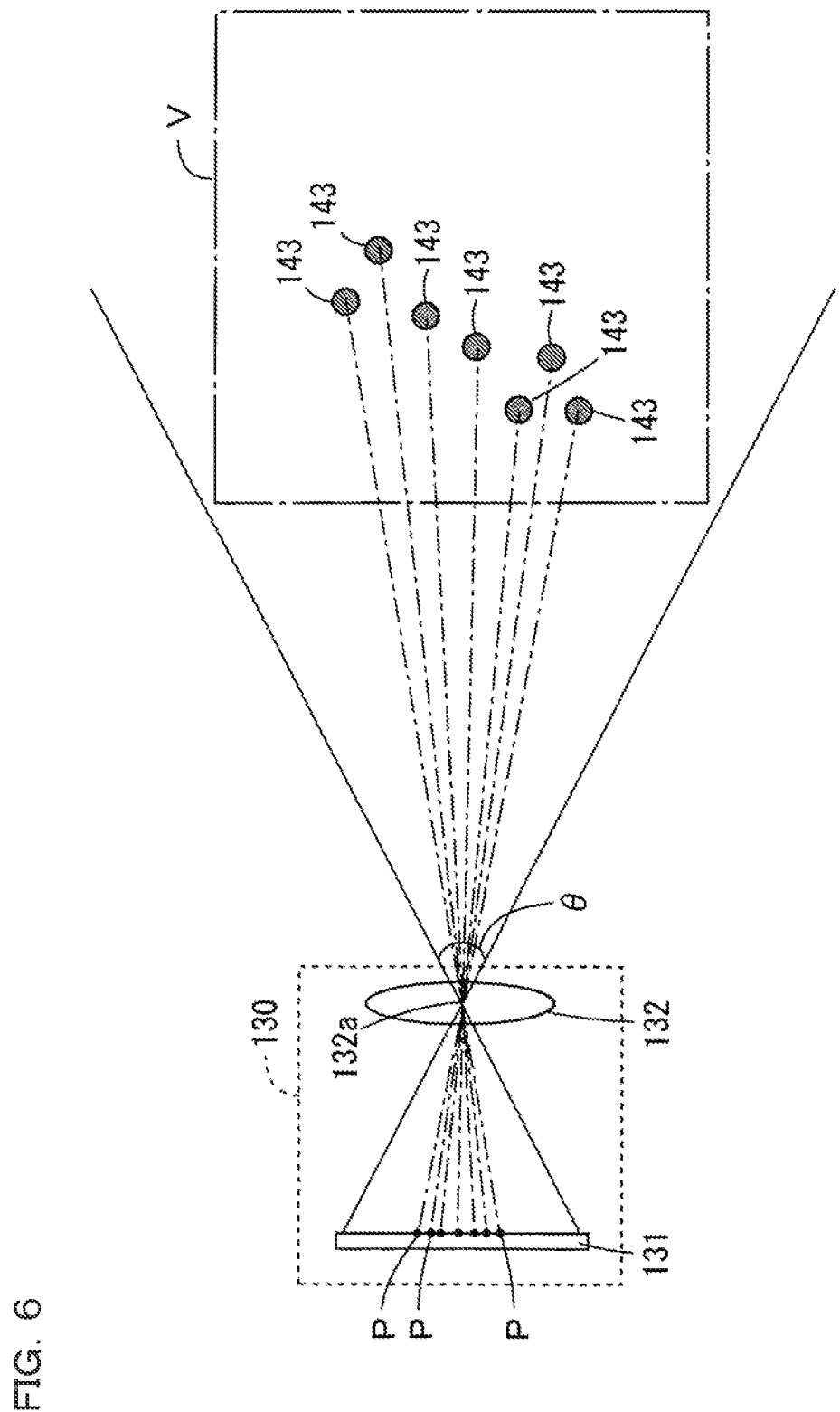
FIG. 6 is a schematic view for describing the relationships between the main imaging unit and a plurality of light emitting units.

As described above, the main imaging unit 130 detects infrared rays emitted from the plurality of light emitting units 143 of the probe 140. FIG. 6 is a schematic view for describing the relationships between the main imaging unit 130 and a plurality of light emitting units 143. In FIG. 6, a description will be given using a so-called pin hole camera model in order to facilitate understanding. FIG. 6 shows only one lens 132 out of the plurality of lenses 132 of the main imaging unit 130, and light is guided to the imaging element 131 so as to pass through a main point 132a of the lens 132.

As shown in FIG. 6, the main imaging unit 130 has a constant angle of view (viewing angle) θ. The imaging region V is included within the range of the angle of view θ of the main imaging unit 130. When each of the plurality of light emitting units 143 are located within the imaging region V, infrared rays emitted from those light emitting units 143 are incident on the imaging element 131 through the main point 132a of the lens 132.

In this case, a direction from the main point 132a of the lens 132 to each light emitting unit 143 is specified based on a light reception position P of the imaging element 131. In the example of FIG. 6, as indicated by a dashed line, each light emitting unit 143 is located on each straight line passing through each light reception position P and the main point 132a of the lens 132. Further, the relative positional relationship among the plurality of light emitting units 143 is previously stored into the storage unit 210 of FIG. 1, for example.

Based on the direction from the main point 132a of the lens 132 toward each light emitting unit 143 and the positional relationship among the plurality of light emitting units 143, a position of the center of each light emitting unit 143 is unambiguously decided. In the present embodiment, a coordinate system (hereinafter referred to as device coordinate system) specific to the coordinate measuring device 300 is previously defined in a space including the imaging region V. The device coordinate system includes an origin and an x-axis, a y-axis, and a z-axis which are orthogonal to each other. Accordingly, an absolute position within the imaging region V is represented by three-dimensional coordinates. The control unit 220 of FIG. 1 calculates coordinates of the center of each light emitting unit 143 based on the light reception position P of the imaging element 131 and the previously stored positional relationship among the plurality of light emitting units 143.

Based on the calculated coordinates of the center of each light emitting unit 143, coordinates of the contact position between the contact part 144a (FIG. 3) of the probe 140 and the measurement target S are calculated by the control unit 220 of FIG. 1.

For example, the positional relationship between the center of each light emitting unit 143 and the center of the contact part 144a (FIG. 3) is previously stored into the storage unit 210 of FIG. 1. Based on the calculated coordinates of the center of each light emitting unit 143 and the previously stored positional relationship between the center of each light emitting unit 143 and the center of the contact part 144a, coordinates of the center of the contact part 144a are specified.

Further, based on the coordinates of the center of each light emitting unit 143, a position and an attitude of the probe 140 are specified. A position of the stylus 144 is thereby specified. Further, based on the position and the attitude of the probe 140, the positional relationship between the stylus 144 and the probe 140, or the like, the relative positional relationship between the center of the contact part 144a and the contact position, that is, the measurement position, is estimated. Based on the estimated positional relationship, coordinates of the contact position (measurement position) between the contact part 144a and the measurement target S are calculated from the coordinates of the center of the contact part 144a.

Note that a sensor for detecting a direction of force that is applied from the measurement target S to the contact part 144a may be provided in the probe 140. In this case, it is possible to calculate coordinates of the contact position between the contact part 144a and the measurement target S based on a result of detection by the sensor.

The calculated coordinates vary when there is an individual difference in the positional relationships between the imaging element 131 and the plurality of lenses 132, the positional relationship among the plurality of light emitting units 143, or the like. Further, when the attachment surface of the stylus 144 is changed among the first to third attachment surfaces 149a to 149c of FIG. 4B, the positional relationship between each light emitting unit 143 and the contact part 144a also changes. Therefore, before performing measurement by the coordinate measuring device 300, it is preferable to perform calibration for preventing variation due to the individual difference and for storing the positional relationships between the plurality of light emitting units 143 and the contact part 144a into the storage unit 210.

(4) Basic Measurement Examples

Figure 7:
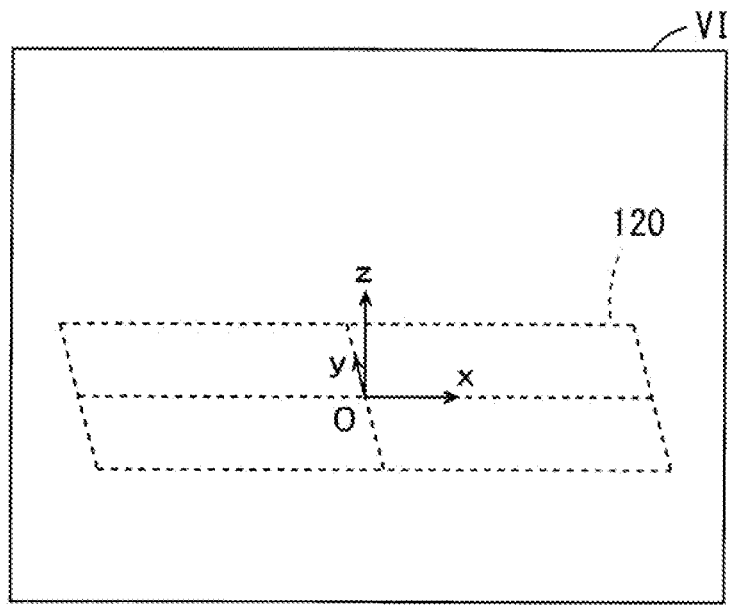
FIG. 7 is a view showing one example of an image displayed on a display unit of FIG. 2.
Figure 8:
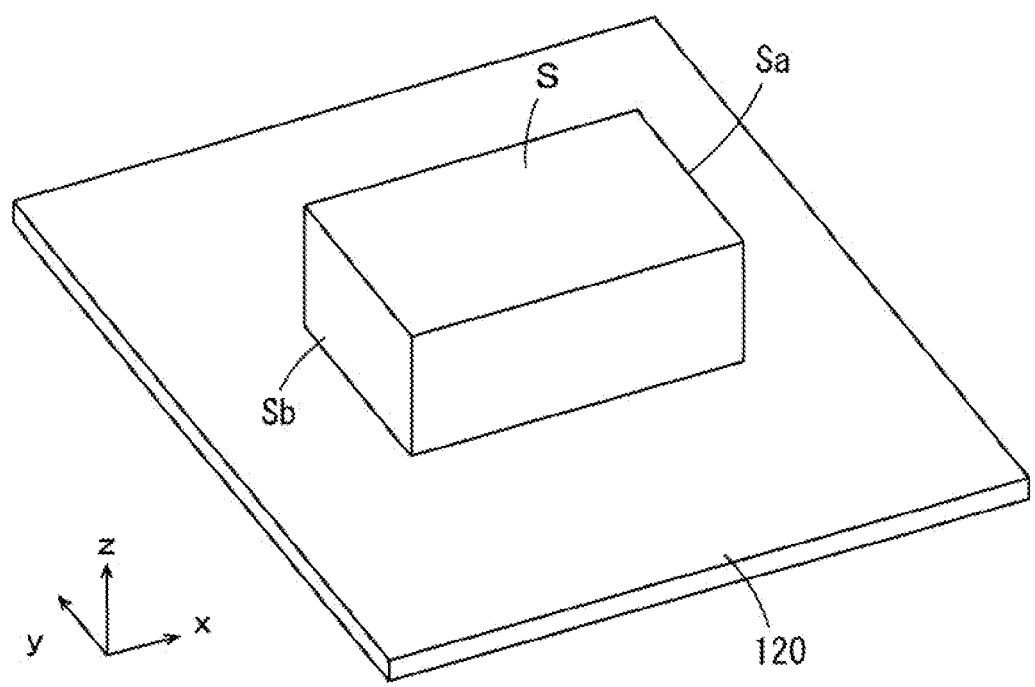
FIG. 8 is a view showing one example of a measurement target.

There will be described basic examples of measuring a size of the measurement target S by the coordinate measuring device 300. FIG. 7 is a view showing one example of an image displayed on the display unit 160 of FIG. 2. FIG. 8 is a view showing one example of the measurement target S.

FIG. 7 shows an image (hereinafter referred to as imaging-region virtual image) VI that virtually represents the imaging region V viewed from an arbitrary position. As described above, the device coordinate system including the origin, the x-axis, the y-axis, and the z-axis is defined in the space including the imaging region V. In this example, the x-axis and the y-axis are set so as to be parallel to the upper surface of the placement table 120 and orthogonal to each other, and the z-axis is set vertically to the upper surface of the placement table 120. Further, the center of the placement table 120 is set at an origin O. The imaging-region virtual image VI of FIG. 7 includes lines (dotted lines of FIG. 7) indicating an outer periphery of the placement table 120, as well as the origin O, the x-axis, the y-axis, and the z-axis of the device coordinate system.

The measurement target S of FIG. 8 has a rectangular parallelepiped shape. In this example, a distance between one side surface Sa of the measurement target S and a side surface Sb opposite to the side surface Sa is measured. The side surfaces Sa, Sb of the measurement target S are each vertical to the x-axis.

Figure 9A:
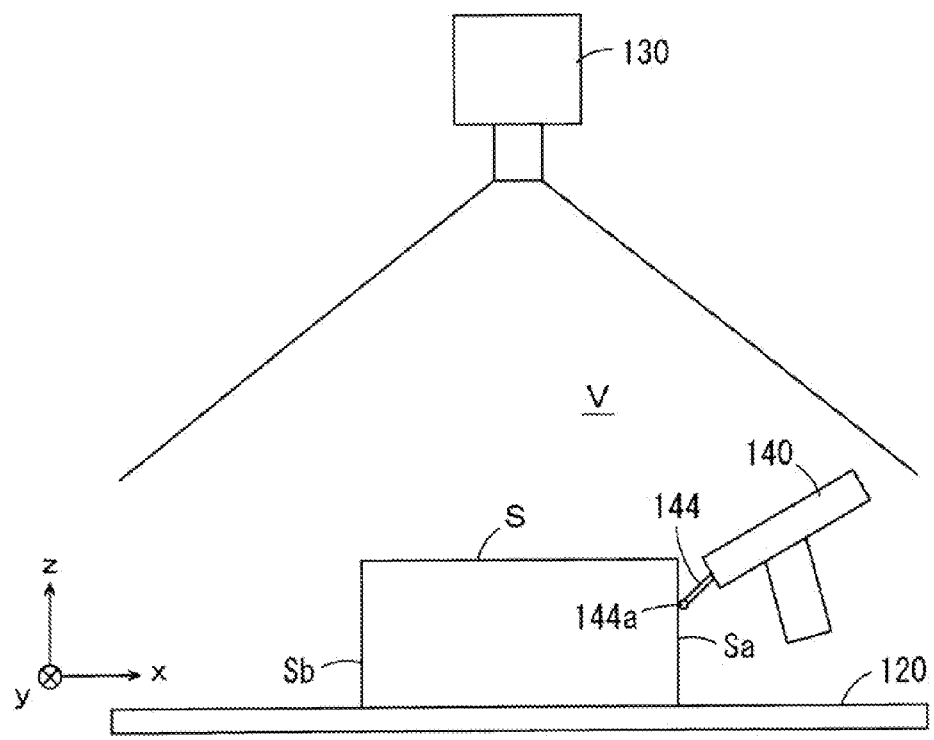
FIGS. 9A and 9B are views for describing a specific measurement example in the measurement target of FIG. 8.
Figure 9B:
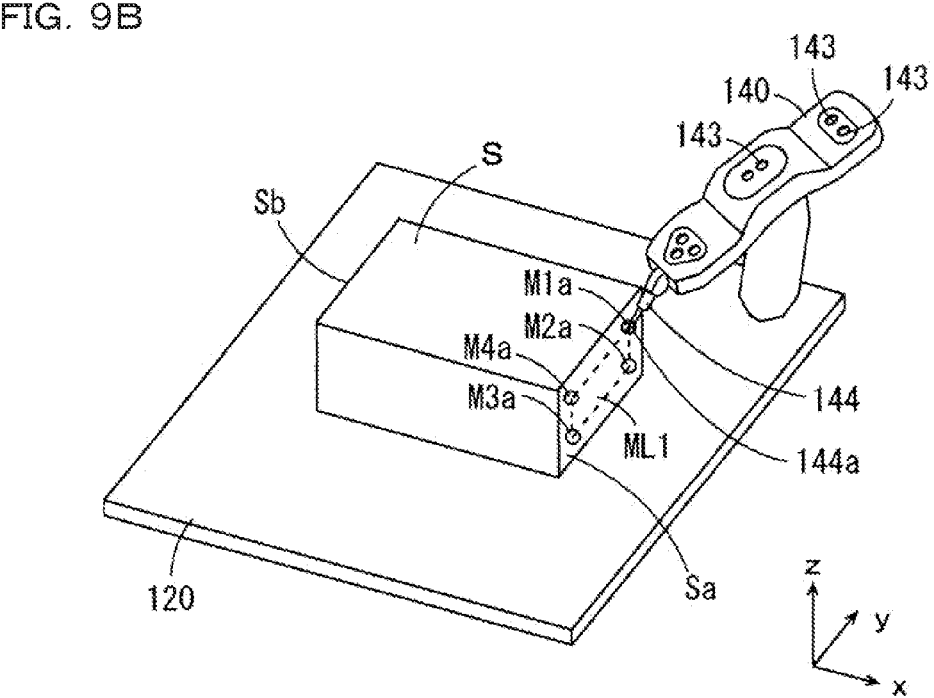
Figure 10:
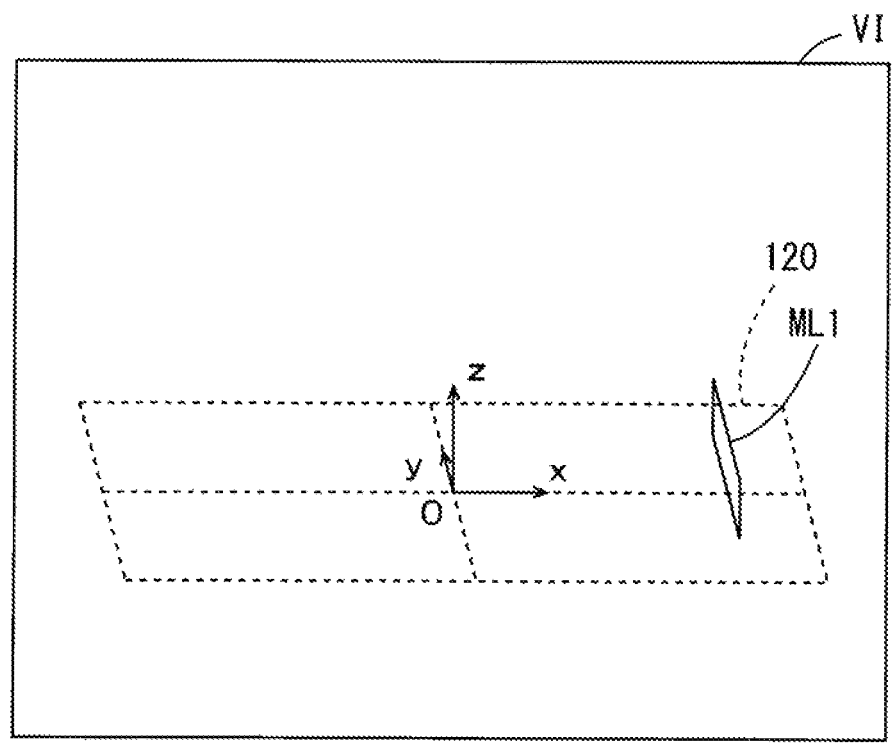
FIG. 10 is a view for describing the specific measurement example in the measurement target of FIG. 8.
Figure 11A:
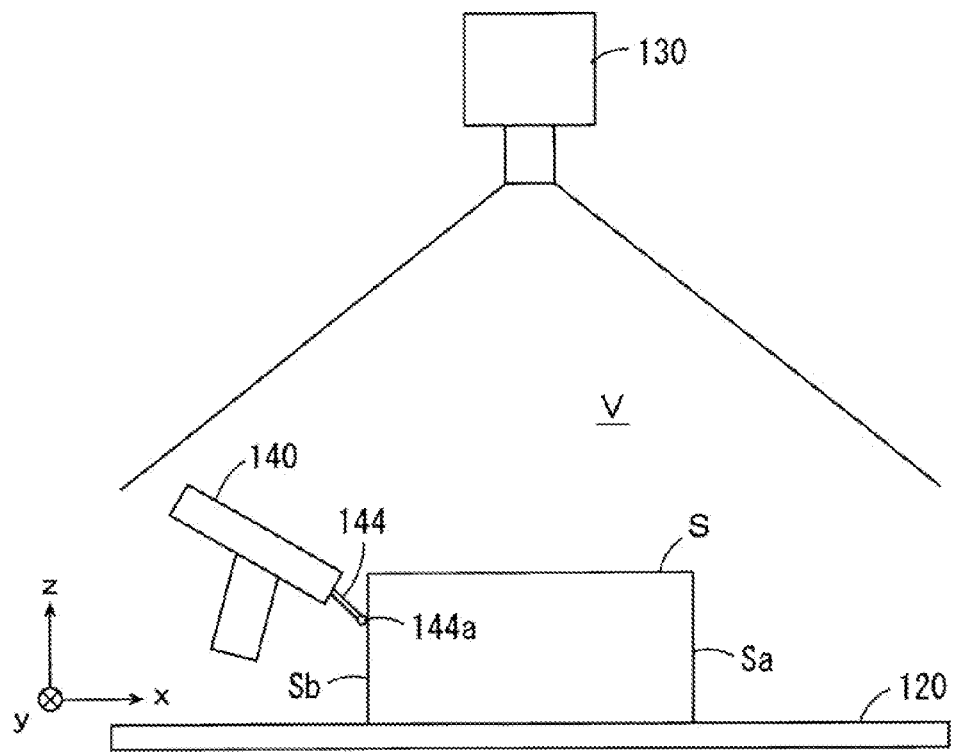
FIGS. 11A and 11B are views for describing a specific measurement example in the measurement target of FIG. 8.
Figure 11B:
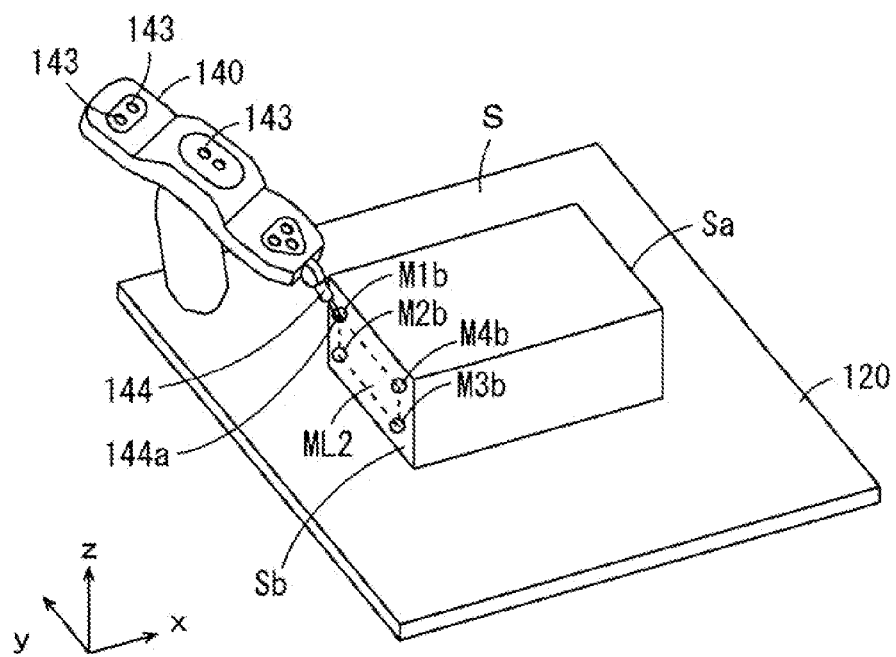
Figure 12:
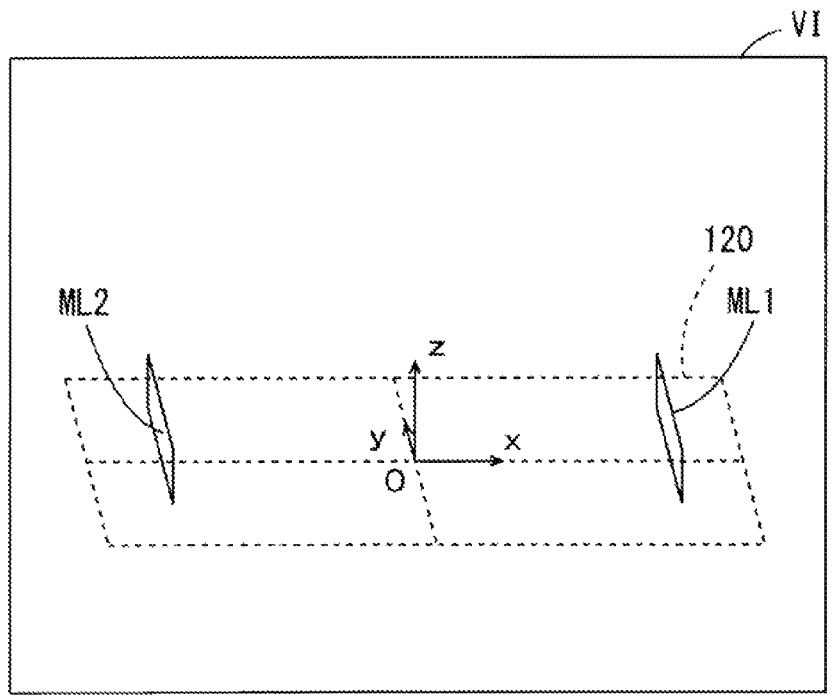
FIG. 12 is a view for describing the specific measurement example in the measurement target of FIG. 8.
Figure 13:
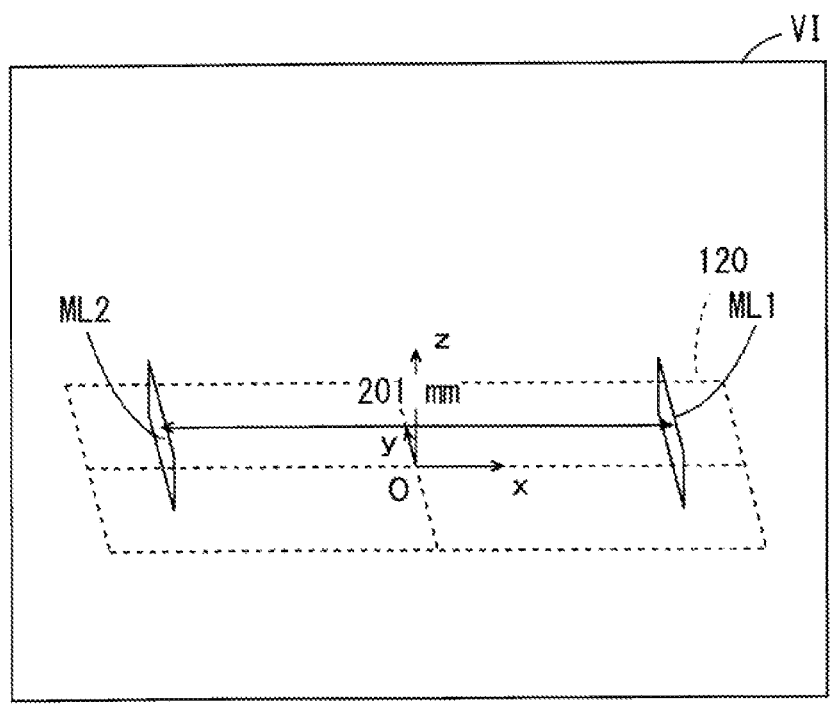
FIG. 13 is a view for describing the specific measurement example in the measurement target of FIG. 8.

FIGS. 9A to 13 are views for describing specific measurement examples in the measurement target S of FIG. 8. FIGS. 9A and 11A are front views showing the positional relationship among the placement table 120, the main imaging unit 130, the probe 140, and the measurement target S, and FIGS. 9B and 11B are external perspective views of the probe 140 and the measurement target S. FIGS. 10, 12, and 13 show examples of the imaging-region virtual image VI displayed on the display unit 160.

As shown in FIGS. 9A and 9B, the contact part 144a of the stylus 144 is brought into contact with the side surface Sa of the measurement target S such that the plurality of light emitting units 143 of the probe 140 are located within the imaging region V. By the operation unit 170 of FIG. 1 being operated under this state, the contact position between the measurement target S and the contact part 144a is set (measured) as a measurement position M1a, as shown in FIG. 9B. In this case, coordinates of the measurement position M1a are calculated.

Similarly, three positions on the side surface Sa of the measurement target S are set (measured) as measurement positions M2a, M3a, M4a, and coordinates of the measurement positions M2a, M3a, M4a are calculated. Subsequently, by the operation unit 170 or the operation unit 230 of FIG. 1 being operated, a plane passing through the measurement positions M1a to M4a is set as a measurement plane ML1 corresponding to the side surface Sa of the measurement target S, and a position of the measurement plane ML1 is calculated. In this case, as shown in FIG. 10, the set measurement plane ML1 is superimposed on the imaging-region virtual image VI.

Subsequently, as shown in FIGS. 11A and 11B, the contact part 144a of the stylus 144 is brought into contact with the side surface Sb of the measurement target S such that the plurality of light emitting units 143 of the probe 140 are located within the imaging region V. By the operation unit 170 of FIG. 1 being operated under this state, the contact position between the measurement target S and the contact part 144a is set (measured) as a measurement position M1b, as shown in FIG. 11B. In this case, coordinates of the measurement position M1b are calculated.

Similarly, three positions on the side surface Sb of the measurement target S are set (measured) as measurement positions M2b, M3b, M4b, and coordinates of the measurement positions M2b, M3b, M4b are calculated. Subsequently, by the operation unit 170 or the operation unit 230 of FIG. 1 being operated, a plane passing through the measurement positions M1b to M4b is set as a measurement plane ML2 corresponding to the side surface Sb of the measurement target S, and a position of the measurement plane ML2 is calculated. In this case, as shown in FIG. 12, the set measurement plane ML2 is superimposed on the imaging-region virtual image VI in addition to the measurement plane ML1.

Subsequently, by the operation unit 170 or the operation unit 230 of FIG. 1 being operated, a distance between the set measurement planes ML1 and ML2 is calculated in the control unit 220 of FIG. 1, and as shown in FIG. 13, the calculation result is displayed on the imaging-region virtual image VI. Note that the calculation result may be displayed on the display unit 160 separately from the imaging-region virtual image VI. Further, a calculation method for the distance between the two measurement planes ML1 and ML2 and the like may be appropriately set by the user.

Although one measurement plane is set based on the four measurement positions in this example, one measurement plane can be set based on three measurement positions at the minimum. Meanwhile, by setting four or more measurement positions, it is possible to more accurately set the measurement plane corresponding to the measurement target S. Further, based on four or more measurement positions, it is also possible to obtain the flatness of the measurement plane.

Moreover, in this example, in order to specify a portion to be measured in the measurement target S, there is set a rectangular measurement target portion (measurement plane) passing through four positions (measurement positions), with which the contact part 144a of the stylus 144 has been brought into contact. The present invention is not limited thereto, and there may be set a measurement plane having another geometrical shape and passing through a plurality of measurement positions in accordance with a shape of the portion to be measured in the measurement target S. Further, in order to specify the portion to be measured in the measurement target S, the set shape is not limited to the plane, but there may be set a cylinder, a sphere, or the like which passes through a plurality of measurement positions. In this case, a diameter of a cross section of the set cylinder, a radius of the set sphere, or the like can be obtained.

(5) Function Using Sub-Imaging Unit

By capturing an image of the measurement target S by the sub-imaging unit 150 of FIG. 3, image data showing the measurement target S is generated by the control unit 220 of FIG. 1 based on a light reception signal outputted from the sub-imaging unit 150. Based on the generated image data, the image of the measurement target S can be displayed on the display unit 160. Hereinafter, image data obtained by the sub-imaging unit 150 is referred to as captured image data, and an image based on the captured image data is referred to as a captured image.

Switching between display of the imaging-region virtual image VI and display of the captured image on the display unit 160 is performed by operation of the operation unit 170 or the operation unit 230 of FIG. 1. Further, for example, when a specific switch provided in the operation unit 170 is operated in a state where the captured image is displayed on the display unit 160, captured image data at that time point is stored into the storage unit 210 of FIG. 1. This allows a still image of the measurement target S to be displayed on the display unit 160.

The positional relationships between the plurality of light emitting units 143 and the sub-imaging unit 150, and characteristics (angle of view, distortion, and the like) of the sub-imaging unit 150 are previously stored as imaging information into the storage unit 210 of FIG. 1, for example. Accordingly, when the plurality of light emitting units 143 are within the imaging region V, a region whose image is captured by the sub-imaging unit 150 is recognized by the control unit 220 of FIG. 1. That is, based on the calculation result of the positions of the plurality of light emitting units 143 which are obtained by the main imaging unit 130 and the positional relationships of the sub-imaging unit 150 with respect to the plurality of light emitting units 143, a three-dimensional space corresponding to the captured image is recognized by the control unit 220.

As described above, information (hereinafter referred to as positional figure information) of the measurement position and the measurement target portion (measurement plane in the above example) is set in the three-dimensional space.

In the present embodiment, the positional figure information can be associated with the captured image, and can be displayed in an appropriate position on the captured image (e.g., a position on the captured image in the case of representing a coordinate position, shown by the positional figure information, in a three-dimensional space corresponding to the captured image.

Figure 14:
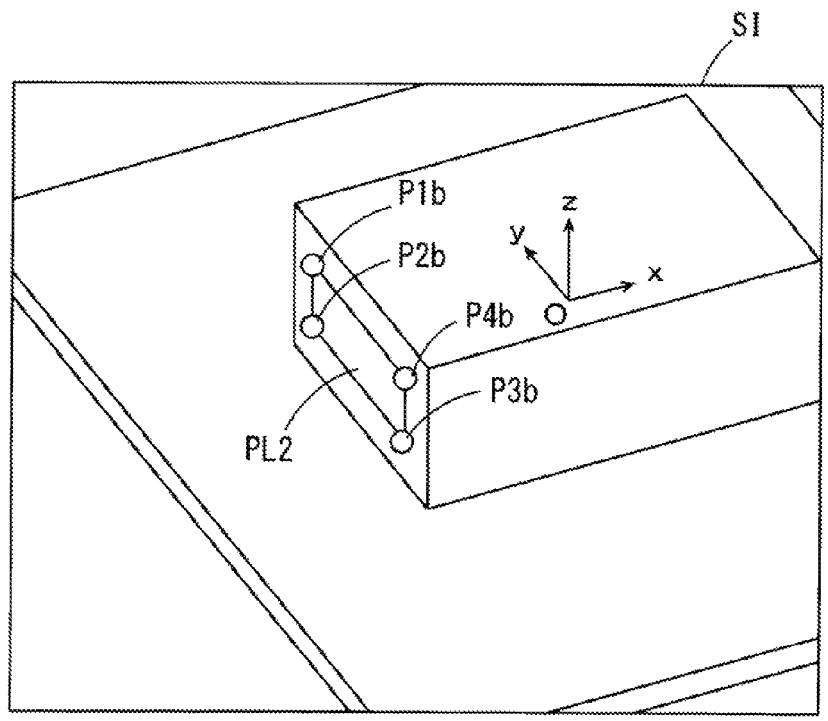
FIG. 14 is a view showing an example in which positional figure information is displayed on a captured image.

FIG. 14 is a view showing an example in which the positional figure information is displayed on the captured image. In the example of FIG. 14, an image of the side surface Sb of the measurement target S is captured by the sub-imaging unit 150. On a captured image SI, a plurality of spherical images P1b, P2b, P3b, P4b which represent the measurement positions M1b to M4b are displayed, and a figure PL2 which represents the measurement plane ML2 is also displayed. Further, on the captured image SI, there is displayed an image showing the origin O, the x-axis, the y-axis, and the z-axis of the device coordinate system which are defined in the three-dimensional space.

As described above, the positional figure information is displayed in an appropriate position on the captured image SI obtained by actual imaging of the measurement target S, so that the user can visually grasp the positional figure information. Further, in the case of performing measurement on one measurement target S and thereafter performing similar measurement on another measurement target S, the user refers to the captured image SI superimposed with the positional figure information, whereby the measurement on another measurement target S can be easily performed.

When the positional relationships between the plurality of light emitting units 143 and the sub-imaging unit 150 are displaced from the designed positional relationships, displacement occurs between the three-dimensional space defined in the imaging region V and the three-dimensional space corresponding to the captured image SI. In this case, the positional figure information cannot be displayed in the appropriate position on the captured image SI. Accordingly, before the measurement by the coordinate measuring device 300 is performed, calibration for preventing the displacement between the three-dimensional space defined in the imaging region V and the three-dimensional space corresponding to the captured image SI is preferably performed.

(6) Specific Usage Example of Coordinate Measuring Device (6-1) Setting mode and measurement mode In the following description, out of the users of the coordinate measuring device 300, a user who manages the measurement operation for the measurement target S is referred to as a measurement manager as appropriate, and a user who performs the measurement operation for the measurement target S under management by the measurement manager is referred to as a measurement operator as appropriate.

The coordinate measuring device 300 can be used in four kinds of modes, i.e., a setting mode for the measurement manager, a measurement mode for the measurement operator, a single item measurement mode, and a statistical analysis mode. Details of the single item measurement mode and the statistical analysis mode will be described later.

In the setting mode, by the measurement manager measuring one measurement target S, information including a measurement condition and a measurement procedure for the measurement target S is generated as setting information. A data file of the generated setting information is stored into the hard disk of the storage unit 210 of FIG. 1. Meanwhile, in the measurement mode, the measurement operator views the display unit 160 of FIG. 1, and can thereby perform measurement of another measurement target S based on the setting information stored in the storage unit 210 of FIG. 1. A data file of a measurement result obtained in the measurement mode is stored into the hard disk of the storage unit 210 of FIG. 1.

The measurement condition for the measurement target S includes a coordinate system, a measurement item, and a target portion shape. The measurement item is an item that shows what is to be measured with respect to the measurement target S, and includes various physical quantities such as a distance, an angle, and flatness. Further, the measurement item may include calculation methods for those various physical quantities. The target portion shape is the kind of geometrical shape showing the shape of the portion to be measured in the measurement target S. The kind of the geometrical shape includes a point, a straight line, a plane, a circle, a cylinder, a sphere, and the like.

In the coordinate measuring device 300 according to the present embodiment, it is possible to define an arbitrary coordinate system (hereinafter referred to as reference coordinate system) in the space including the imaging region V. In this case, coordinates of the measurement position are calculated in accordance with the reference coordinate system. The coordinate system of the measurement condition shows the reference coordinate system which is defined at the time of measuring the measurement target S.

Information concerning the probe 140 is previously stored as probe information into the storage unit 210 of FIG. 1. The probe information includes individual identification information for identifying the individual probe 140, information of the attachment surface where the stylus 144 is attached, a diameter of the contact part 144a, and the like. The above setting information further includes probe information used for measuring the measurement target S.

In this example, two probes 140 are connected to the two connection terminals 113 of FIG. 2, and two pieces of probe information respectively corresponding to the two probes 140 are stored in the storage unit 210. One piece of probe information shows the probe 140 which is connected to one connection terminal 113 and whose stylus 144 is attached to the second attachment surface 149b of FIG. 4B. The other piece of probe information shows the probe 140 which is connected to the other connection terminal 113 and whose stylus 144 is attached to the first attachment surface 149a of FIG. 4B. In the following description, the probe 140 corresponding to the one piece of probe information is referred to as "A probe" as appropriate, and the probe 140 corresponding to the other piece of probe information is referred to as "B probe" as appropriate.

(6-2) Setting mode

Figure 15:
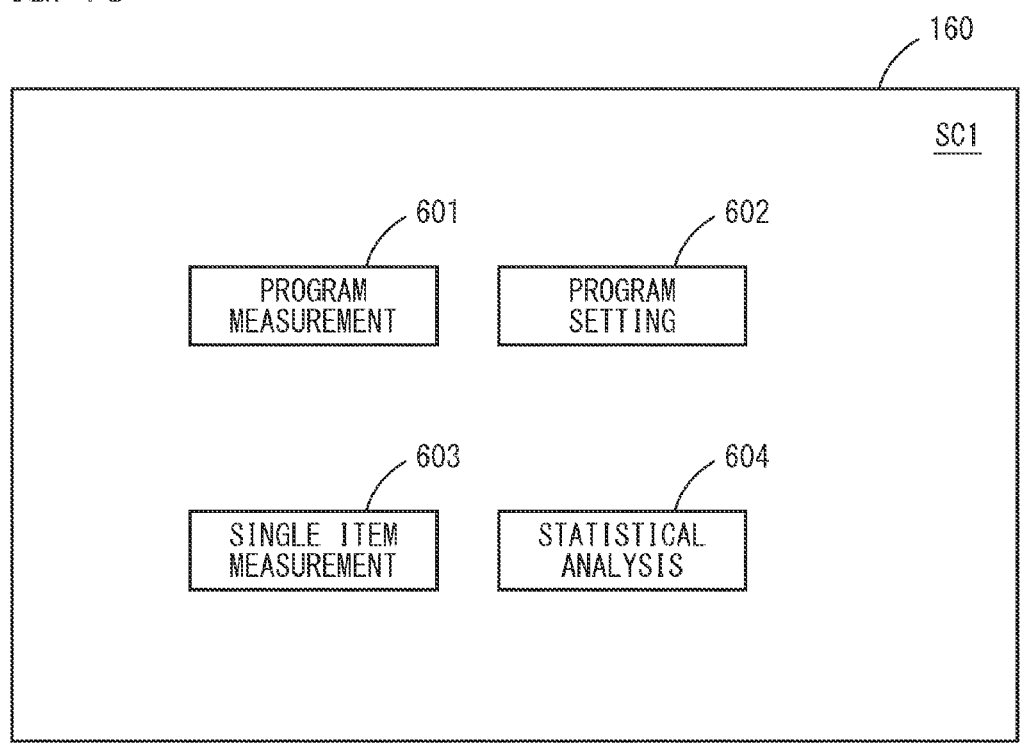
FIG. 15 is a view showing one example of an initial screen displayed on the display unit of the coordinate measuring device.

FIG. 15 is a view showing one example of an initial screen SC1 displayed on the display unit 160 of the coordinate measuring device 300. As shown in FIG. 15, a measurement button 601, a setting button 602, a single item measurement button 603, and a statistical analysis button 604 are displayed on the initial screen SC1 of the coordinate measuring device 300.

By the measurement manager operating the setting button 602, the control unit 220 of the coordinate measuring device 300 is operated in the setting mode. A description will be given of an example in which, in the setting mode, setting information is generated by the measurement manager measuring a distance between the two side surfaces Sa and Sb of the measurement target S of FIG. 8.

Figure 16:
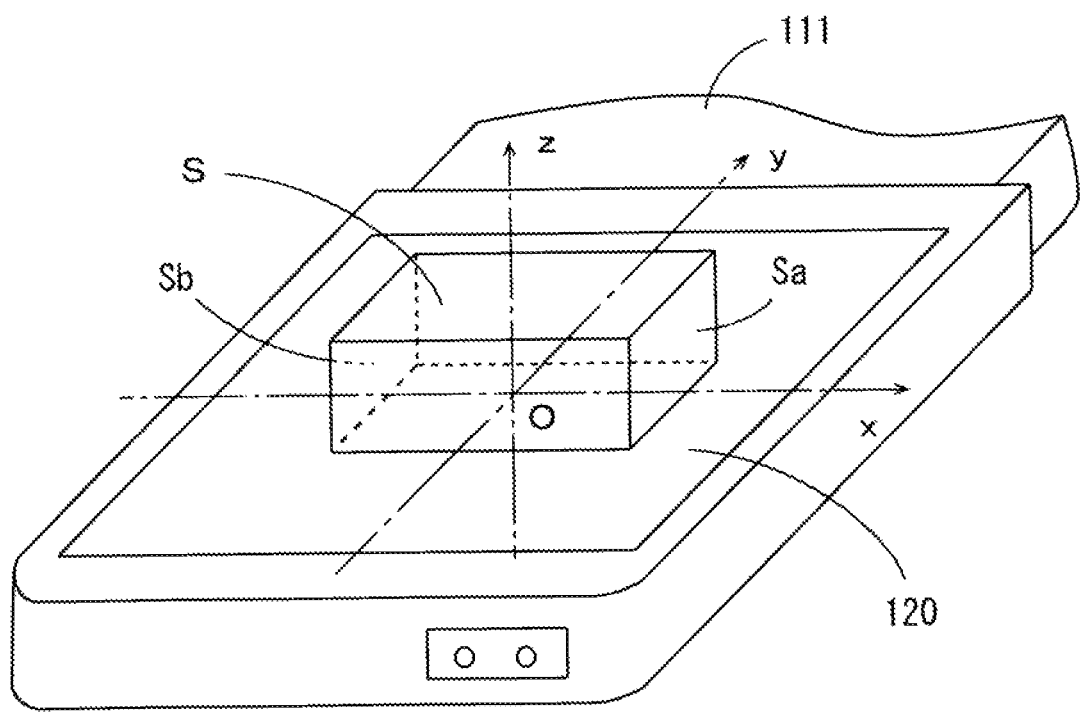
FIG. 16 is a view for describing one usage example of the coordinate measuring device in a setting mode.

FIGS. 16 to 27 are views for describing one usage example of the coordinate measuring device 300 in the setting mode. First, as shown in FIG. 16, the measurement manager places the measurement target S in a previously set position and attitude on the placement table 120.

Figure 17:
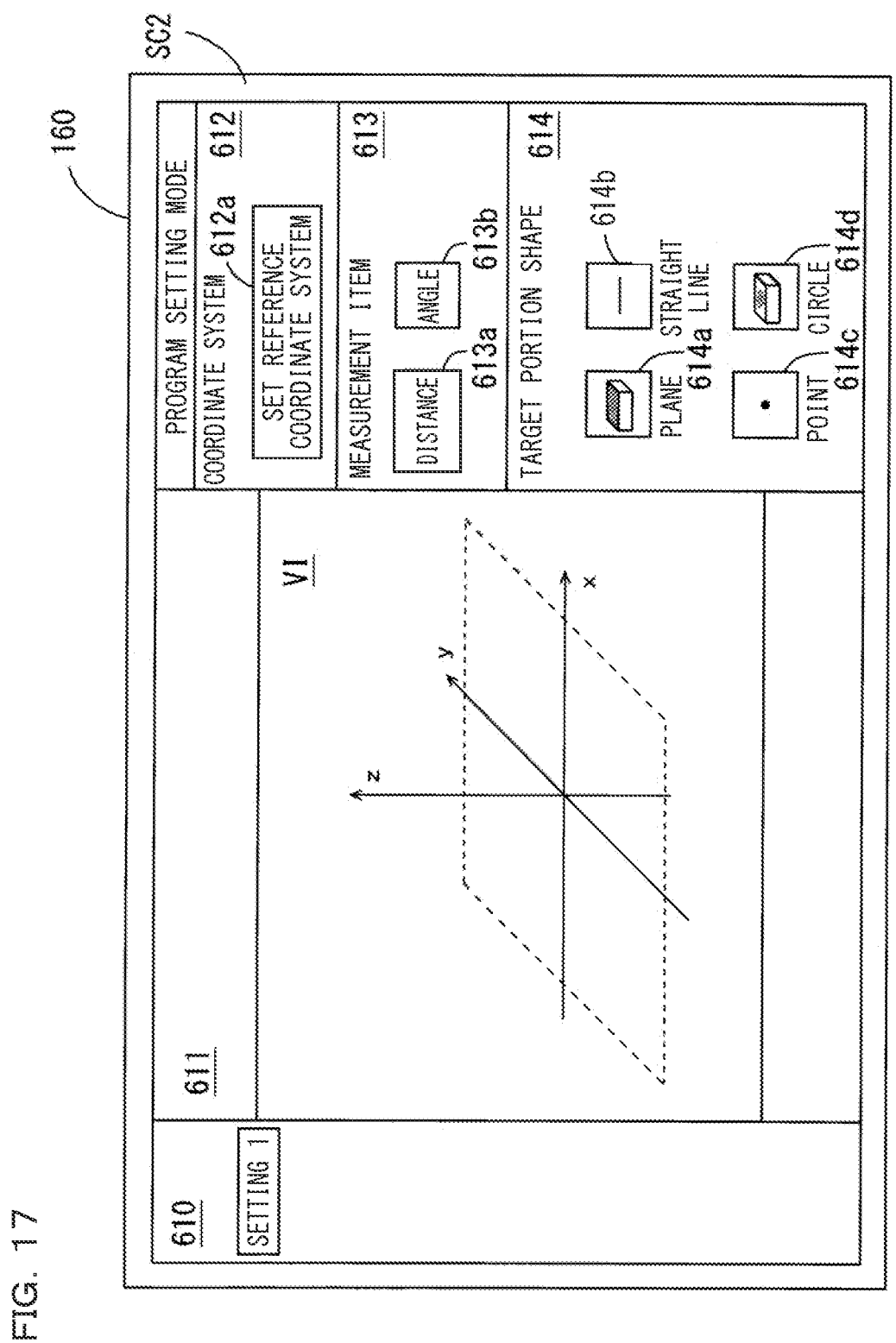
FIG. 17 is a view for describing one usage example of the coordinate measuring device in the setting mode.

By operation of the setting button 602 of FIG. 15, a measurement condition setting screen SC2 is displayed on the display unit 160 as shown in FIG. 17. The measurement condition setting screen SC2 includes a measurement element display field 610, a first image display field 611, a coordinate system setting field 612, a measurement item selection field 613, and a target portion shape selection field 614.

In the following description, a measurement target portion to be set for measuring a physical quantity of the measurement target S is appropriately referred to as a measurement element. In the measurement element display field 610, a measurement element and a measurement item that are set by the measurement manager are displayed in a tree list. Note that FIG. 17 shows an initial state of the setting mode. Hence, in the measurement element display field 610, for example, there is displayed only a character string "Setting 1" which shows that a setting operation for measuring a first physical quantity is being performed. The tree displayed in the measurement element display field 610 in the setting mode as described above is referred to as an element tree.

In the first image display field 611, the imaging-region virtual image VI is displayed. In the coordinate system setting field 612, a coordinate system setting button 612a for setting a reference coordinate system is displayed. When the coordinate system setting button 612a is not operated, the device coordinate system is set as the reference coordinate system.

A detail of the setting of the reference coordinate system by operation of the coordinate system setting button 612a will be described later.

In the measurement item selection field 613, a plurality of buttons respectively showing a plurality of kinds of physical quantities are displayed. In the example of FIG. 17, a distance button 613a and an angle button 613b are displayed in the measurement item selection field 613. The measurement manager operates the operation unit 230 of FIG. 1 to select either of the buttons in the measurement item selection field 613, and can thereby designate a measurement item.

In the target portion shape selection field 614, a plurality of buttons respectively showing a plurality of kinds of geometrical shapes are displayed. In the example of FIG. 17, a plane button 614a, a straight button 614b, a point button 614c, and a circle button 614d are displayed in the target portion shape selection field 614. The measurement manager operates the operation unit 230 of FIG. 1 to select any of the buttons in the target portion shape selection field 614, and can thereby designate the target portion shape.

In order to measure the distance between the two side surfaces Sa and Sb of the measurement target S, the measurement manager selects the distance button 613a in the measurement item selection field 613 and also selects the plane button 614a in the target portion shape selection field 614. Accordingly, measuring the distance between the two planes is set as the measurement condition for the measurement target S. In this example, the two planes to be set as measurement elements on the measurement condition are respectively referred to as "Plane 1" and "Plane 2".

Figure 18:
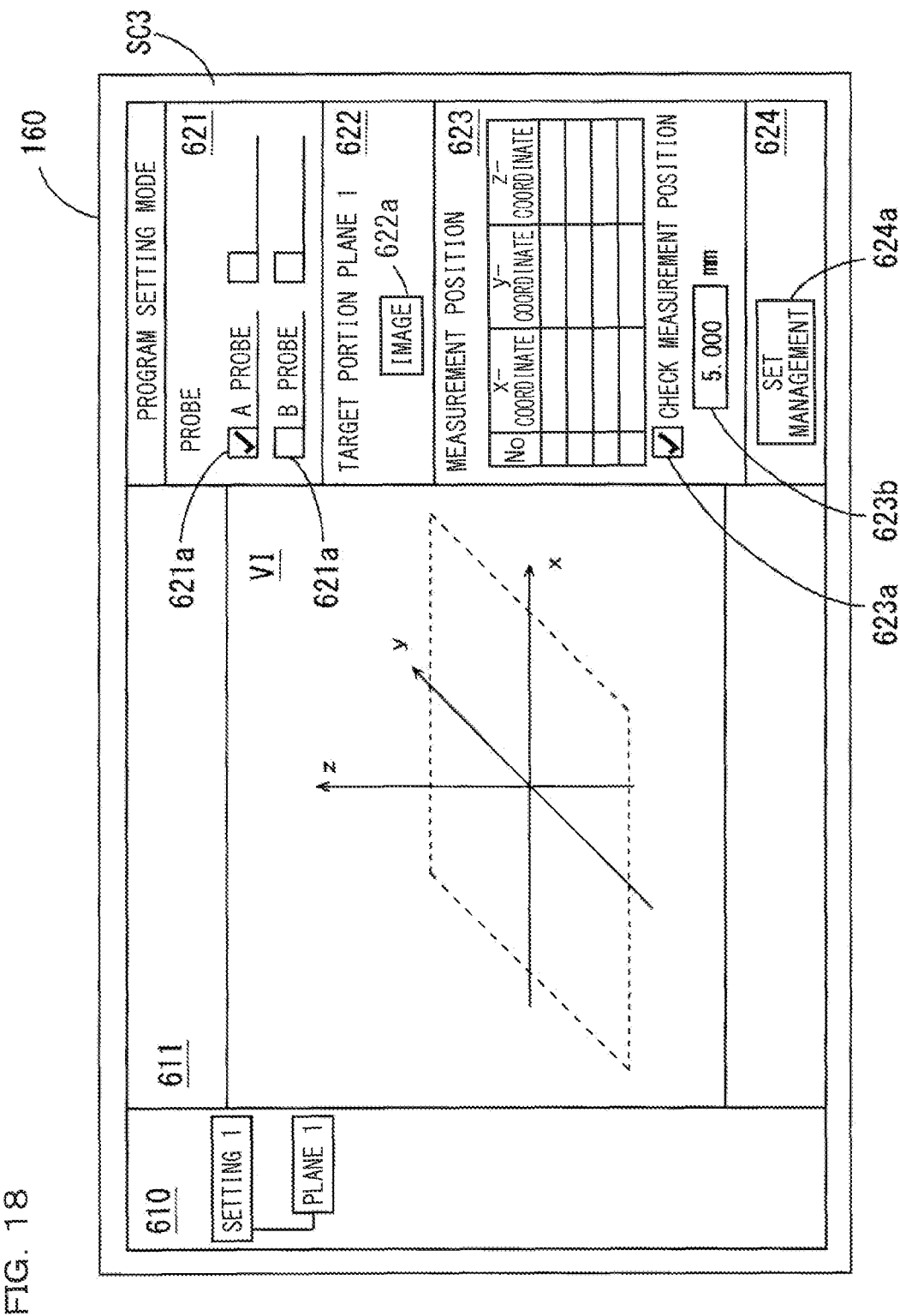
FIG. 18 is a view for describing one usage example of the coordinate measuring device in the setting mode.

When the measurement condition for the measurement target S is set, as shown in FIG. 18, a measurement procedure setting screen SC3 is displayed on the display unit 160.

The measurement procedure setting screen SC3 includes the measurement element display field 610, the first image display field 611, a probe selection field 621, a target portion display field 622, a measurement point coordinate display field 623, and a management setting field 624.

In the measurement element display field 610, the element tree of FIG. 17 is continuously displayed. By setting the measurement condition, a character string "Plane 1" showing a measurement element to be initially set is added to the element tree. In the element tree, at the time when the measurement manager sets a measurement element and at the time when a measurement result of the physical quantity is obtained, a character string showing the measurement element or the measurement item is sequentially added. The measurement manager views the element tree, and can thereby check a content of setting information being generated.

Note that, in the element tree, a measurement element being set by the measurement manager may be highlighted by enclosed characters or the like. In the example of FIG. 18, the character string "Plane 1" is enclosed.

In the first image display field 611, the imaging-region virtual image VI of FIG. 17 is continuously displayed. In the probe selection field 621, a plurality of check boxes 621a are displayed. At least one check box 621a out of the plurality of check boxes 621a is associated with the probe information stored in the storage unit 210. A character string showing the corresponding probe information is displayed on the side of the check box 621a associated with the probe information.

In this example, "A probe" and "B probe" are respectively displayed on the sides of two check boxes 621a. The measurement manager checks the check box 621a associated with the probe information, and can thereby set the probe 140 that is used for measurement. The setting of the probe 140 is performed with respect to each plane, for example. It is assumed that "A probe" is used for setting "Plane 1". In this case, as shown in FIG. 18, the measurement manager checks the check box 621a corresponding to "A probe".

In the target portion display field 622, a character string ("Plane 1" in this example) showing one out of the two planes to be set is displayed. Further, an imaging button 622a is displayed in the target portion display field 622. In the measurement point coordinate display field 623, a calculation result (coordinates) of the measurement position by the probe 140 is displayed. In the example of FIG. 18, since the operation of the probe 140 has not been performed, the calculation result of the measurement position is not displayed in the measurement point coordinate display field 623.

In the measurement point coordinate display field 623, one check box 623a and a numerical value input field 623b are further displayed. The check box 623a is for turning on and off a determination function. When the determination function is turned on, it is determined whether or not a deviation amount between the measurement position set in the measurement mode described later and the measurement position set in the setting mode is not larger than a threshold that is inputted into the numerical value input field 623b. Thereby, when the deviation amount is not larger than the threshold, it is possible to determine that the measurement position is valid. Further, when the deviation amount is larger than the threshold, it is possible to determine that the measurement position is invalid.

In the management setting field 624, a management setting button 624a for performing setting with regard to management of the measurement operation is displayed. A detail of the setting performed by operation of the management setting button 624*a* will be described later.

Figure 19:
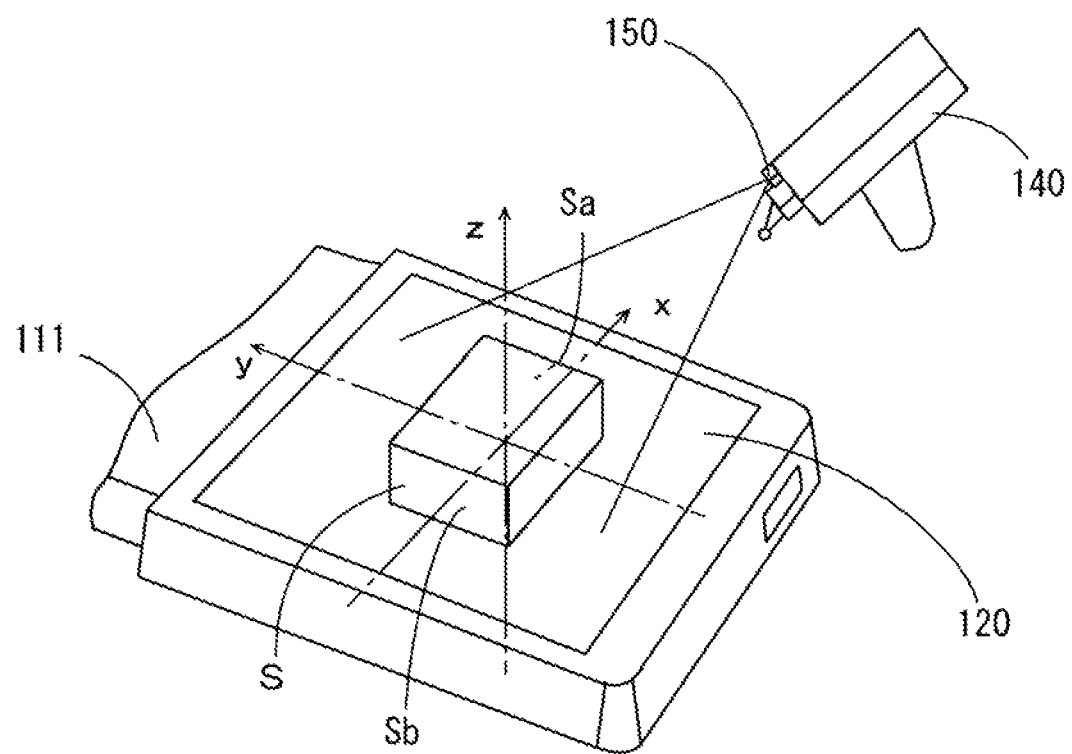
FIG. 19 is a view for describing one usage example of the coordinate measuring device in the setting mode.

The imaging button 622*a* of FIG. 18 is used for obtaining a captured image corresponding to "Plane 1". As shown in FIG. 19, the measurement manager adjusts the position and the attitude of the probe 140 such that an image of a plane (the side surface Sa of the measurement target S in this example) corresponding to "Plane 1" is captured by the sub-imaging unit 150. By the imaging button 622*a* being operated under this state, captured image data corresponding to "Plane 1" is acquired, and stored into the storage unit 210.

Note that an imaging button for commanding to store captured image data may be provided in the operation unit 170 of FIG. 2. In this case, the measurement manager may operate the imaging button of the operation unit 170 instead of operating the imaging button 622*a* displayed on the display unit 160.

Figure 20:
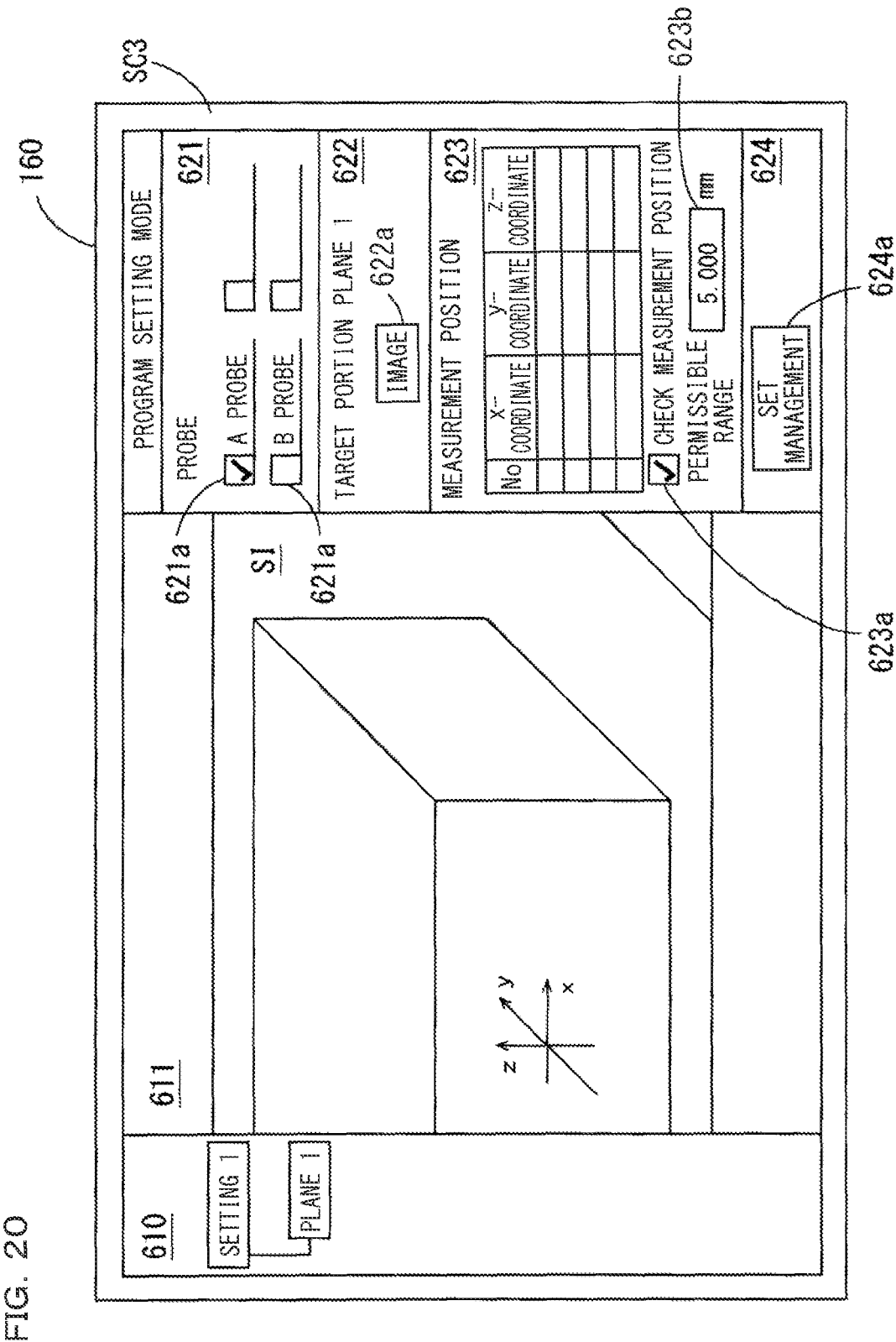
FIG. 20 is a view for describing one usage example of the coordinate measuring device in the setting mode.

As described above, by the imaging button 622*a* being operated, the captured image SI corresponding to "Plane 1" is displayed in the first image display field 611, as shown in FIG. 20. The captured image SI of FIG. 20 is a still image. The captured image SI of FIG. 20 includes an image showing the side surface Sa of the measurement target S, and also includes an image showing the x-axis, the y-axis, and the z-axis of the device coordinate system.

Thereafter, similarly to the example of FIGS. 9A and 9B, the measurement manager sequentially sets four measurement positions M1*a*, M2*a*, M3*a*, M4*a* (cf. FIG. 9B) on the side surface Sa of the measurement target S so as to specify "Plane 1".

Figure 21:
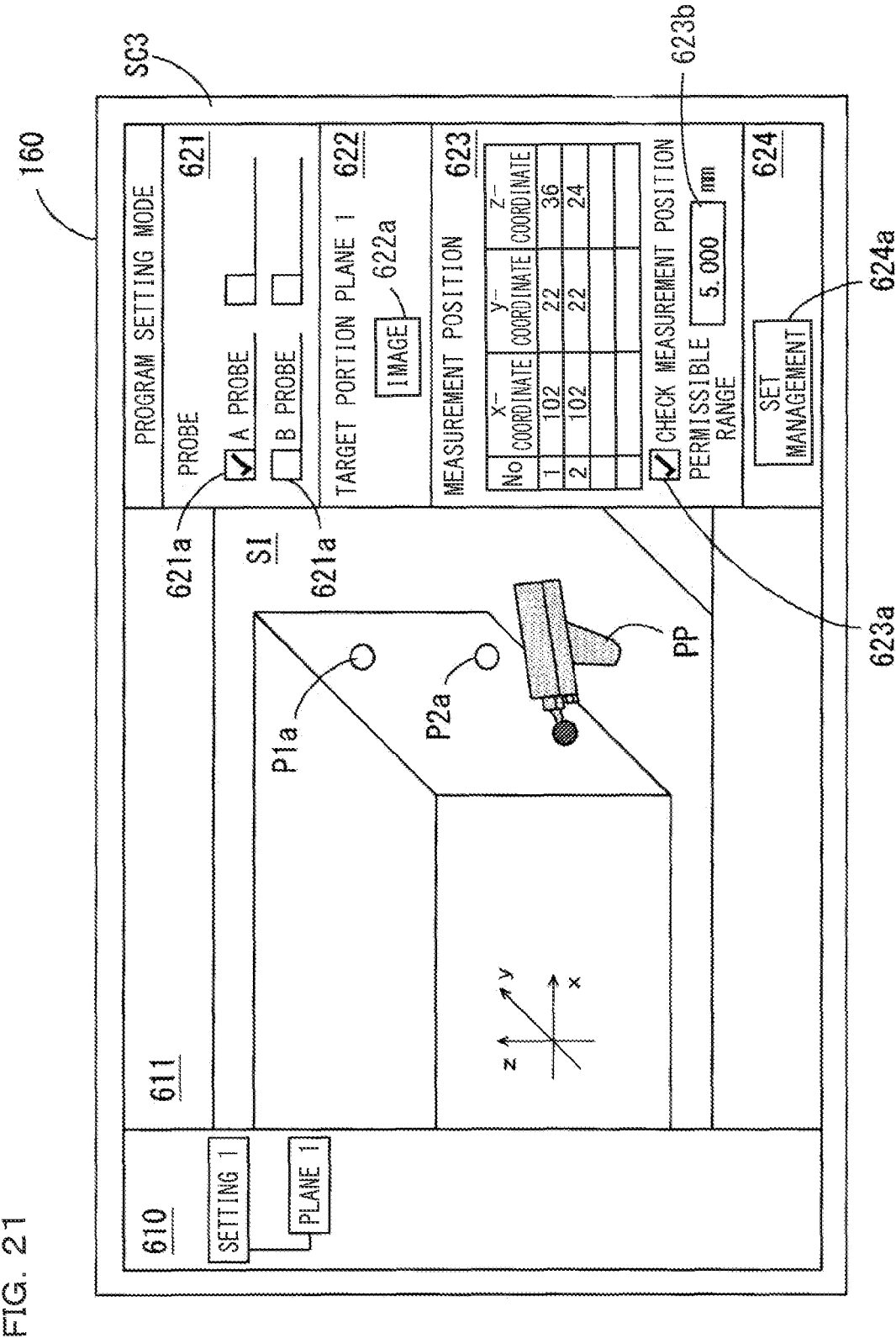
FIG. 21 is a view for describing one usage example of the coordinate measuring device in the setting mode.

At the time of setting the plurality of measurement positions M1*a*, M2*a*, M3*a*, M4*a*, an image showing the set measurement position is superimposed and displayed on the captured image SI in each measurement of the measurement position. FIG. 21 shows a display state of the display unit 160 at the time when the measurement positions M1*a*, M2*a* are set. In the example of FIG. 21, by the measurement positions M1*a*, M2*a* being set, spherical images P1*a*, P2*a* representing the measurement positions M1*a*, M2*a* are displayed on the captured image SI.

Further, at the time of setting the plurality of measurement positions M1*a*, M2*a*, M3*a*, M4*a*, an image PP showing the position of the contact part 144*a* is displayed on the captured image SI. In this example, a schematic view of the probe 140 is used as the image PP showing the position of the contact part 144*a*. This allows the measurement manager to easily and accurately recognize the positional relationship of the contact part 144*a* with respect to the measurement target S.

By completion of setting of the plurality of measurement positions M1*a* to M4*a*, the measurement target portion in the measurement target S which passes the plurality of measurement positions M1*a* to M4*a* and has the shape designated on the measurement condition is set as the measurement plane ML1 for specifying "Plane 1", and the position of the measurement plane ML1 is calculated.

Figure 22:
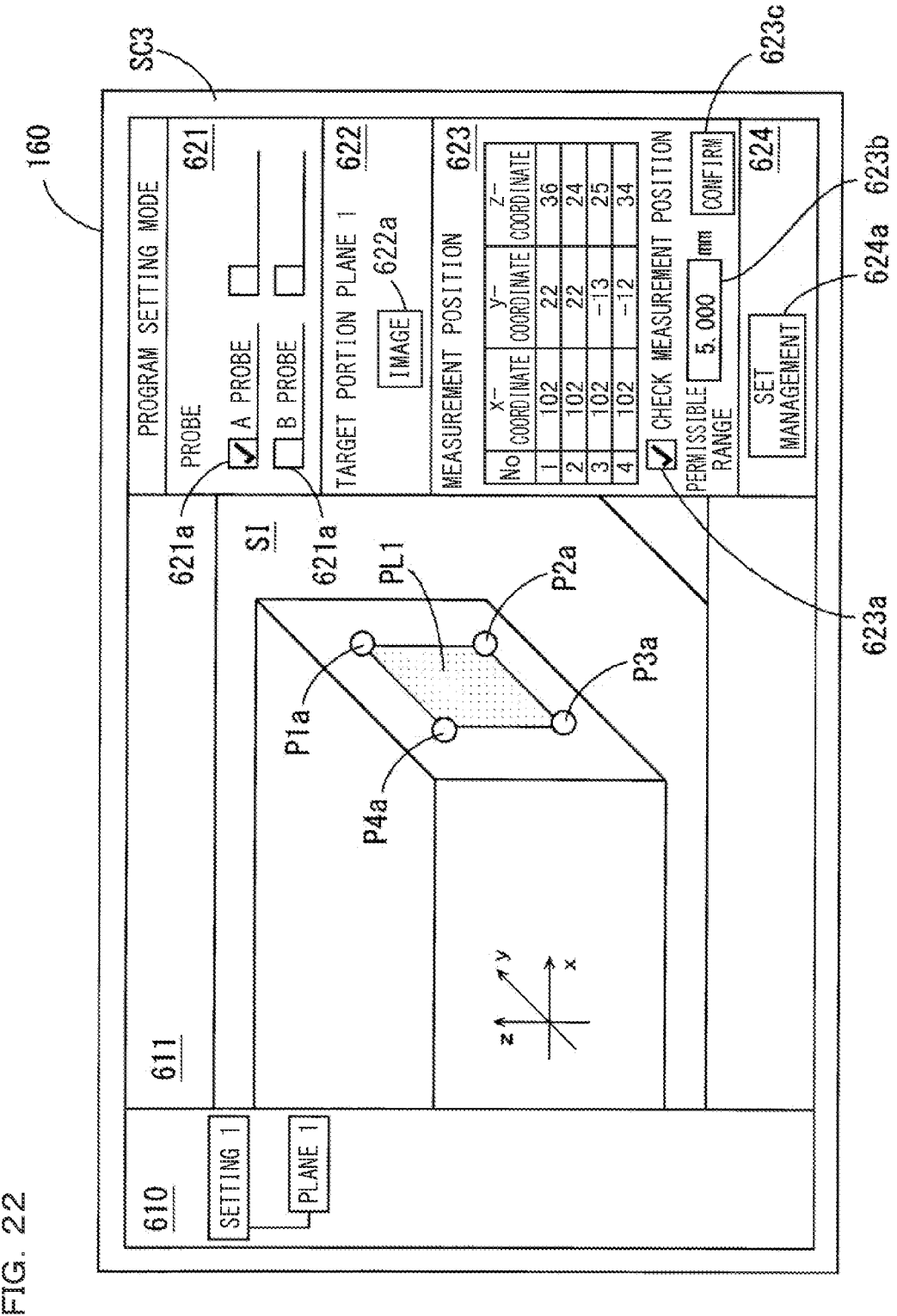
FIG. 22 is a view for describing one usage example of the coordinate measuring device in the setting mode.

In this case, as shown in FIG. 22, a figure PL1 showing the position and the shape of the measurement plane ML1 is displayed on the captured image SI along with the images P1*a*, P2*a*, P3*a*, P4*a* showing the plurality of measurement positions M1*a*, M2*a*, M3*a*, M4*a*. At the time of setting the measurement plane ML1, a confirm button 623*c* is displayed in the measurement point coordinate display field 623.

Figure 23:
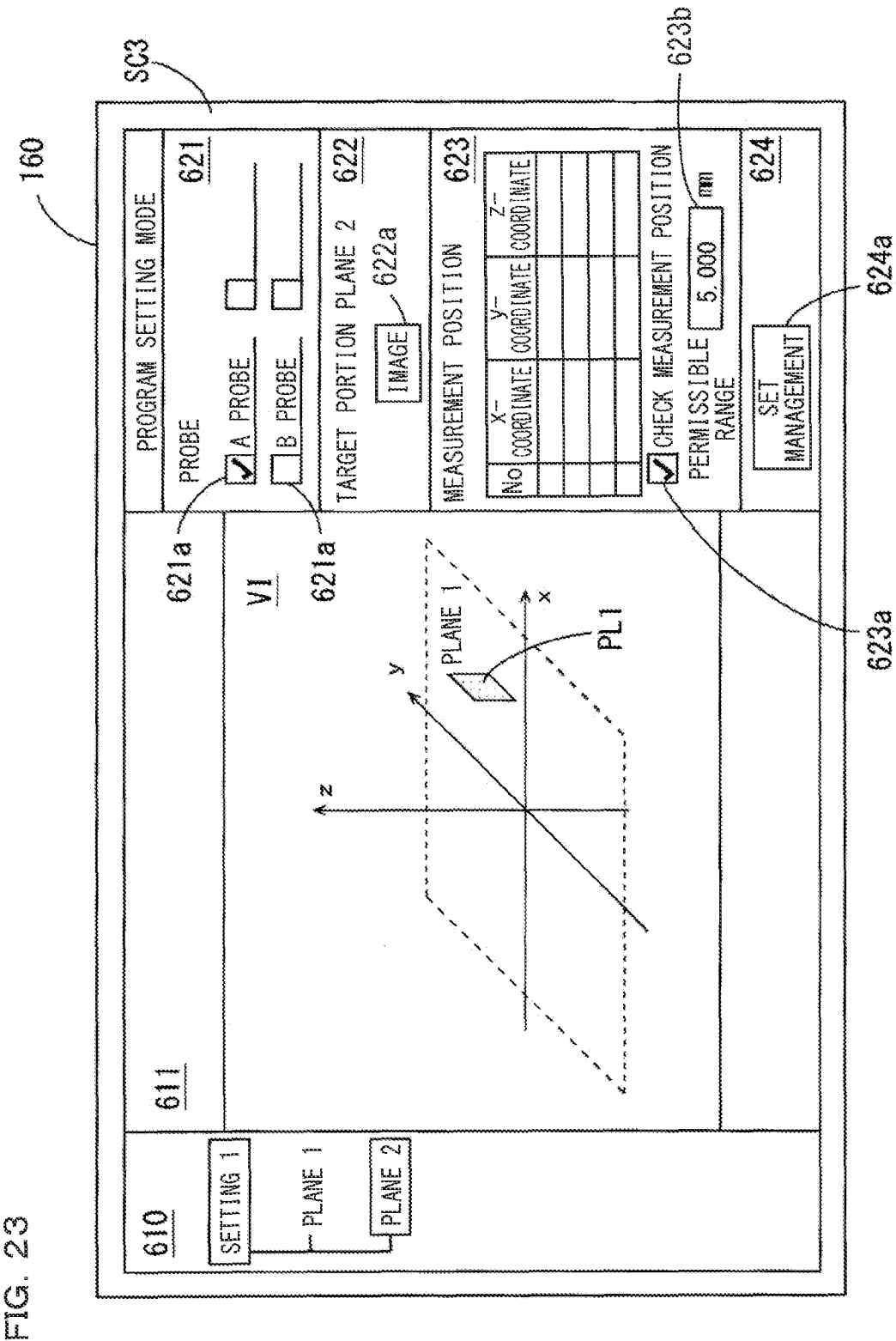
FIG. 23 is a view for describing one usage example of the coordinate measuring device in the setting mode.

After setting the measurement plane ML1, the measurement manager operates the confirm button 623*c*. Thereby, as shown in FIG. 23, the imaging-region virtual image VI is displayed in the first image display field 611. At this time, the figure PL1 showing the already set measurement plane ML1 is displayed on the imaging-region virtual image VI. Further, the character string "Plane 2" showing the measurement element to be set next is added to the element tree in the measurement element display field 610. At this time, in the element tree, the character string "Plane 1" is displayed in a normal manner, and the character string "Plane 2" is highlighted.

Subsequently, the measurement plane ML2 is set. In the target portion display field 622, the character string ("Plane 2" in this example) showing the other of the two planes to be set is displayed. Similarly to the example of FIG. 18, the imaging button 622*a* is displayed in the target portion display field 622.

It is assumed here that "B probe" is used for setting "Plane 2". In this case, as shown in FIG. 24, the measurement manager checks the check box 621*a* corresponding to "B probe".

Figure 24:
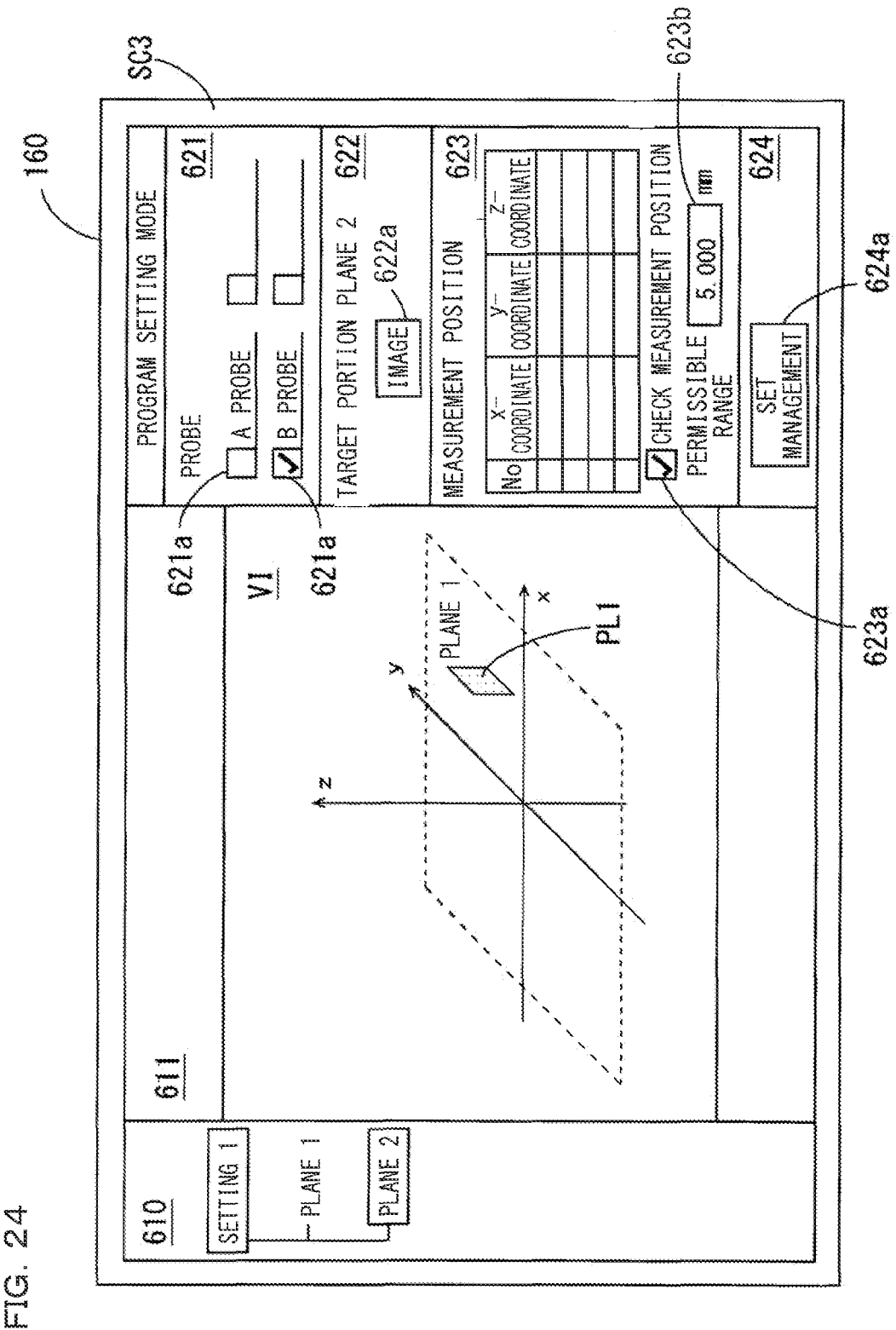
FIG. 24 is a view for describing one usage example of the coordinate measuring device in the setting mode.

The imaging button 622*a* of FIG. 24 is used for obtaining a captured image corresponding to "Plane 2". The measurement manager adjusts the position and the attitude of the probe 140 such that an image of a plane (the side surface Sb of the measurement target S in this example) corresponding to "Plane 2" is captured by the sub-imaging unit 150. By the imaging button 622*a* being operated under this state, captured image data corresponding to "Plane 2" is acquired, and stored into the storage unit 210.

As described above, by the imaging button 622*a* being operated, the captured image SI corresponding to "Plane 2" is displayed in the first image display field 611. Thereafter, similarly to the example of FIGS. 11A and 11B, the measurement manager sequentially sets four measurement positions M1*b*, M2*b*, M3*b*, M4*b* (cf. FIG. 11B) on the side surface Sb of the measurement target S so as to specify "Plane 2". At the time of setting the measurement positions M1*b* to M4*b*, similarly to the example of FIG. 21, spherical images representing the set measurement positions and an image showing the position of the contact part 144*a* are displayed on the captured image SI.

By completion of setting of the plurality of measurement positions M1*b* to M4*b*, the measurement target portion in the measurement target S which passes the plurality of measurement positions M1*b* to M4*b* and has the shape designated on the measurement condition is set as the measurement plane ML2 for specifying "Plane 2", and the position of the measurement plane ML2 is calculated.

Figure 25:
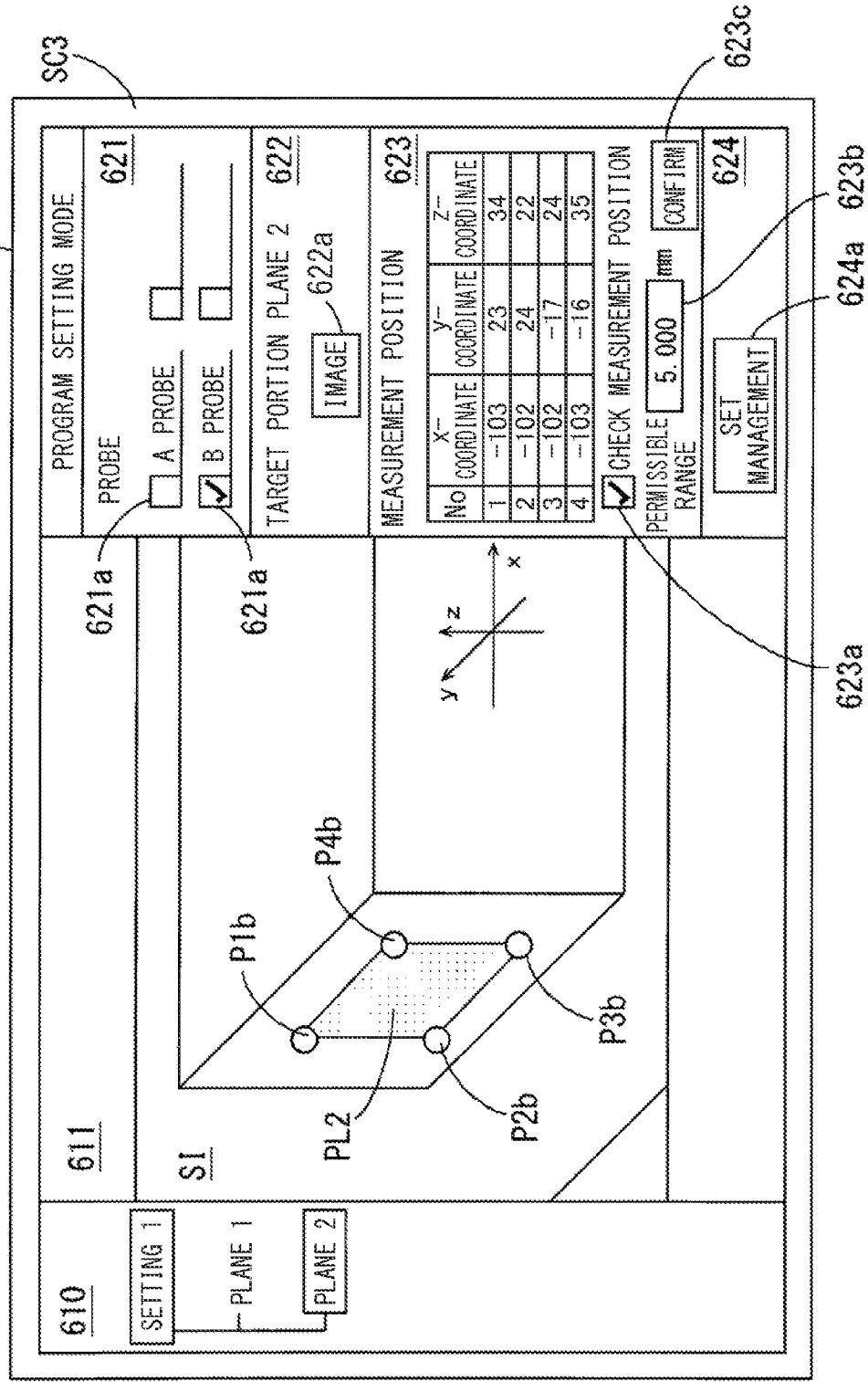
FIG. 25 is a view for describing one usage example of the coordinate measuring device in the setting mode.

In this case, as shown in FIG. 25, the figure PL2 showing the position and the shape of the measurement plane ML2 is displayed on the captured image SI along with the images P1*b*, P2*b*, P3*b*, P4*b* showing the plurality of measurement positions M1*b*, M2*b*, M3*b*, M4*b*. At the time of setting the measurement plane ML2, the confirm button 623*c* is displayed in the measurement point coordinate display field 623.

Figure 26:
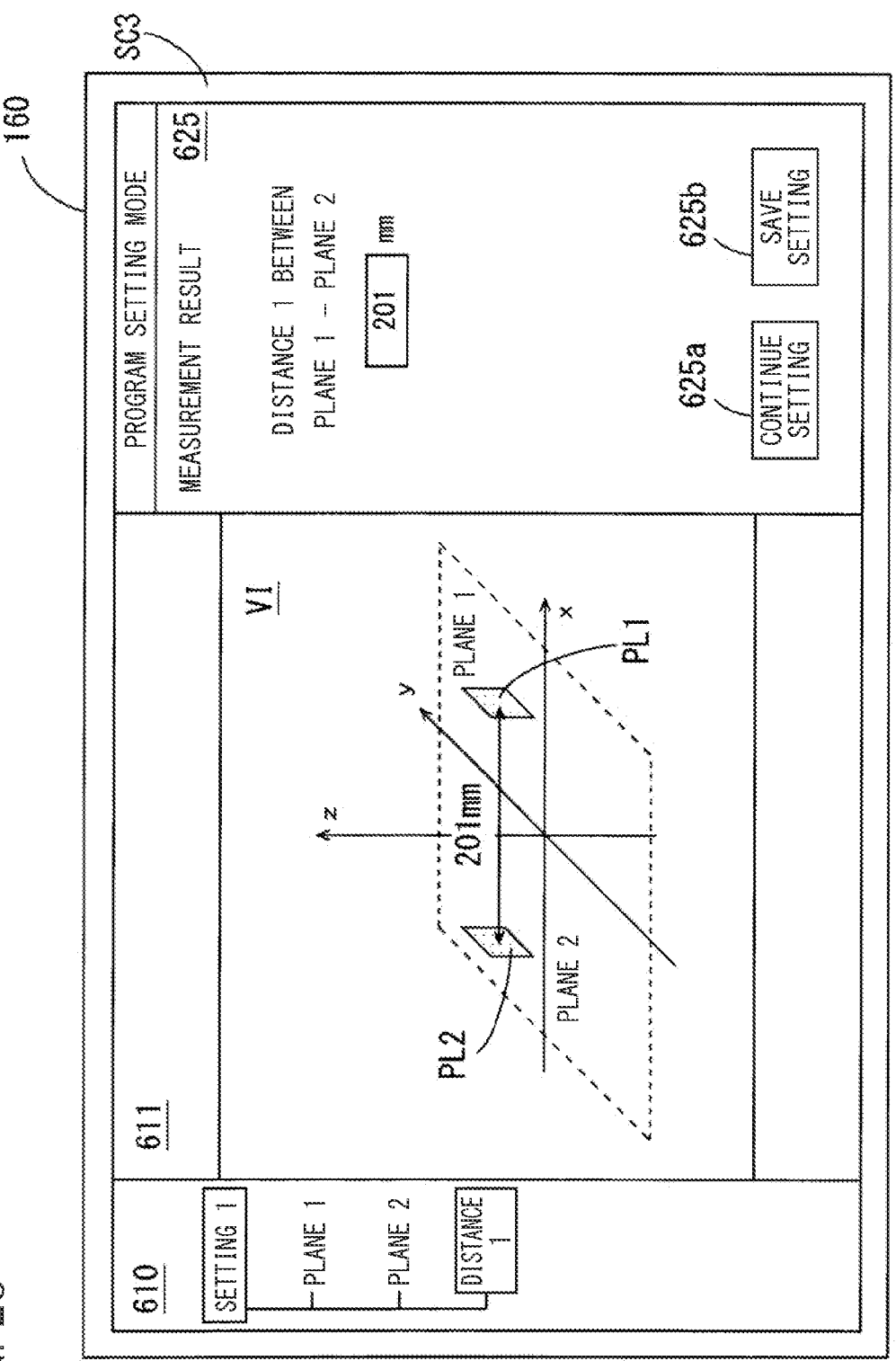
FIG. 26 is a view for describing one usage example of the coordinate measuring device in the setting mode.

After setting the measurement plane ML2, the measurement manager operates the confirm button 623*c*. Thereby, as shown in FIG. 26, the imaging-region virtual image VI is displayed in the first image display field 611. At this time, the figures PL1 and PL2 showing the set measurement planes ML1 and ML2 are displayed on the imaging-region virtual image VI. Further, a distance between the set measurement planes ML1 and ML2 is calculated, and the calculated distance is superimposed and displayed as a measurement result on the imaging-region virtual image VI.

Moreover, a character string "Distance 1" showing a measurement item of the physical quantity obtained by setting "Plane 1" and "Plane 2" is added to the element tree in the measurement element display field 610. At this time, in the element tree, the character string "Plane 1" and the character string "Plane 2" are displayed in a normal manner, and the character string "Distance 1" is highlighted.

Further, on the screen of the display unit 160, a measurement result display field 625 is displayed in place of the probe selection field 621, the target portion display field 622, the measurement point coordinate display field 623, and the management setting field 624 of FIG. 25. In the measurement result display field 625, the distance between "Plane 1" and "Plane 2" is displayed as a measurement result, and a setting continuation button 625a and a setting saving button 625b are also displayed.

The measurement manager operates the setting continuation button 625a when he or she desires to also set measurement of another physical quantity of the measurement target S. In this case, the measurement condition setting screen SC2 of FIG. 17 is displayed again. This allows the measurement manager to perform the setting operation in a procedure similar to that in the above example. In the case where the measurement condition setting screen SC2 is re-displayed, for example, a character string "Setting 2" showing that a setting operation for measuring a second physical quantity is being performed is displayed in the measurement element display field 610.

Finally, the measurement manager operates the setting saving button 625b of FIG. 26. Thereby, the measurement condition, the positional figure information, the probe information of the probe 140 used for setting "Plane 1", the probe information of the probe 140 used for setting "Plane 2", setting information including the captured image data corresponding to "Plane 1" and the captured image data corresponding to "Plane 2" are generated as one data file by the control unit 220, and stored into the storage unit 210 of FIG. 1. At this time, a specific file name is given to the setting information that is stored into the storage unit 210.

Note that the positional figure information of this example includes information showing a setting sequence (measurement procedure) of the plurality of measurement positions M1A to M4a and M1b to M4b, the positions of the plurality of measurement positions M1a to M4a and M1b to M4b, and the positions and the shapes of the two measurement planes ML1 and ML2. Thereafter, the initial screen SC1 of FIG. 15 is displayed on the screen of the display unit 160.

Figure 27:
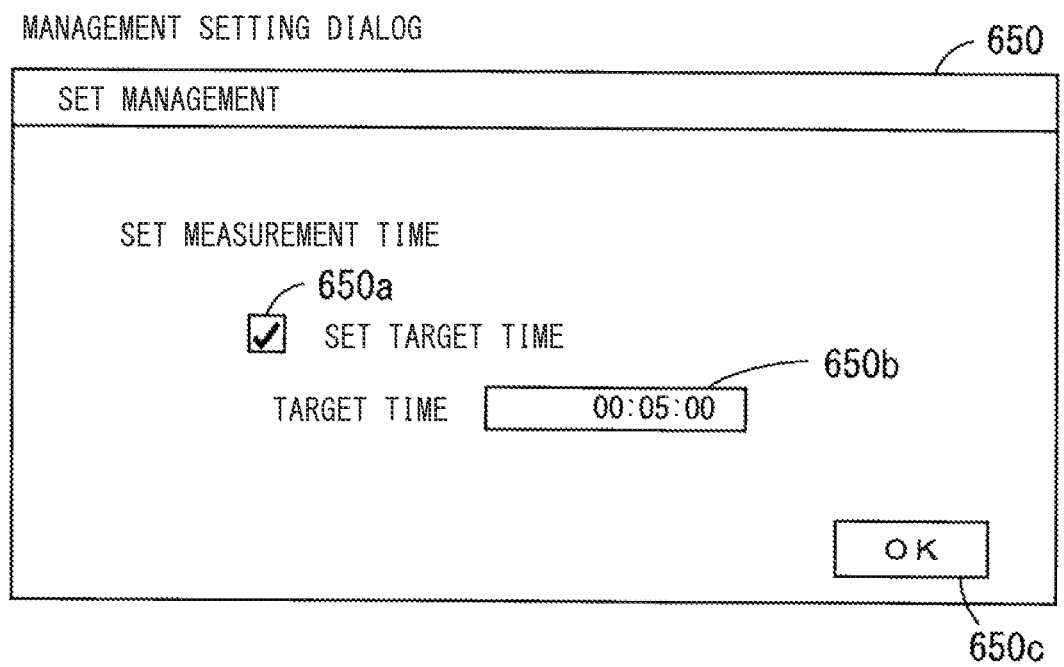
FIG. 27 is a view for describing one usage example of the coordinate measuring device in the setting mode.

Here, a description will be given in detail of setting in the case where the management setting button 624a of FIG. 18 is operated. When the measurement manager operates the management setting button 624a of FIG. 18, a management setting dialog 650 of FIG. 27 is displayed on the screen of the display unit 160.

One check box 650a, a time input field 650b, and an OK button 650c are displayed in the management setting dialog 650. The check box 650a is for setting target time for the measurement operation in the measurement mode described later. By the check box 650a being checked, the time that is inputted into the time input field 650b is displayed as the target time on the screen of the display unit 160 during the measurement operation in the measurement mode. By the OK button 650c being operated, the display of the management setting dialog 650 is completed.

(6-3) Measurement mode

By the measurement operator operating the measurement button 601 of FIG. 15, the control unit 220 of the coordinate measuring device 300 is operated in the measurement mode. In the measurement mode, the measurement operator measures the measurement target S. Similarly to the example of FIG. 16, the measurement operator places a new measurement target S in a previously set position and attitude on the placement table 120.

Figure 28:
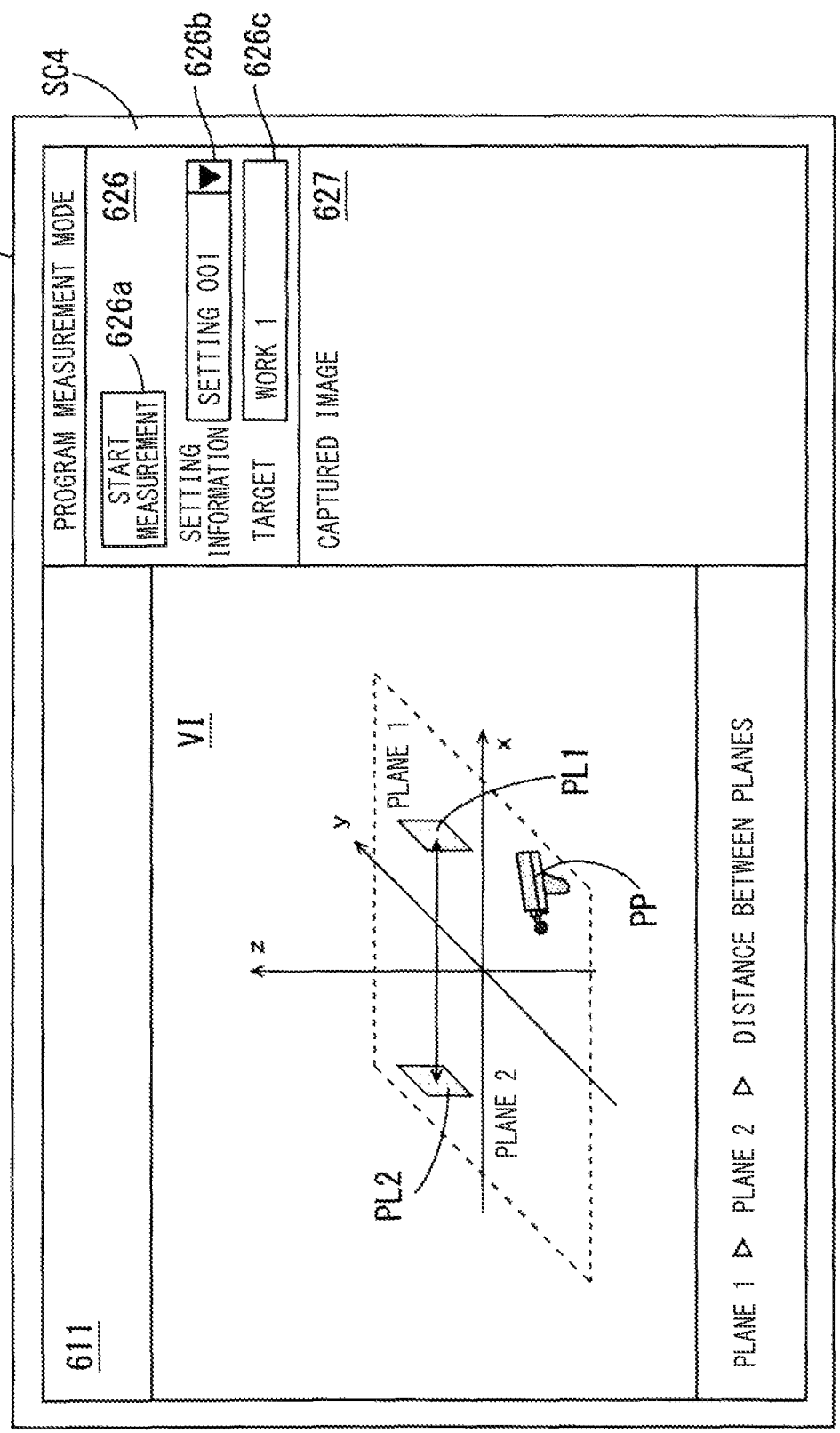
FIG. 28 is a view for describing one usage example of the coordinate measuring device in a measurement mode.

FIGS. 28 to 32 are views for describing one usage example of the coordinate measuring device 300 in the measurement mode. By start of the operation of the measurement mode, an actual measurement screen SC4 is displayed on the display unit 160, as shown in FIG. 28. The first image display field 611, a measurement operation field 626, and a second image display field 627 are displayed on the actual measurement screen SC4.

A measurement start button 626a, a pull-down menu 626b, and a target name input field 626c are displayed in the measurement operation field 626. When the pull-down menu 626b is operated, one or a plurality of file names of the setting information stored in the storage unit 210 of FIG. 1 are displayed. In this case, by the measurement operator selecting one file name in accordance with an instruction by the measurement manager, the selected setting information is read by the control unit 220 of FIG. 1. In this example, it is assumed that the setting information set in the above setting mode is read. In the target name input field 626c, a name or the like of the measurement target S that is actually measured is inputted.

In the first image display field 611 of FIG. 28, the imaging-region virtual image VI is displayed. In the imaging-region virtual image VI, there are displayed the x-axis, the y-axis, and the z-axis of the device coordinate system, the figures PL1 and PL2 showing the measurement planes ML1 and ML2 set in the setting mode, and an arrow showing the distance between the measurement planes ML1 and ML2. Further, a measurement procedure for the measurement planes ML1 and ML2 is displayed below the imaging-region virtual image VI.

The measurement procedure displayed below the imaging-region virtual image VI is displayed by reflecting the setting procedure for the measurement element in the setting mode. The display of the measurement procedure of FIG. 28, for example, corresponds to the element tree shown in the measurement element display field 610 of FIG. 26.

Accordingly, the measurement operator views the first image display field 611, and can thereby easily recognize in what procedure the distance between "Plane 1" and "Plane 2" specified by the measurement planes ML1 and ML2 is to be measured. Further, the image PP showing the position of the contact part 144a of the probe 140 is displayed on the imaging-region virtual image VI. At this time, an image is not displayed in the second image display field 627.

Figure 29:
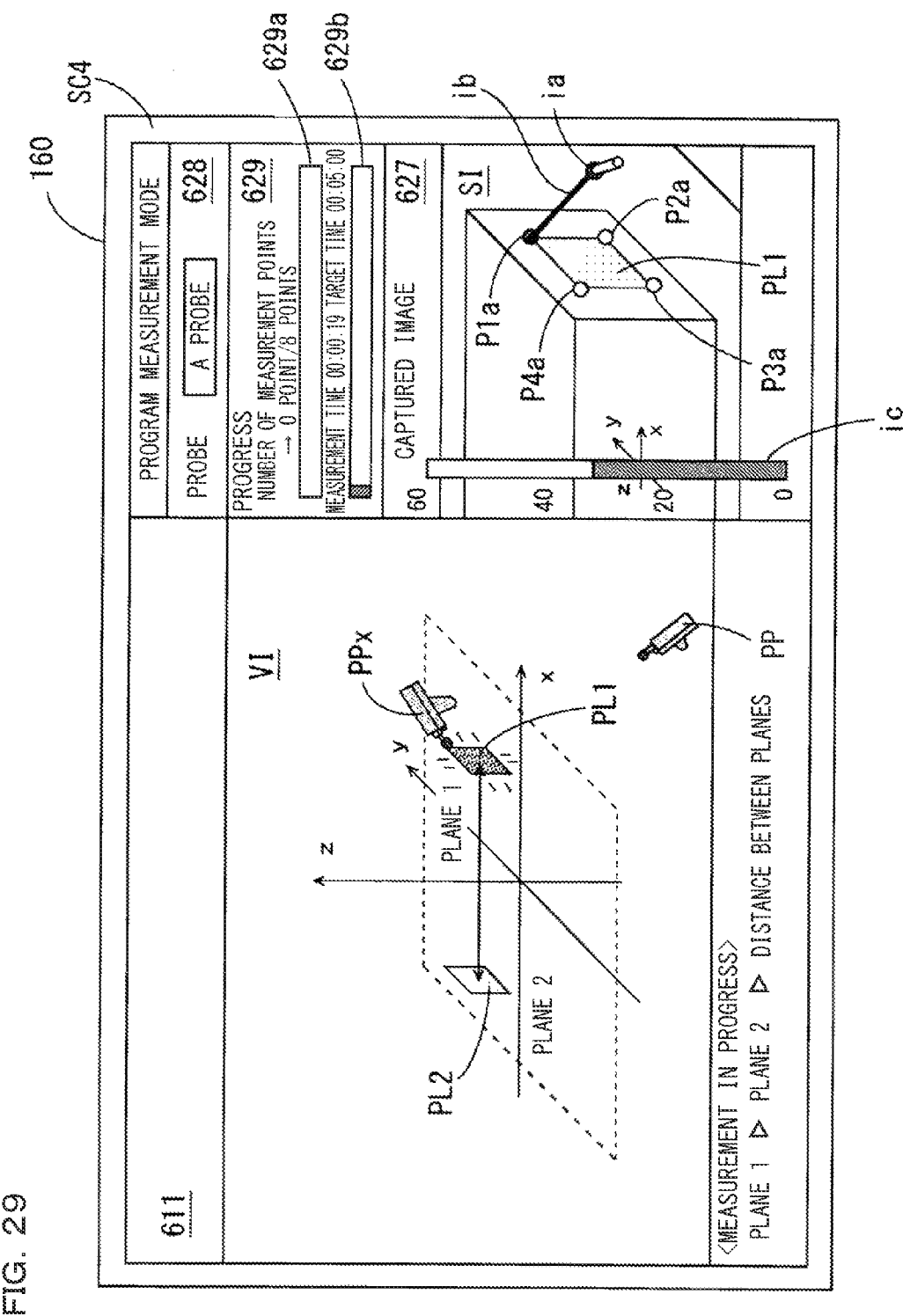
FIG. 29 is a view for describing one usage example of the coordinate measuring device in the measurement mode.

Next, the measurement operator operates the measurement start button 626a of FIG. 28. In this case, as shown in FIG. 29, a probe display field 628 and a progress level display field 629 are displayed on the actual measurement screen SC4 in place of the measurement operation field 626 of FIG. 28. In the probe display field 628, a character string showing the probe 140 ("A probe" in this example) to be currently used is displayed. In the progress level display field 629, there are displayed a character string and an indicator 629a which show a rate of the number of already set measurement positions with respect to the number of measurement positions to be set. Further, when the target time of FIG. 27 has been set, the elapsed time from the start of measurement and the target time are displayed. Moreover, an indicator 629b showing a rate of the elapsed time with respect to the target time is displayed. The indicators 629a, 629b represent the respective rates by bar charts.

Meanwhile, in the first image display field 611, the figure PL1 showing the measurement plane ML1 of "Plane 1" to be initially set is highlighted as shown in FIG. 29. Further, in the measurement procedure displayed below the imaging-region virtual image VI, a character string "<Measurement in Progress>" is added to a portion above "Plane 1". Moreover, in the second image display field 627, the captured image SI corresponding to "Plane 1" is displayed. At this time, similarly to the example of FIG. 22, the figure PL1 showing the measurement plane ML1 set in the setting mode is displayed on the captured image SI along with the x-axis, the y-axis, and the z-axis. The measurement operator views the figure PL1 on the captured image SI, and can thereby recognize which portion in the measurement target S is to be measured.

Further, similarly to the example of FIG. 22, the images P1a, P2a, P3a, P4a showing the measurement positions M1a, M2a, M3a, M4a set in the setting mode are displayed on the captured image SI. The measurement operator views the images P1a, P2a, P3a, P4a on the captured image SI, and can thereby easily and accurately recognize in which portion in the measurement target S the measurement position is to be set.

The read setting information includes the measurement procedure for the plurality of measurement positions M1a, M2a, M3a, M4a by the measurement manager. For this reason, in the captured image SI, each time the measurement operation progresses, the image showing the measurement position to be currently set by the measurement operator is displayed in a display form different from the images showing the other measurement positions.

Examples of the display form include a color, a shape, and the like of the image. In this example, the image P1a showing the measurement position M1a to be currently set is displayed in a color (black) different from a color (white) of the images P2a, P3a, P4a showing the other measurement positions M2a, M3a, M4a. Accordingly, the measurement operator can easily recognize the measurement position to be currently set.

Further, on the captured image SI, an image is showing the position of the contact part 144a of the probe 140 is displayed, and an image ib showing a straight line connecting the contact part 144a and the measurement position to be currently set is also displayed. Accordingly, the measurement operator can easily recognize in which direction the contact part 144a is to be moved with respect to the measurement target S.

Further, an indicator ic showing the distance from the contact part 144a of the probe 140 to the measurement position to be currently set is displayed on the captured image SI. The measurement operator views the indicator ic, and can thereby accurately recognize the distance from the contact part 144a to the measurement position to be currently set. This allows the measurement operator to easily and accurately bring the contact part 144a into contact with the measurement position of the measurement target S.

The indicator ic of this example represents the distance from the measurement position to be currently set to the contact part 144a by a bar graph. The present invention is not limited thereto, and the indicator ic may represent the distance from the contact part 144a to the measurement position to be currently set by a numerical value.

This allows the measurement operator to easily and accurately set the measurement plane ML1 that specifies "Plane 1" while viewing the captured image SI displayed in the second image display field 627 of FIG. 29.

In the first image display field 611 during the measurement mode, as shown in FIG. 29, there may be displayed an image PPx showing an ideal position and attitude of the probe 140 for bringing the contact part 144a into contact with the measurement position to be currently set, along with the image PP showing the current position of the contact part 144a.

In the example of FIG. 29, the schematic view of the probe 140 is used as the image PPx. In this case, the measurement operator views the image PPx, and can thereby easily recognize the measurement position to be currently set. Further, the measurement operator can easily recognize the ideal attitude of the probe 140 for accurately setting the measurement position to be currently set.

Figure 30:
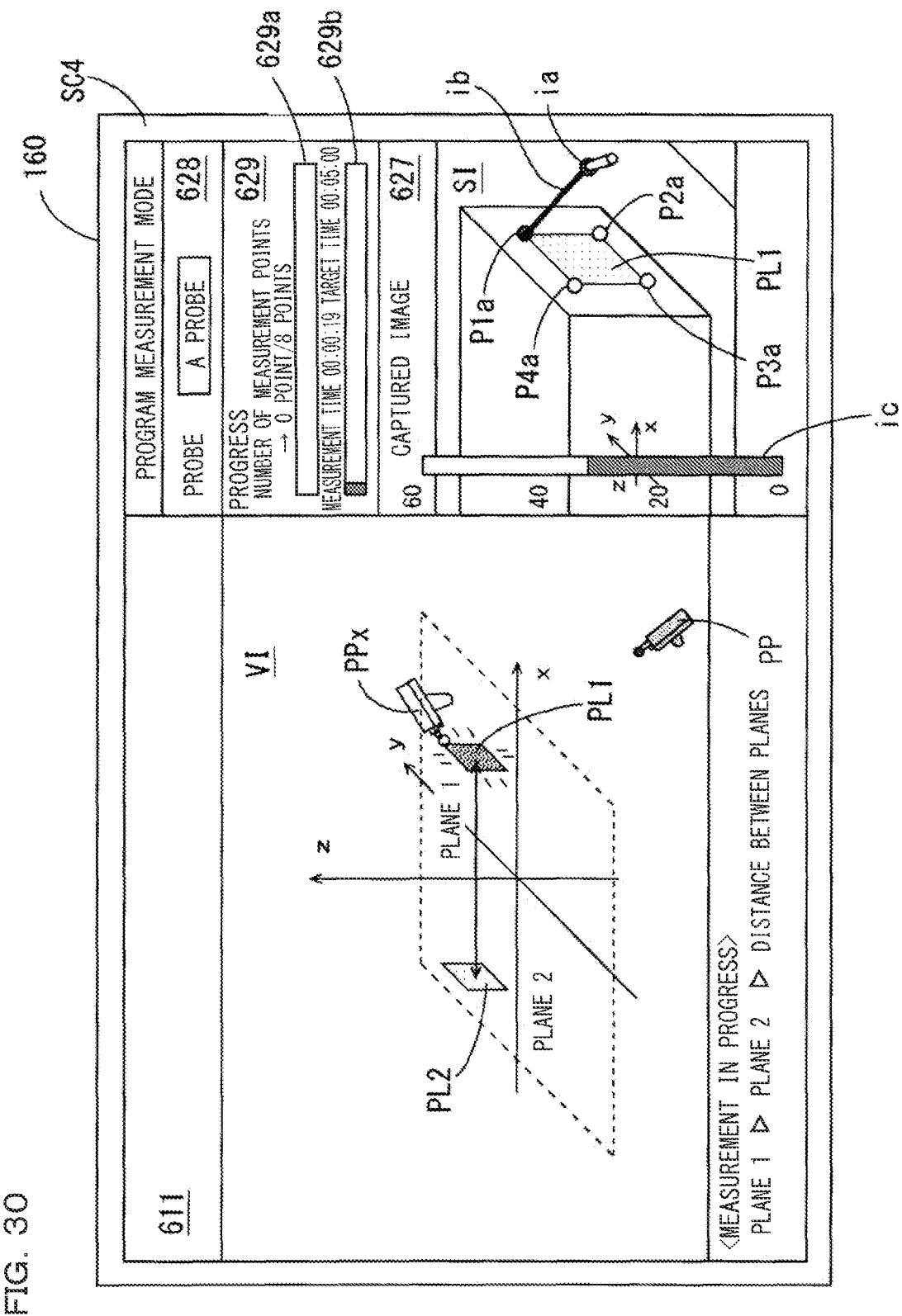
FIG. 30 is a view for describing one usage example of the coordinate measuring device in the measurement mode.

Here, in the first image display field 611, for example as shown in FIGS. 29 and 30, the image PP may be constantly displayed in black, and the image PPx may be displayed blinking alternately in black and white (or yellow). In this case, the measurement operator views the respective display forms of the images PP, PPx, and can thereby easily distinguish between the images PP, PPx.

Figure 31:
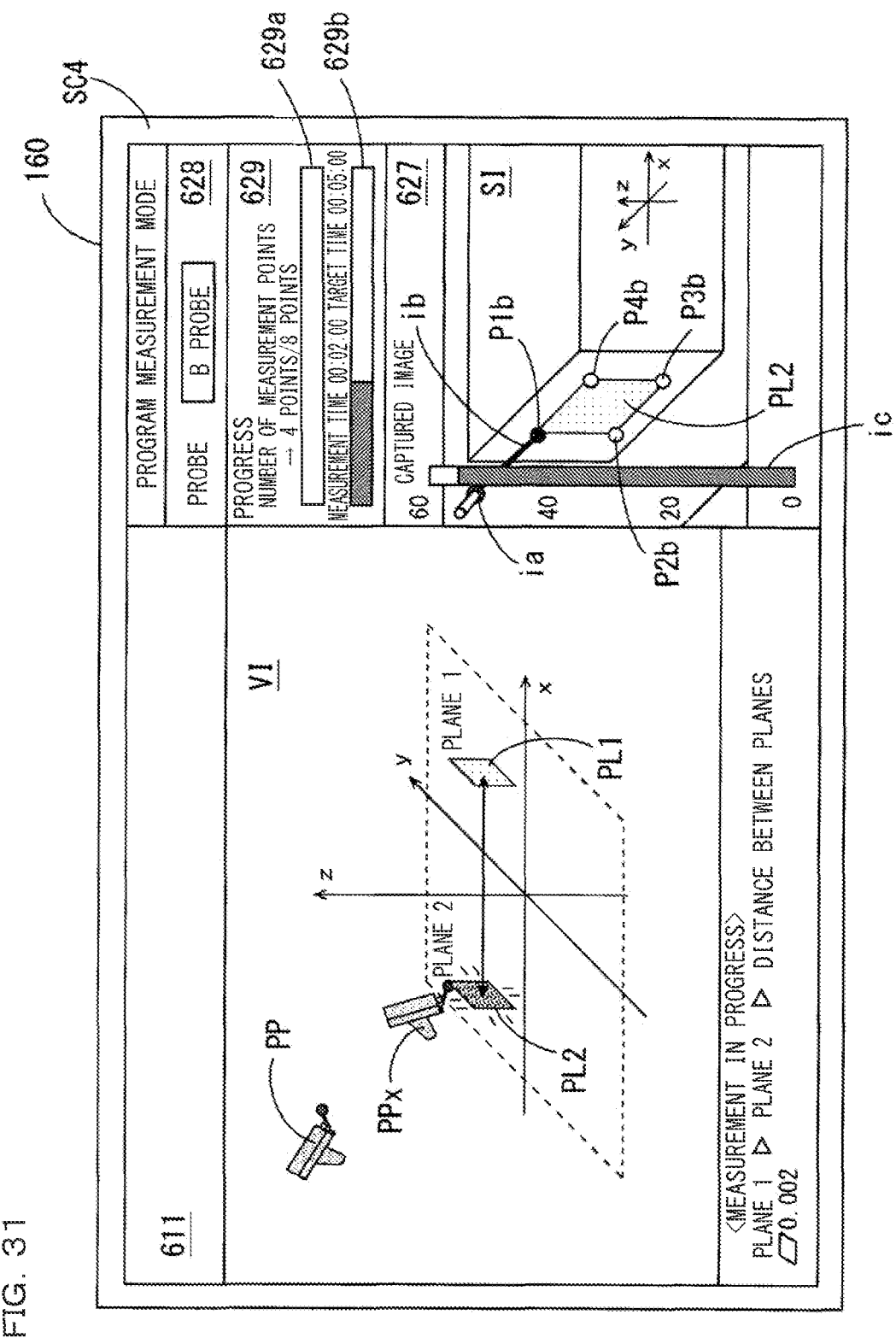
FIG. 31 is a view for describing one usage example of the coordinate measuring device in the measurement mode.

When the measurement operator completes the setting of the measurement plane ML1, as shown in FIG. 31, the figure PL1 showing the measurement plane ML1 in the first image display field 611 is switched to a normal display, and the figure PL2 showing the measurement plane ML2 of "Plane 2" to be set next is highlighted.

Further, in the measurement procedure displayed below the imaging-region virtual image VI, a character string "<Measurement in Progress>" is added to a portion above the upper part of "Plane 2" in place of "Plane 1". In such a manner, at the time of measuring the measurement target S by the measurement mode, the character string "<Measurement in Progress>" is added to the measurement element to be currently set. Therefore, the measurement operator views the measurement procedure displayed below the imaging-region virtual image VI, and can thereby easily recognize the measurement element to be currently set. Note that the measurement element to be currently set may be highlighted instead of the character string "<Measurement in Progress>" being added to the measurement element to be currently set.

In the above example, the four measurement positions M1a, M2a, M3a, M4a are set at the time of setting the measurement plane ML1 that specifies "Plane 1". In this case, flatness of "Plane 1" is calculated based on coordinates of the four measurement positions M1a, M2a, M3a, M4a. Accordingly, in the measurement procedure displayed below the imaging-region virtual image VI, the calculated flatness is displayed in a lower part of "Plane 1". As described above, when there exist one or a plurality of physical quantities that can be calculated at the time of setting each measurement element, it is preferable to calculate at least one of these physical quantities and display a result of the calculation in the first image display field 611. This allows the measurement operator to recognize the accuracy of the measurement while referring to the displayed calculation result.

Moreover, in the second image display field 627, the captured image SI corresponding to "Plane 2" is displayed. At this time, similarly to the example of FIG. 25, the figure PL2 showing the measurement plane ML2 set in the setting mode is displayed on the captured image SI along with the x-axis, the y-axis, and the z-axis. Further, the images P1b, P2b, P3b, P4b showing the measurement positions M1b, M2b, M3b, M4b set in the setting mode are displayed on the captured image SI. Moreover, in the captured image SI, similarly to the example of FIG. 29, the image is showing the position of the contact part 144a of the probe 140, the image ib showing a straight line connecting the contact part 144a and the measurement position to be currently set, and the indicator is showing the distance from the contact part 144a to the measurement position to be currently set are superimposed and displayed.

This allows the measurement operator to easily and accurately set the measurement plane ML2 of "Plane 2" while viewing the captured image SI displayed in the second image display field 627 of FIG. 31 and the image PPx displayed in the first image display field 611.

Figure 32:
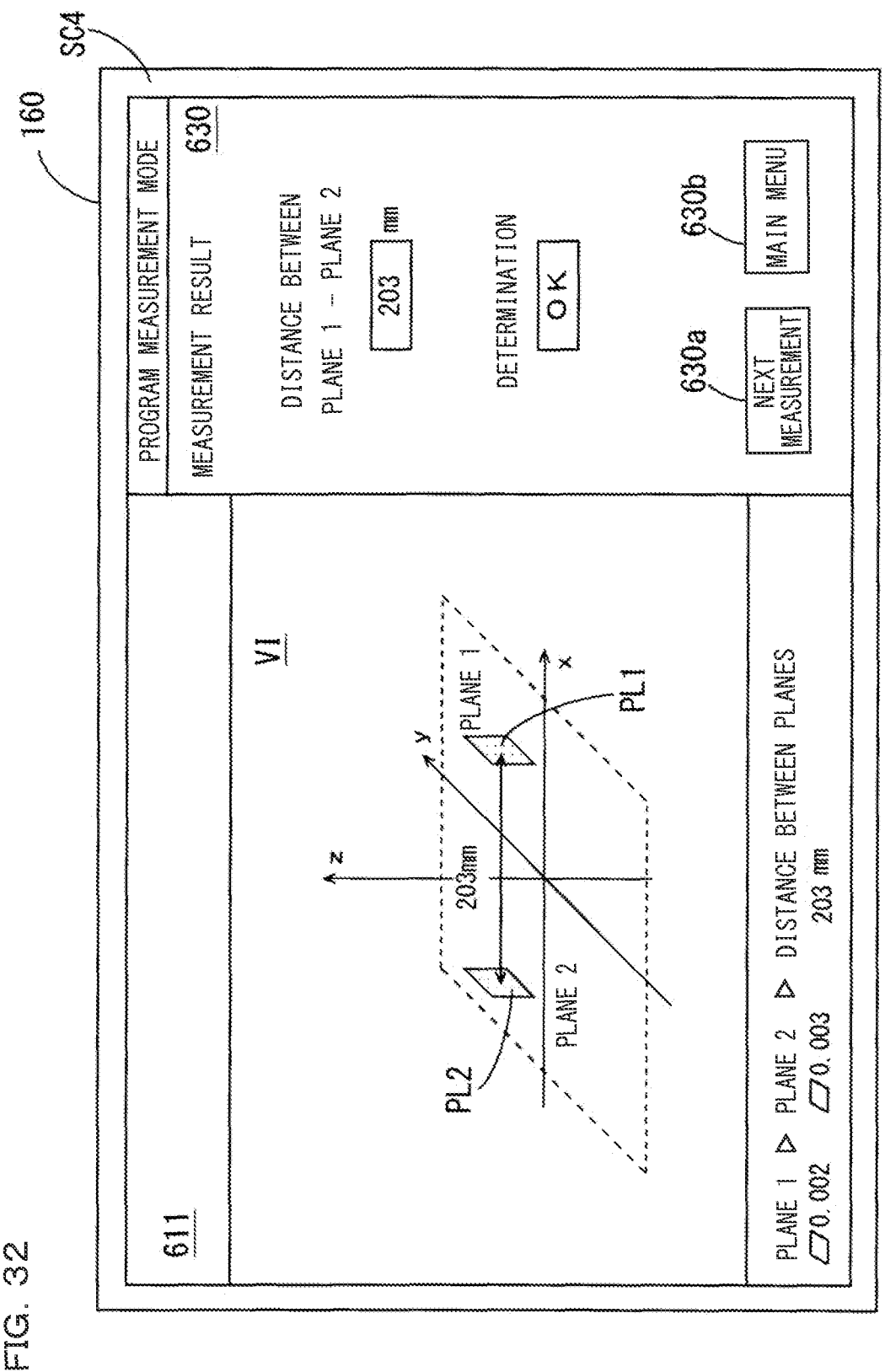
FIG. 32 is a view for describing one usage example of the coordinate measuring device in the measurement mode.

When the setting of the measurement planes ML1 and ML2 is completed, as shown in FIG. 32, the figure PL2 showing the measurement plane ML2 in the first image display field 611 is switched to a normal display. Further, a distance between "Plane 1" and "Plane 2" is calculated, and the calculated measurement result is superimposed and displayed on the imaging-region virtual image VI.

In the measurement procedure displayed below the imaging-region virtual image VI, the character string "<Measurement in Progress>" added to "Plane 2" is not displayed. Further, flatness calculated at the time of setting the measurement plane ML2 that specifies "Plane 2" is displayed in the lower part of "Plane 2". Moreover, the measurement result of the distance between "Plane 1" and "Plane 2" is displayed on the side of "Plane 2".

Furthermore, as shown in FIG. 32, a measurement result display field 630 is displayed on the screen of the display unit 160 in place of the second image display field 627, the probe display field 628, and the progress level display field 629 of FIG. 31. In the measurement result display field 630, the distance between "Plane 1" and "Plane 2" is displayed as a measurement result. At this time, a data file showing the measurement result is stored into the storage unit 210 of FIG. 1.

In the setting mode, a reference range for pass/fail determination on the measurement result may be previously set as measurement criteria by the measurement manager, and pass/fail determination on manufactured parts or the like may be performed based on the set reference range and the measurement result in the measurement mode. In this case, when the measurement result is within the reference range in the measurement mode, as shown in FIG. 32, a determination result (e.g., "OK") indicating a non-defective (pass) item may be displayed in the measurement result display field 630 along with the measurement result. On the other hand, when the measurement result is out of the reference range, a determination result (e.g., "NG") indicating a defective (fail) item may be displayed in the measurement result display field 630 along with the measurement result.

Note that displays of the pass/fail determination and its determination result are not limited to the above example. For example, in the case of performing the pass/fail determination on the measurement target S, a plurality of physical quantities such as distances between planes in a plurality of places or the circularities of circles in a plurality of places may be measured with respect to one measurement target S. Further, a reference range for pass/fail determination on a measurement result of each of physical quantities may be set as measurement criteria. In this case, by measurement of a previously set plurality of physical quantities with respect to one measurement target S, a pass/fail determination result (e.g., "OK" or "NG") for each of the physical quantities to be measured may be individually displayed on the display unit 160. Further, when measurement results of all the physical quantities to be measured are within the reference ranges, a determination result (e.g., "OK") indicating a non-defective (pass) item may be displayed as an overall determination result. On the other hand, when the measurement result of any of the physical quantities to be measured is out of the reference range, a determination result (e.g., "NG") indicating a defective (fail) item may be displayed as an overall determination result.

As shown in FIG. 32, a next measurement button 630a and a main menu button 630b are displayed in the measurement result display field 630. The measurement operator operates the next measurement button 630a, and can thereby perform similar measurement to the above example on a further new measurement target S.

Moreover, the measurement operator operates the main menu button 630b, and can thereby complete the measurement operation. In this case, the initial screen SC1 of FIG. 15 is displayed on the display unit 160.

In the measurement mode, out of a plurality of measurement positions displayed on the captured image SI, an image showing the measurement position whose setting has been completed may be displayed in a display form different from an image showing the measurement position to be currently set and an image showing the measurement position not having been set.

Figure 33:
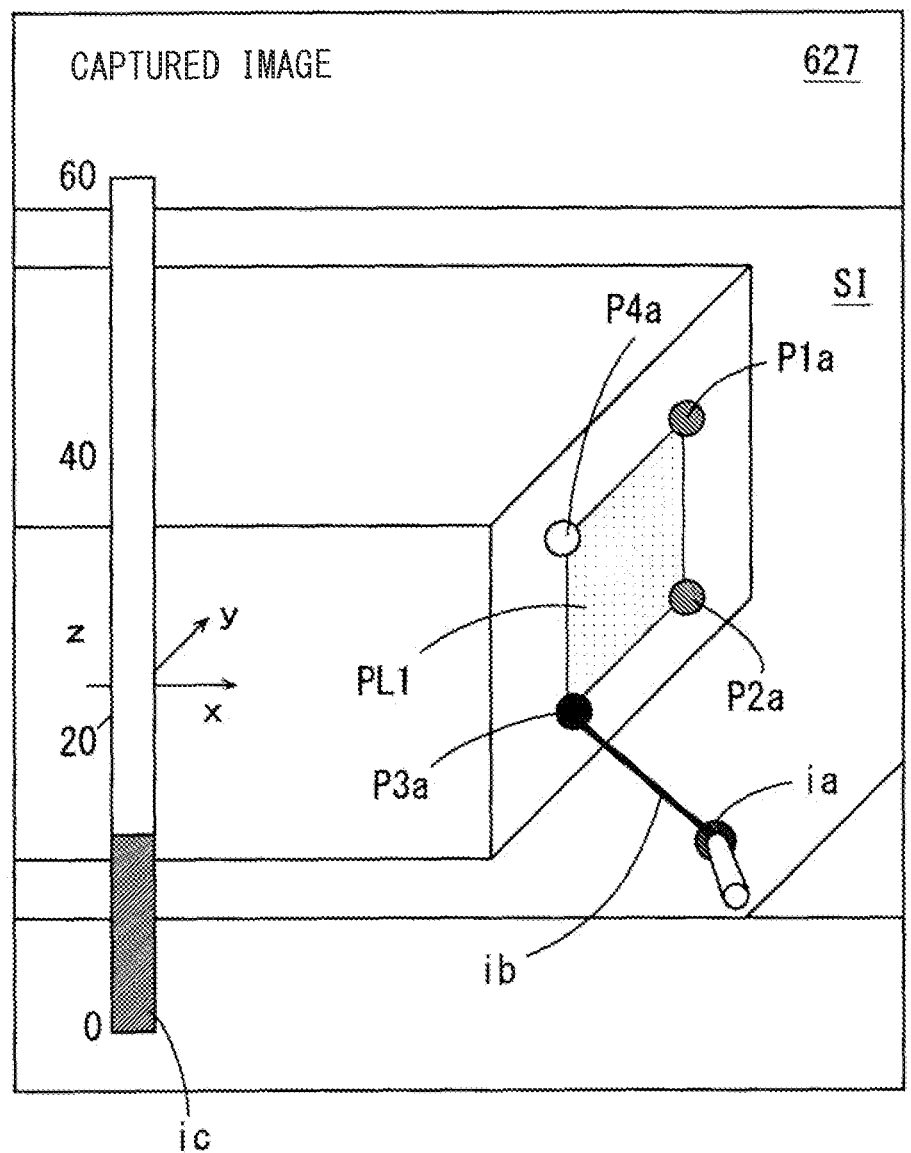
FIG. 33 is a view showing one example of a display form of a plurality of measurement positions displayed on the captured image.

FIG. 33 is a view showing one example of the display form of the plurality of measurement positions displayed on the captured image SI. In the example of FIG. 33, hatching is applied to the images P1a, P2a showing the measurement positions M1a, M2a whose setting has been completed. Further, the image P3a showing the measurement position M3a to be currently set is displayed in black. Moreover, the image P4a showing the measurement position M4a not having been set is displayed in white. In this case, the measurement operator can easily recognize the measurement position with which the contact part 144a is to be brought into contact. Further, the measurement operator can easily recognize the progress of the measurement operation.

Figure 34A:
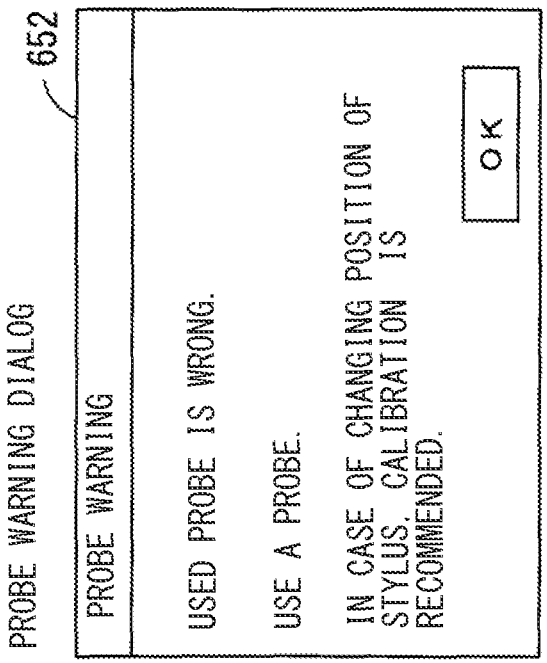
FIG. 34A is a view showing one example of a re-measurement dialog.

In the measurement mode, a re-measurement dialog and a probe warning dialog which will be described below may be displayed on the display unit 160 in accordance with contents of the operation of the probe 140 by the measurement operator. FIG. 34A is a view showing one example of the re-measurement dialog, and FIG. 34B is a view showing one example of the probe warning dialog.

For example, as shown in FIG. 18, there is assumed a case where setting information is generated in a state where the determination function is turned on by checking of the check box 623a in the setting mode. In this case, when this setting information is used in the measurement mode, in each measurement of a measurement position, it is determined whether or not a deviation amount between coordinates of the measurement position and the measurement position set in the setting mode is not larger than a threshold. A re-measurement dialog 651 of FIG. 34A is a display for urging the measurement operator to perform re-setting in the case where the above deviation amount is larger than the threshold. Accordingly, the measurement operator can re-set the measurement position in the case of erroneously setting the measurement position due to an operational error of the probe 140 or the like.

Figure 34B:
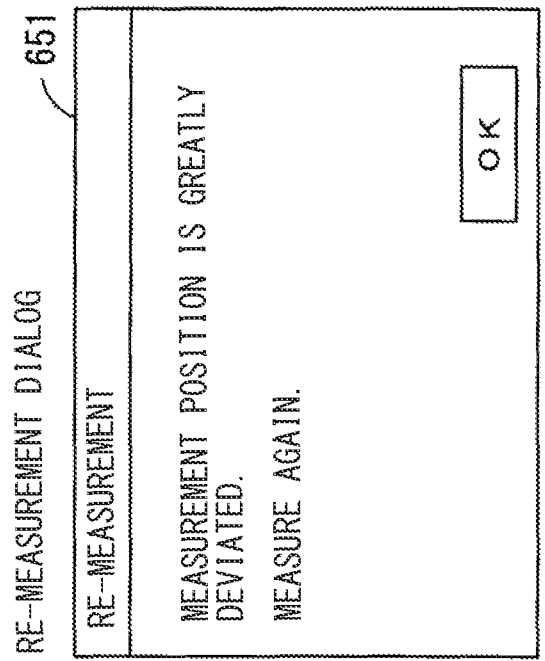
FIG. 34B is a view showing one example of a probe warning dialog.

A probe warning dialog 652 of FIG. 34B is a display for presenting the measurement operator that the probe 140 to be used is wrong in a case where, for example, one measurement position is set by "B probe" when the one measurement position is to be set by "A probe". Accordingly, in the case of setting the measurement position by the probe 140 which is not to be used, the measurement operator can perform re-measurement of the measurement position by the probe 140 to be used.

Note that the control unit 220 of FIG. 1 may control the probe 140 other than the probe 140 to be used such that the plurality of light emitting units 143 do not emit light. In this case, the probe 140 other than the probe 140 to be used comes into a non-active state. This prevents setting of the measurement position by the probe 140 which is not to be used.

(6-4) Setting of reference coordinate system

The measurement target S is produced based on a design drawing, for example. In the design drawing, a size may be decided in accordance with a three-dimensional coordinate system with an arbitrary portion of the measurement target S taken as a reference.

In the present embodiment, it is possible to define a reference coordinate system with an arbitrary portion of the measurement target S taken as a reference. In this case, similarly to the design drawing of the measurement target S, the reference coordinate system with an arbitrary portion of the measurement target S taken as a reference is set, and coordinates of the measurement position are calculated in accordance with the reference coordinate system. Accordingly, a size corresponding to the design drawing of the measurement target S can be easily checked based on the calculated coordinates of the measurement position.

Figure 35A:
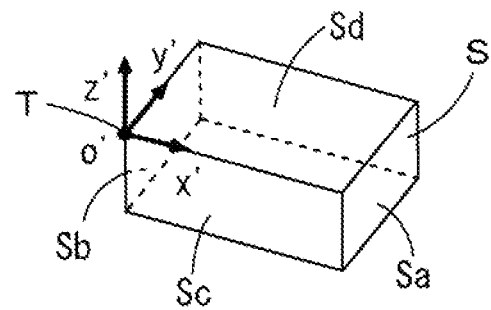
FIGS. 35A to 35C are schematic views showing one setting example of a reference coordinate system.

Hereinafter, setting examples of the reference coordinate system will be described. FIGS. 35A to 35C and FIGS. 36A to 36C are schematic views showing one setting example of the reference coordinate system. As shown in FIG. 35A, the reference coordinate system set in this example takes, as an origin o', one apex T out of eight apexes of the measurement target S having a rectangular parallelepiped shape, and includes an x'-axis, a y-axis, and a z'-axis which are defined to be along three sides passing through the apex T.

Here, in the measurement target S of FIGS. 35A to 35C and FIGS. 36A to 36C, similarly to the example of FIG. 8, one side surface and the other side surface of the measurement target S, which are opposed to each other, are referred to as side surfaces Sa, Sb. Further, one of a pair of side surfaces orthogonal to the side surface Sa and the side surface Sb is referred to as a front surface Sc, and the upper surface of the measurement target S is referred to as an upper surface Sd.

Figure 35B:
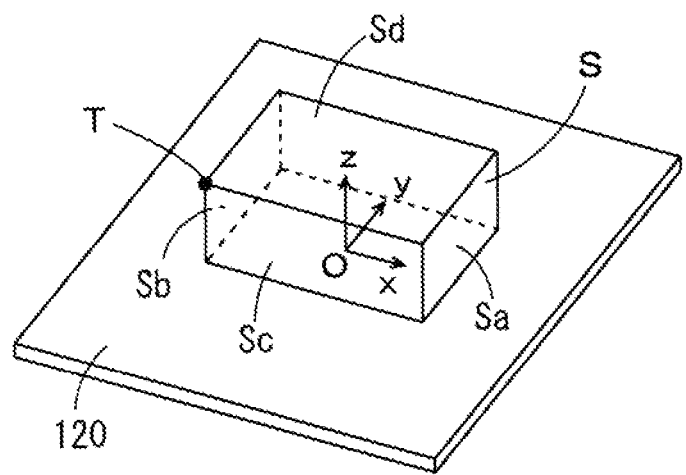

First, as shown in FIG. 35B, the measurement manager places the measurement target S on the placement table 120. Further, the measurement manager operates the coordinate measuring device 300 in the setting mode, to have the measurement condition setting screen SC2 of FIG. 17 displayed on the display unit 160. In this initial state, the device coordinate system is set as the reference coordinate system.

Subsequently, the measurement manager operates the coordinate system setting button 612a of FIG. 17. Thereby, setting of the reference coordinate system is started. In this example, one plane, one straight line, and one point are sequentially set in order to set the reference coordinate system. Thereby, positions of the one plane, the one straight line, and the one point are measured as specific physical quantities. In the following description, the plane, the straight line, and the point to be set for setting the reference coordinate system are respectively referred to as "Plane 0", "Straight line 0", and "Point 0".

In the setting mode, during the setting of the reference coordinate system, a dialog (not shown) showing a measurement procedure for "Plane 0", "Straight line 0", and "Point 0" is displayed on the display unit 160. The measurement manager first sets "Plane 0" in accordance with the measurement procedure displayed on the display unit 160.

Figure 35C:
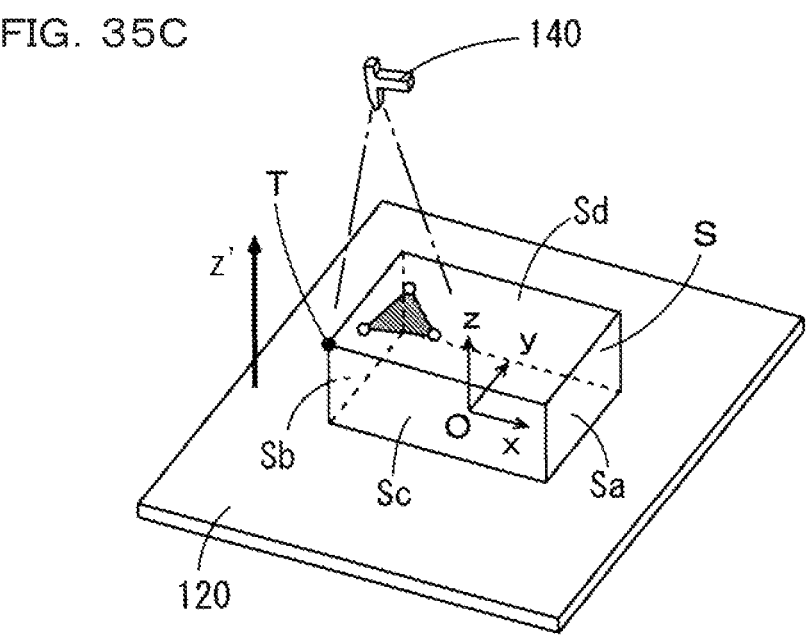

In this case, for example as shown in FIG. 35C, the measurement manager sets a measurement plane that specifies "Plane 0" in part of the upper surface Sd including the apex T. The setting method is the same as the setting method shown in FIGS. 18 to 24. At the time of this setting, an image of part of the upper surface Sd which corresponds to "Plane 0" is captured by the sub-imaging unit 150, and captured image data corresponding to "Plane 0" is stored into the storage unit 210. By "Plane 0" being set, an x'-y' plane (direction of z'-axis) in the reference coordinate system is defined.

Figure 36A:
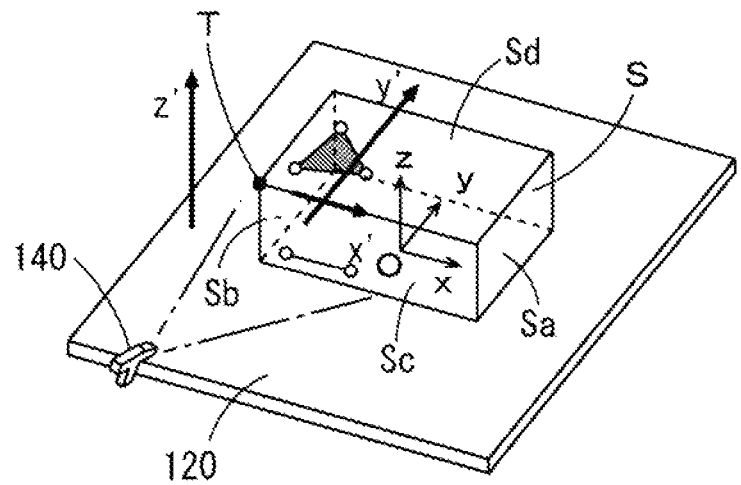
FIGS. 36A to 36C are schematic views showing one setting example of the reference coordinate system.

Next, for example as shown in FIG. 36A, the measurement manager sets a measurement straight line that specifies "Straight line 0" in part of the front surface Sc including the apex T. At the time of this setting, an image of part of the front surface Sc which corresponds to "Straight line 0" is captured by the sub-imaging unit 150, and captured image data corresponding to "Straight line 0" is stored into the storage unit 210. By "Straight line 0" being set, a straight line that is drawn on the x'-y' plane in the case of "Straight line 0" being projected to the x'-y' plane along a z'-axis direction is defined as the x'-axis.

Figure 36B:
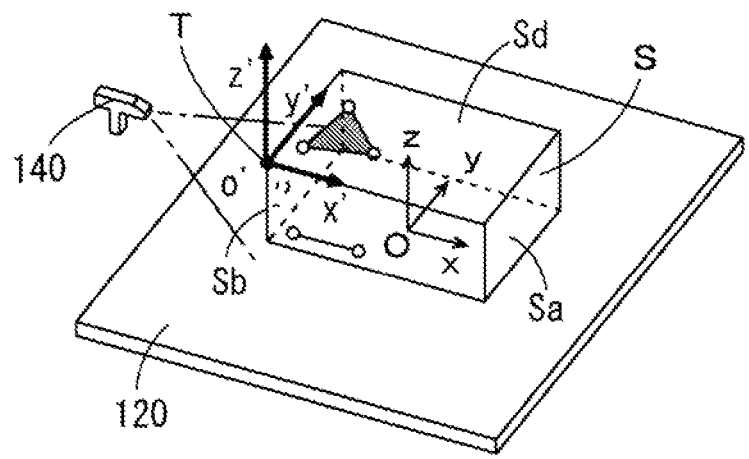

Next, for example as shown in FIG. 36B, the measurement manager sets a measurement point that specifies "Point 0" in part of the side surface Sb including the apex T. At the time of this setting, part of the side surface Sb corresponding to "Point 0" is captured by the sub-imaging unit 150, and captured image data corresponding to "Point 0" is stored into the storage unit 210.

By "Point 0" being set, a straight line, which passes through a point drawn on the x'-y' plane and is orthogonal to the x'-axis in the case where "Point 0" is projected to the x'-y' plane along the z'-axis direction, is defined as the y'-axis. Further, an intersection point of the x'-axis and the y'-axis is defined as the origin o', and the z'-axis passing through the origin o' is defined.

Figure 36C:
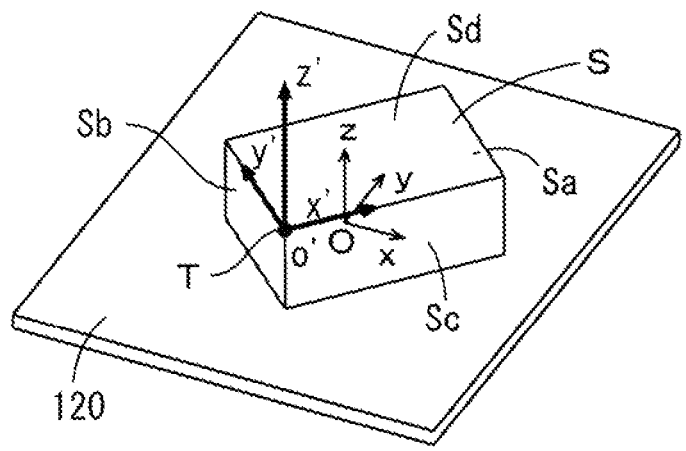

As described above, in the coordinate measuring device 300, it is possible to set the reference coordinate system with the arbitrary portion of the measurement target S taken as the reference. In this case, as shown in FIGS. 36B and 36C, it is possible to accurately calculate coordinates of the measurement position in accordance with the reference coordinate system with the arbitrary portion of the measurement target S taken as the reference, irrespective of the position and the attitude of the measurement target S on the placement table 120.

Note that the method for setting the reference coordinate system is not limited to the above example. For example, the reference coordinate system may be set by setting, as the measurement planes, three planes that include a point where the origin o' is to be set.

FIGS. 37 to 41 are views for describing one usage example of the coordinate measuring device 300 in the case of performing setting of the reference coordinate system in the measurement mode. In this example, a description will be given of a case where, after setting of the reference coordinate system in a manner similar to the examples of FIGS. 35A to 35C and FIGS. 36A to 36C, the distance between the two side surfaces Sa and Sb of the measurement target S is measured.

Figure 37:
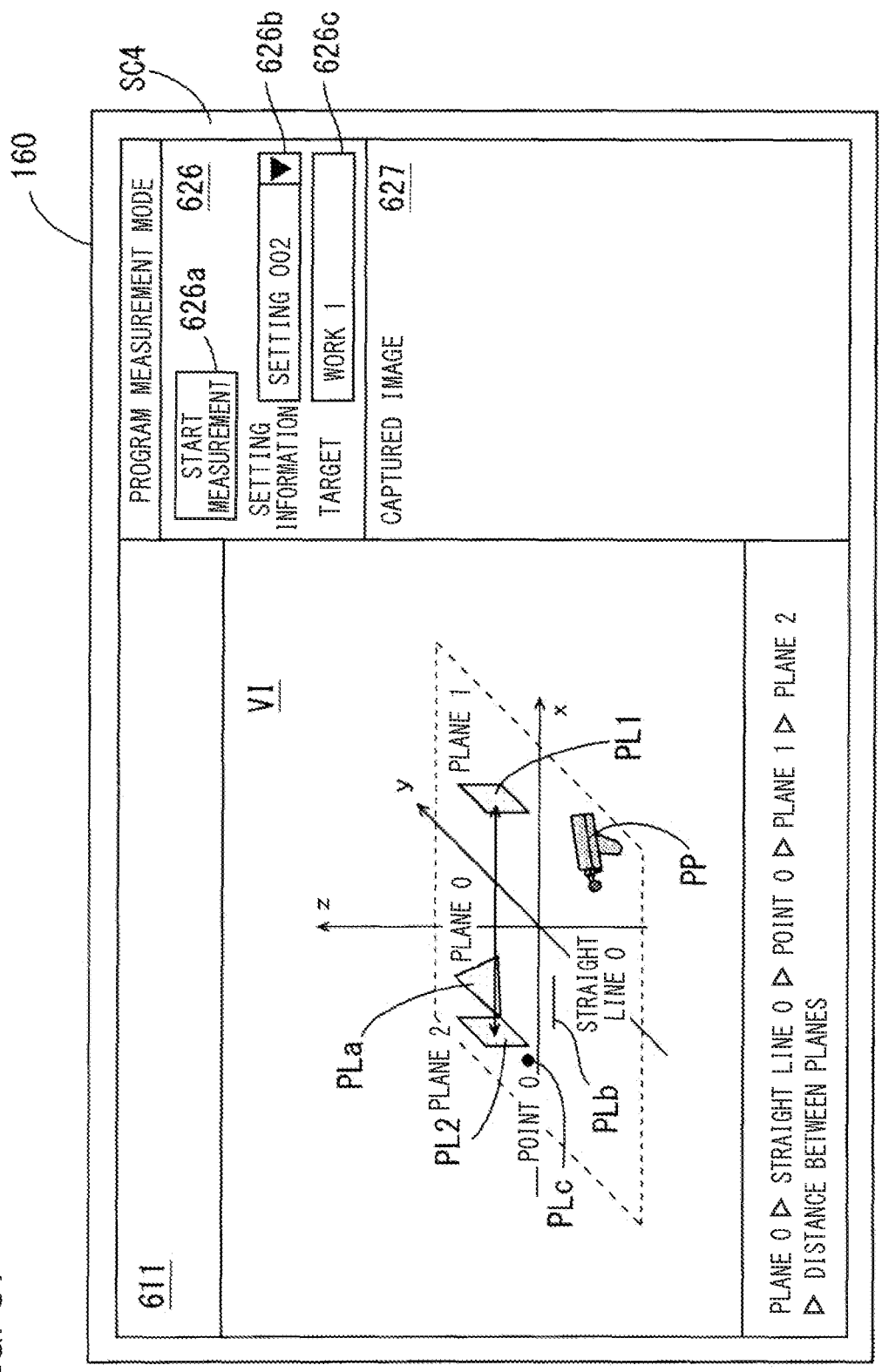
FIG. 37 is a view for describing one usage example of the coordinate measuring device in a case of performing setting of a reference coordinate system in the measurement mode.

As shown in FIG. 37, the measurement operator first operates the pull-down menu 626b of the measurement operation field 626, to thereby select a file name of setting information. Thereby, the imaging-region virtual image VI is displayed in the first image display field 611 based on the setting information read by the control unit 220 of FIG. 1.

On the imaging-region virtual image VI of FIG. 37, there are displayed figures PLa, PLb, PLc, PL1, and PL2 respectively corresponding to the above "Plane 0", "Straight line 0", "Point 0", "Plane 1", and "Plane 2". Further, a measurement procedure is displayed below the imaging-region virtual image VI.

Figure 38:
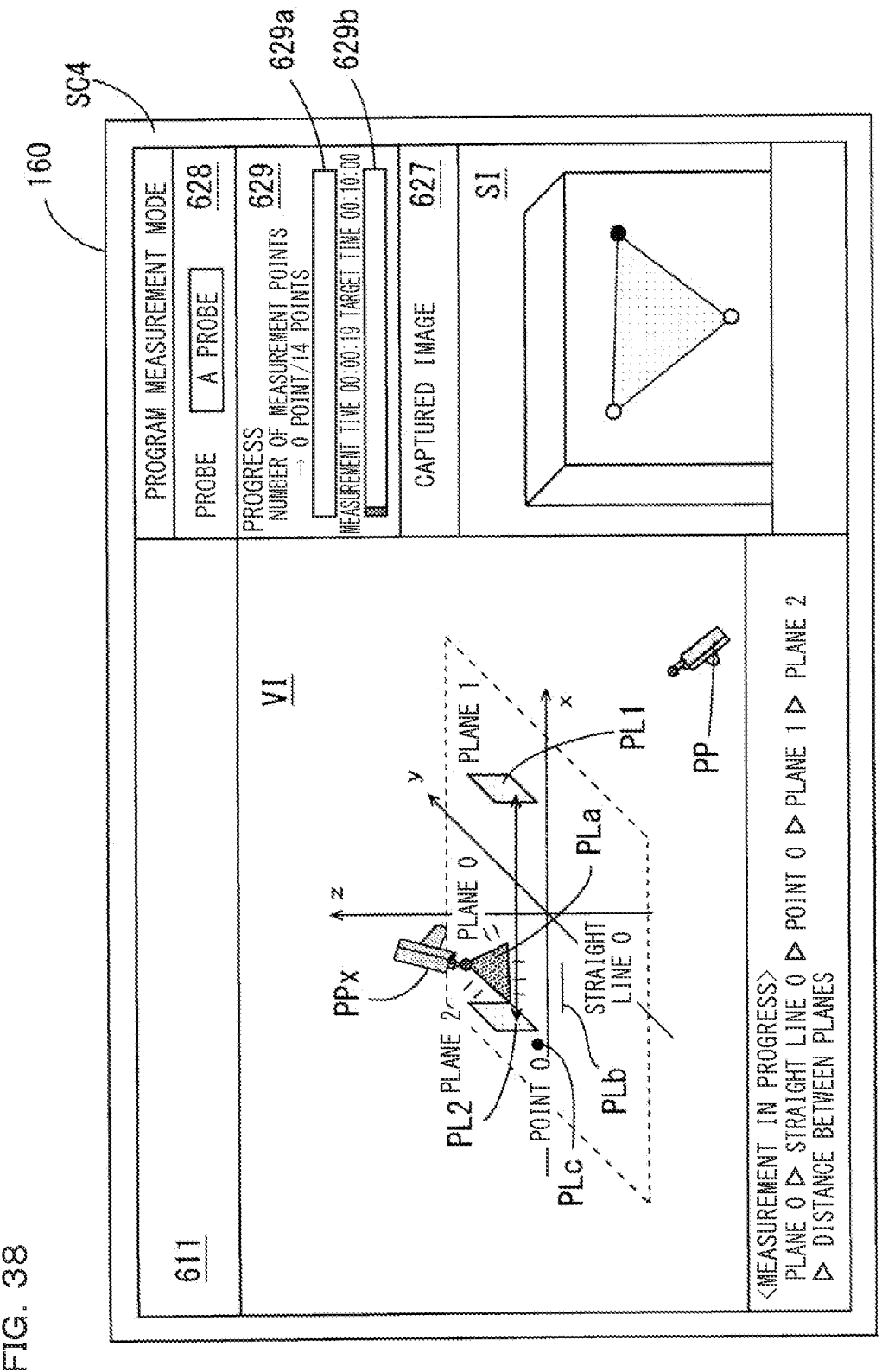
FIG. 38 is a view for describing one usage example of the coordinate measuring device in the case of performing the setting of the reference coordinate system in the measurement mode.

The measurement operator operates the measurement start button 626a of FIG. 37. In this case, as shown in FIG. 38, a probe display field 628 and a progress level display field 629 are displayed on the actual measurement screen SC4 in place of the measurement operation field 626 of FIG. 37. Further, in the first image display field 611, the figure PLa corresponding to "Plane 0" to be initially set is highlighted. Moreover, in the second image display field 627, the captured image SI corresponding to "Plane 0" is displayed. On the captured image SI, an image showing a plurality of measurement positions for setting "Plane 0" is displayed. Thereby, the measurement operator sets each measurement position while viewing the captured image SI.

Here, at the time of measurement for setting the reference coordinate system, images showing the device coordinate system and the position of the contact part 144a are not displayed on the captured image SI. Thereby, when the position and the attitude of the measurement target S have been changed from the position and the attitude at the time of setting the reference coordinate system in the setting mode, the measurement operator is prevented from erroneously recognizing the measurement position.

Figure 39:
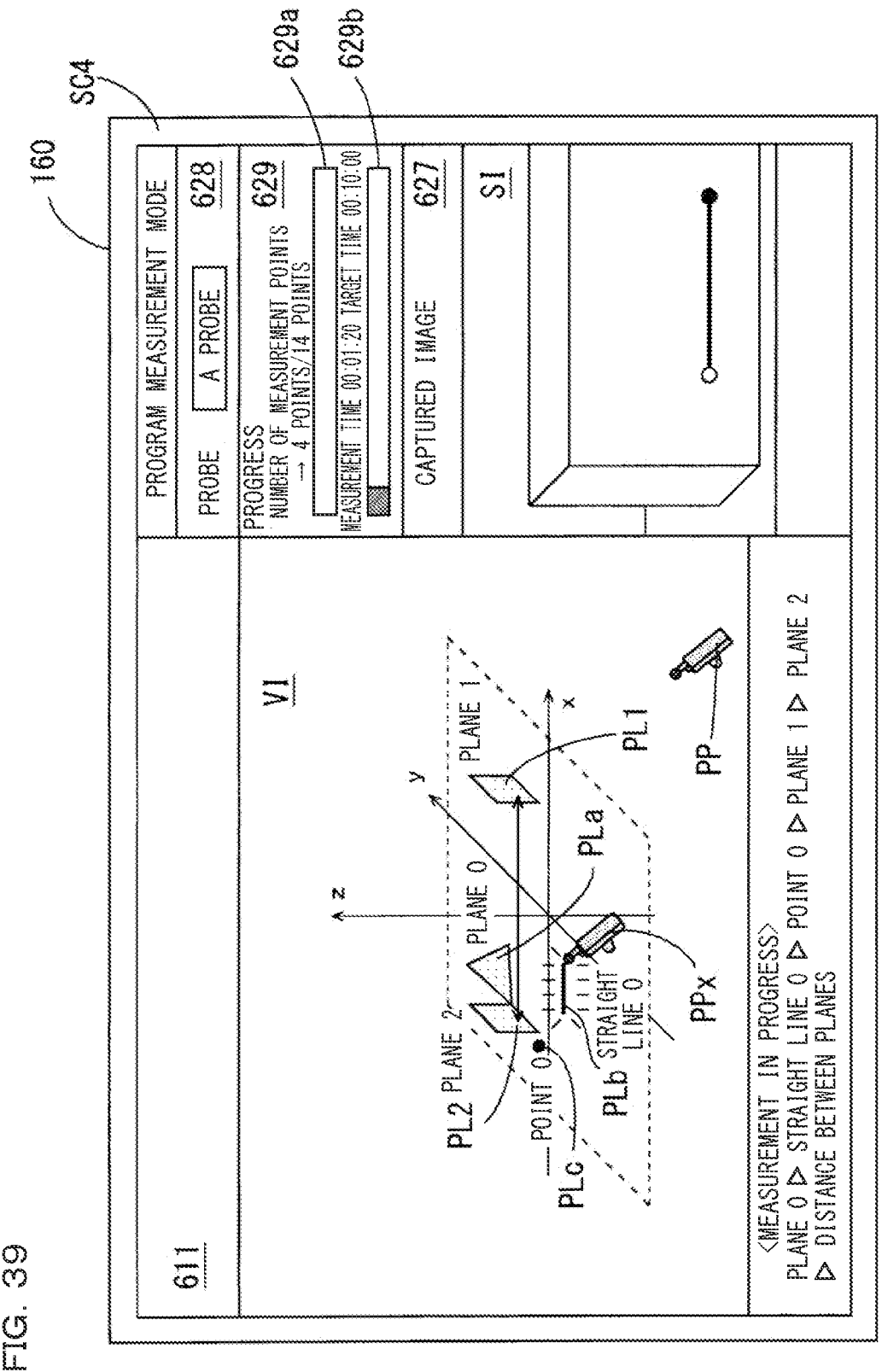
FIG. 39 is a view for describing one usage example of the coordinate measuring device in the case of performing the setting of the reference coordinate system in the measurement mode.

When the setting of "Plane 0" is completed, as shown in FIG. 39, the figure PLb corresponding to "Straight line 0" to be set next is highlighted in the first image display field 611. Moreover, in the second image display field 627, the captured image SI corresponding to "Straight line 0" is displayed. On the captured image SI, an image showing a plurality of measurement positions for setting "Straight line 0" is displayed.

Figure 40:
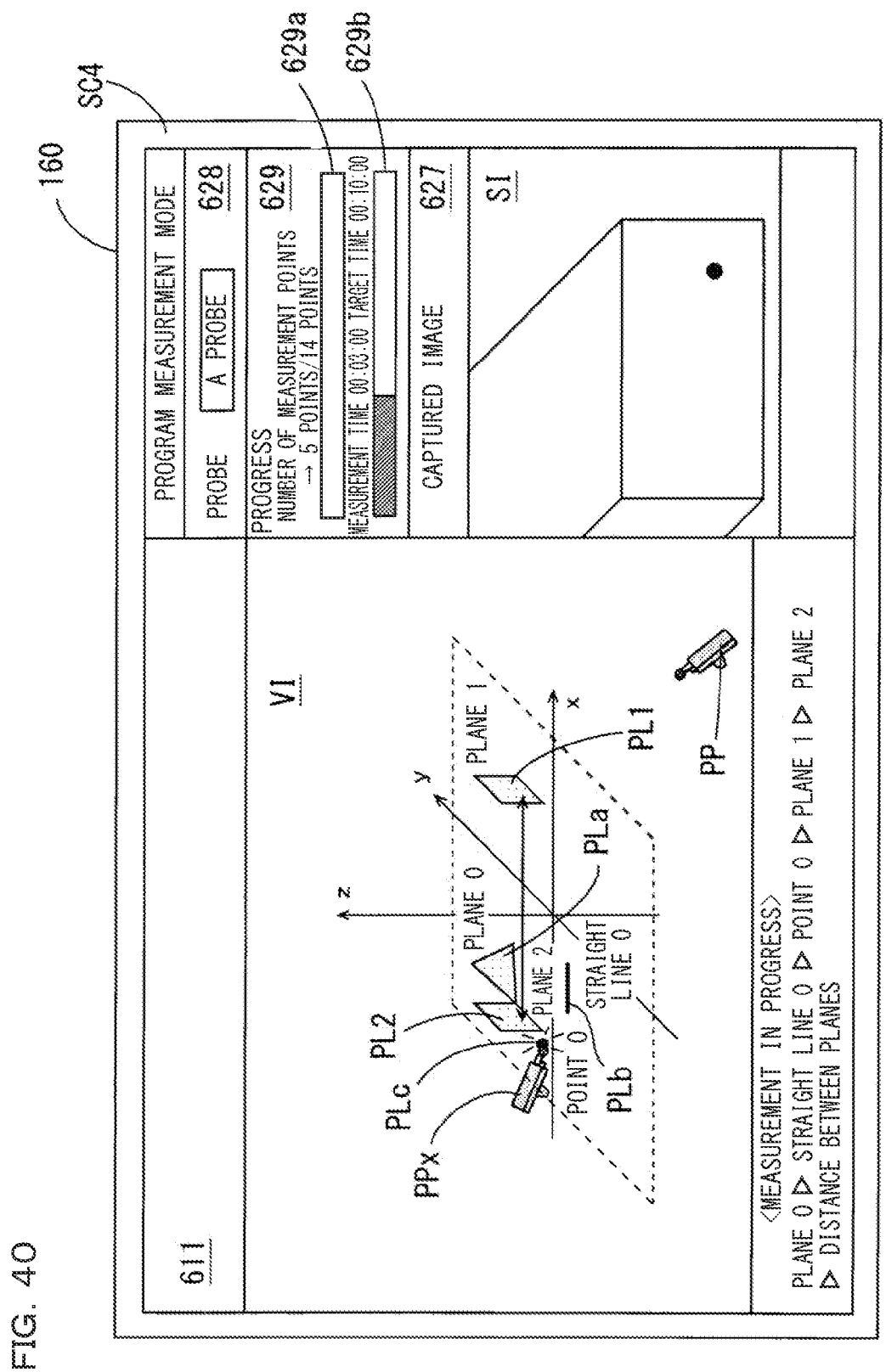
FIG. 40 is a view for describing one usage example of the coordinate measuring device in the case of performing the setting of the reference coordinate system in the measurement mode.

Further, when the setting of "Straight line 0" is completed, as shown in FIG. 40, the figure PLc corresponding to "Point 0" to be set next is highlighted in the first image display field 611. Moreover, in the second image display field 627, the captured image SI corresponding to "Point 0" is displayed. On the captured image SI, an image showing one measurement position for setting "Point 0" is displayed.

Figure 41:
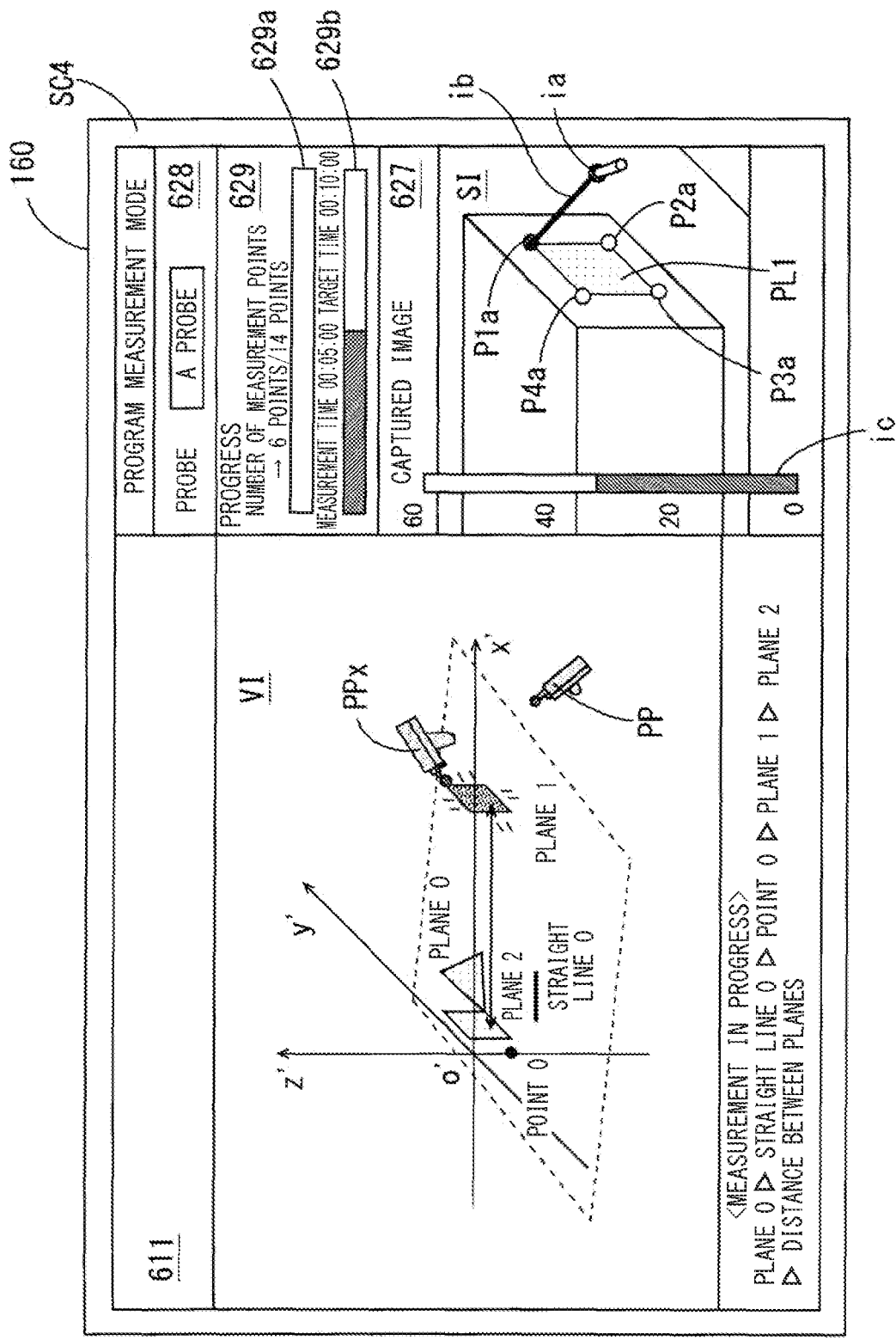
FIG. 41 is a view for describing one usage example of the coordinate measuring device in the case of performing the setting of the reference coordinate system in the measurement mode.

By completion of the setting of "Point 0", the reference coordinate system is set. In this case, as shown in FIG. 41, the set reference coordinate system is displayed in the first image display field 611 in place of the device coordinate system. Moreover, in the second image display field 627, the image is showing the position of the contact part 144a based on the reference coordinate system is displayed on the captured image SI.

Thereafter, the measurement operator performs the measurement operation in a procedure similar to that in the above example of FIGS. 29 to 32. Hence, it is possible to acquire the distance between "Plane 1" and "Plane 2" and coordinates of each measurement position in accordance with the reference coordinate system. Further, the measurement operator can perform accurate measurement on the measurement target S irrespective of the position and the attitude of the measurement target S.

According to the coordinate measuring device 300 of the present embodiment, it is possible to measure a plurality of physical quantities of the measurement target S based on, for example, one setting information. Further, it is possible to set the reference coordinate system in each measurement of one physical quantity. Accordingly, when there exists a physical quantity which is difficult to measure when the measurement target S is arranged in a certain position and attitude, the measurement manager and the measurement operator can appropriately change the position and the attitude of the measurement target S in each measurement of the physical quantity. Specifically, after performing the measurement with respect to one physical quantity, the measurement manager and the measurement operator can rotate the measurement target S 180 degrees or 90 degrees in a horizontal direction or a vertical direction and set a reference coordinate system, to measure another physical quantity based on the set reference coordinate system.

In the above example, the measurement operator is required to set at least six measurement positions in each measurement of one measurement target S. Therefore, in order to omit the setting operation for the reference coordinate system by the measurement operator, the reference coordinate system may be set by the following method.

For example, an image of the measurement target S is captured by the main imaging unit 130 at the time of setting the reference coordinate system in the setting mode, and the acquired image data is stored as first image data into the storage unit 210. Further, an image of the measurement target S is captured by the main imaging unit 130 at the time of starting measurement of the measurement target S in the measurement mode, and the acquired image data is stored as second image data into the storage unit 210. Thereby, the control unit 220 of FIG. 1 may automatically set the reference coordinate system based on setting information concerning the reference coordinate system set in the setting mode and the first and second image data stored in the storage unit 210. Such an automatic setting process for the reference coordinate system can be realized by using pattern matching technique or the like, for example. In this case, the measurement operator is not required to perform setting of the reference coordinate system. This leads to reduction in measurement time.

(6-5) Convenient function

In the present embodiment, a pointer is displayed on the screen of the display unit 160. The measurement manager, for example, operates the pointer by use of the mouse of the operation unit 230 of FIG. 1 or operates the wheel of the mouse, and can thereby change an image displayed in the first image display field 611.

Figure 42A:
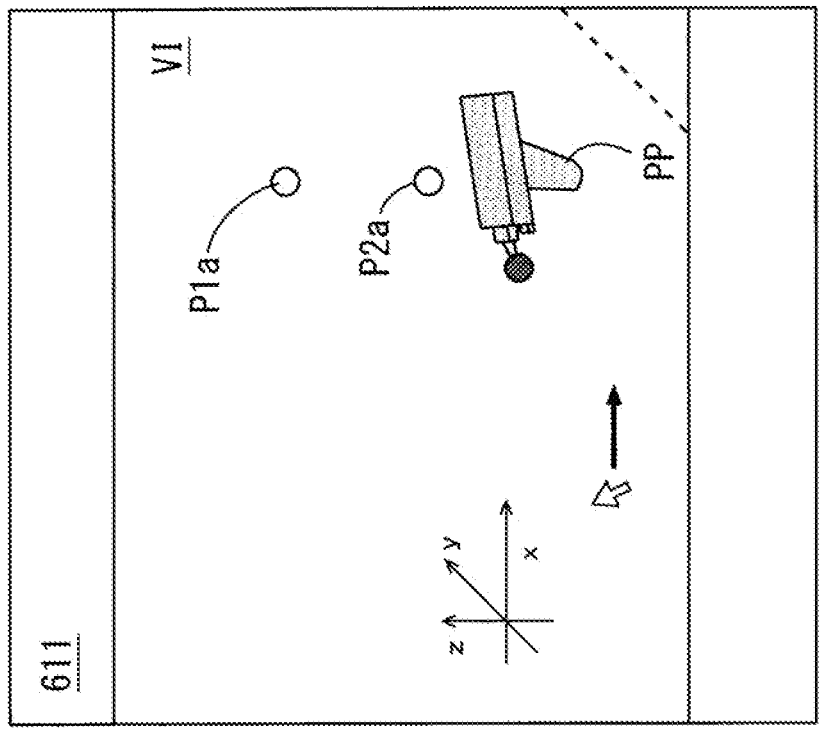
FIGS. 42A and 42B are views showing one example in a case where an image displayed on a first image display field is changed in the setting mode.

FIGS. 42A and 42B and FIGS. 43A and 43B are views showing one example in a case where the image displayed on the first image display field 611 is changed in the setting mode. As described above, at the time of starting the setting mode, as shown in FIG. 18, the imaging-region virtual image VI virtually representing the imaging region V viewed from an arbitrary position is displayed in the first image display field 611. Subsequently, by operation of the imaging button 622a of FIG. 18, as shown in FIG. 42A, the captured image SI obtained by imaging by the sub-imaging unit 150 is displayed in the first image display field 611. Here, the imaging position of the sub-imaging unit 150 for obtaining the captured image SI of FIG. 42A is referred to as a reference imaging position.

Figure 42B:
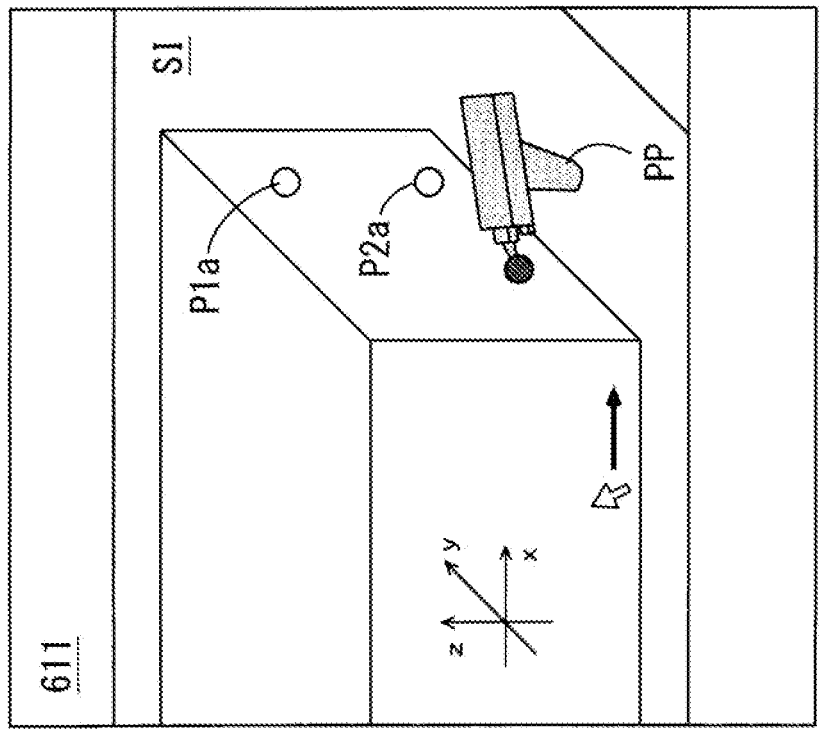

In this state, the pointer is dragged as indicated by a thick solid line in FIG. 42A, for example. In this case, as shown in FIG. 42B, the imaging-region virtual image VI in the case of viewing the imaging region V from the same position as the reference imaging position is displayed in the first image display field 611 in place of the captured image SI. Subsequently, the imaging-region virtual image VI is successively changed such that a viewpoint for viewing the imaging region V moves from the reference imaging position to a position in accordance with an operation amount of the pointer.

Figure 43A:
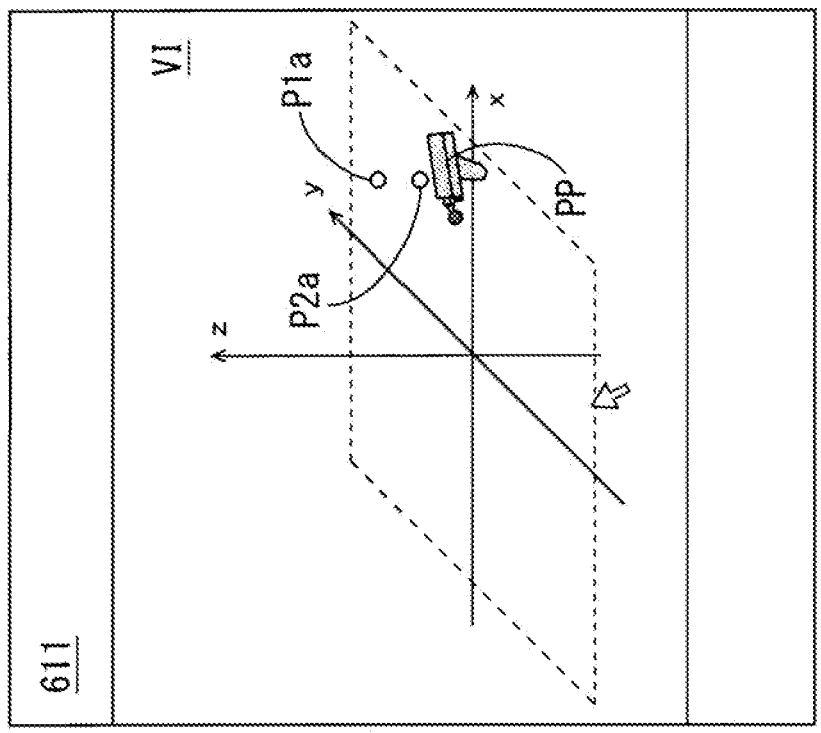
FIGS. 43A and 43B are views showing one example in the case where the image displayed on the first image display field is changed in the setting mode.
Figure 43B:
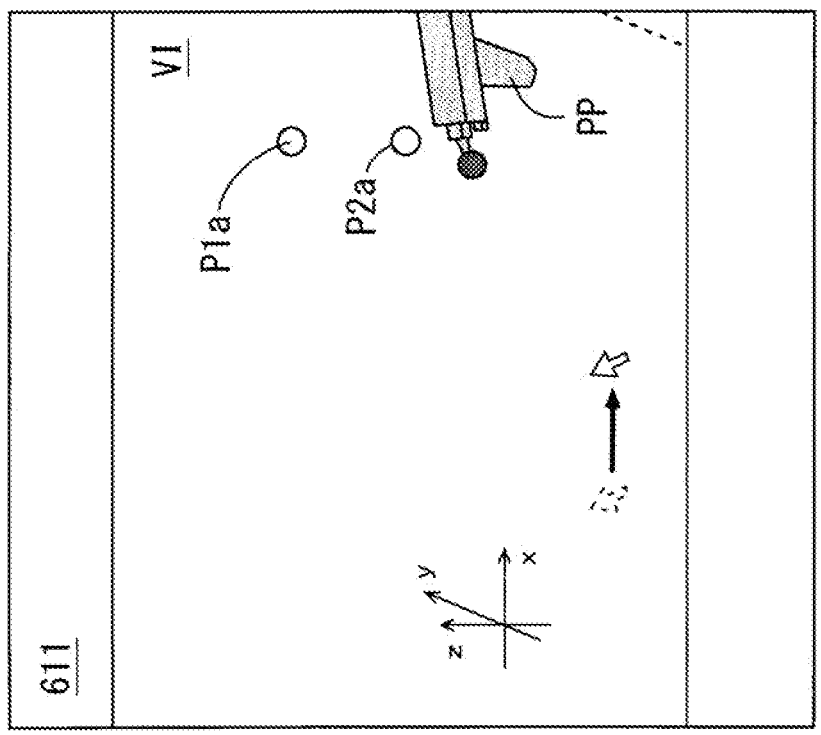

Accordingly, as shown in FIG. 43A, the measurement manager can easily display, in the first image display field 611, the imaging-region virtual image VI in the case of viewing the imaging region V from a desired direction. Further, the measurement manager operates the wheel of the mouse of the operation unit 230, and can thereby change the imaging-region virtual image VI such that the distance between the origin O of the device coordinate system and the viewpoint for viewing the imaging region V changes, as shown in FIG. 43B.

As described above, in this example, at the time of switching of the image displayed on the display unit 160 from the captured image SI to the imaging-region virtual image VI, the viewpoint position for viewing the imaging region V remains unchanged between the captured image SI and the imaging-region virtual image VI. This allows the measurement manager to smoothly perform the operation for changing the viewpoint position while accurately recognizing the viewpoint position.

(6-6) Single item measurement mode and statistical analysis mode

By the user operating the single item measurement button 603 of FIG. 15, the control unit 220 of the coordinate measuring device 300 is operated in the single item measurement mode. In the single item measurement mode, the measurement target S is measured in the same procedure as in the setting mode. That is, in the single item measurement mode, the measurement target S is measured without using setting information that is previously stored into the storage unit 210 of FIG. 1. Therefore, positional figure information is not displayed on the display unit 160 at the time of measuring the measurement target S.

As described above, in the single item measurement mode, the operation for generating setting information by the setting mode is not required, and hence a desired physical quantity in the measurement target S can be measured in a short period of time. Note that, in the single item measurement mode, generation of captured image data is also not required since the setting information is not used.

By the user operating the statistical analysis button 604 of FIG. 15, the control unit 220 of the coordinate measuring device 300 is operated in the statistical analysis mode. In the statistical analysis mode, the data file of the measurement results obtained in the measurement mode is read from the storage unit 210 of FIG. 1. Based on the read measurement result, the statistical analysis process is performed.

Figure 44:
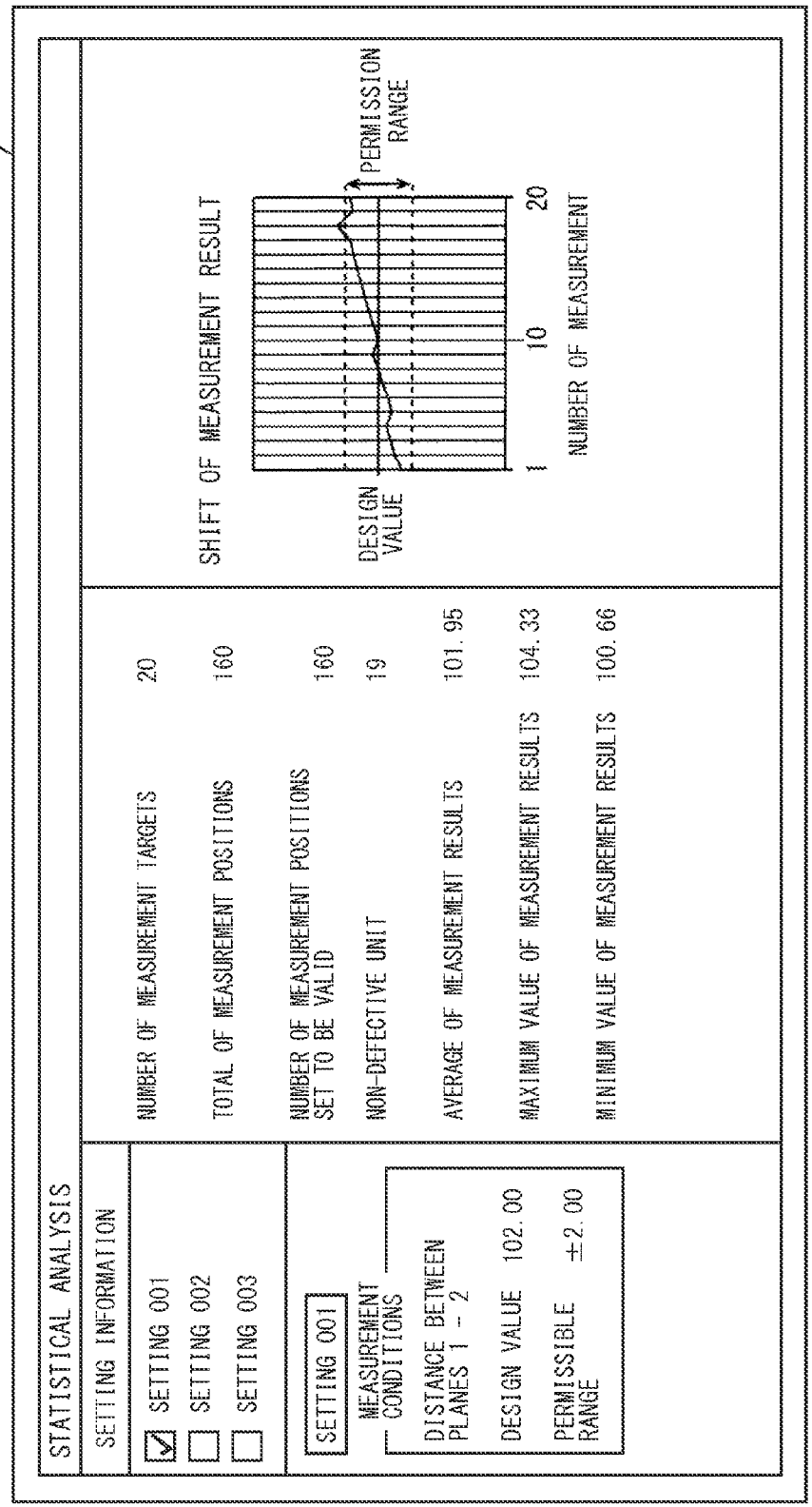
FIG. 44 is a view showing one display example of the display unit in a statistical analysis mode.

FIG. 44 is a view showing one display example of the display unit 160 in the statistical analysis mode. In this example, as a result of statistical analysis on the past measurement results using the setting information "Setting 001", there are displayed measurement conditions, the number of measured measurement targets S, a total of measurement positions, the number of measurement positions set to be valid, and the number of measurement targets S determined as non-defective units. Further, an average value of the measurement results, the maximum value of the measurement results, and the minimum value of the measurement results are displayed. Moreover, a graph showing a shift of the measurement result is displayed. Thereby, according to the statistical analysis mode, the convenience of the coordinate measuring device 300 is improved.

Other than the above example, in the statistical analysis mode, there may be performed a process of extracting a specific measurement result from a plurality of measurement results stored in the past, a process of displaying a histogram concerning a predetermined physical quantity based on a plurality of measurement results, and some other process.

(7) Effect (7-1) In the coordinate measuring device 300, images of the plurality of light emitting units 143 of the probe 140 are captured by the main imaging unit 130. Positions of the plurality of light emitting unit 143 are respectively calculated based on image data showing the images of the plurality of light emitting units 143 obtained by the main imaging unit 130. In the present embodiment, the positions of the plurality of light emitting unit 143 calculated by use of the optical system are used as information showing the position and the attitude of the probe 140. Further, the positions of the plurality of light emitting units 143 and the positional relationships of the sub-imaging unit 150 with respect to the plurality of light emitting units 143 are used as information showing the position and the attitude of the sub-imaging unit 150.

In the setting mode, an image of the measurement target S is captured by the sub-imaging unit 150. In the measurement mode, the image of the measurement target S obtained by the sub-imaging unit 150 is displayed on the display unit 160 as the captured image SI. An image showing a measurement position to be set on the measurement target S is displayed on the captured image SI. The image showing the measurement position is displayed based on the calculated positions of the plurality of light emitting units 143 and the positional relationships of the sub-imaging unit 150 with respect to the plurality of light emitting units 143. Therefore, the measurement position on the measurement target S is accurately shown on the captured image SI.

Accordingly, the measurement operator views the image showing the measurement position on the captured image SI, and can thereby accurately recognize the measurement position on the measurement target S. As a result, the measurement operator can easily perform accurate measurement on the measurement target S.

As described above, in the present embodiment, the image showing the measurement position is displayed in the position on the captured image SI which corresponds to the measurement plane including the measurement position. Accordingly, the measurement operator views the captured image SI, and can thereby easily and accurately recognize the measurement position on the measurement target S.

(7-2) In the present embodiment, the setting information generated by the setting mode is stored into the storage unit 210. In the measurement mode, the data file of the setting information stored in the storage unit 210 is read. Based on the read setting information, a physical quantity of the measurement target is measured. Therefore, in the case of measuring the same physical quantity with respect to the same measurement target S, repeated creation of the setting information is not required.

(7-3) As described above, the coordinate measuring device 300 has the interface part 114. In this case, by connection of the USB memory to the USB port 114c of the interface part 114, it is possible to output the setting information stored in the storage unit 210, to the USB memory. Further, it is possible to input the setting information stored in the USB memory, into the storage unit 210. Hence, it is also possible to use common setting information among a plurality of coordinate measuring devices 300.

(7-4) In the measurement mode, the progress level display field 629 is displayed on the display unit 160. Accordingly, the measurement operator views a content that is displayed in the progress level display field 629, and can thereby easily recognize a progress level of the measurement operation.

(8) Other Embodiments (8-1) In the above embodiment, at the time of measuring the measurement target S by the setting mode and the measurement mode, the captured image SI is displayed on the display unit 160. This captured image SI is a still image.

The present invention is not limited thereto, and a plurality of captured images SI obtained by the sub-imaging unit 150 at a predetermined frame rate may be successively displayed on the display unit 160 in real time. Further, when each captured image SI is displayed on the display unit 160, the image showing the measurement position and the measurement target portion, the image ib showing the straight line connecting the contact part 144a and the measurement position to be currently set, and the indicator is may be displayed on each captured image SI.

Figure 45:
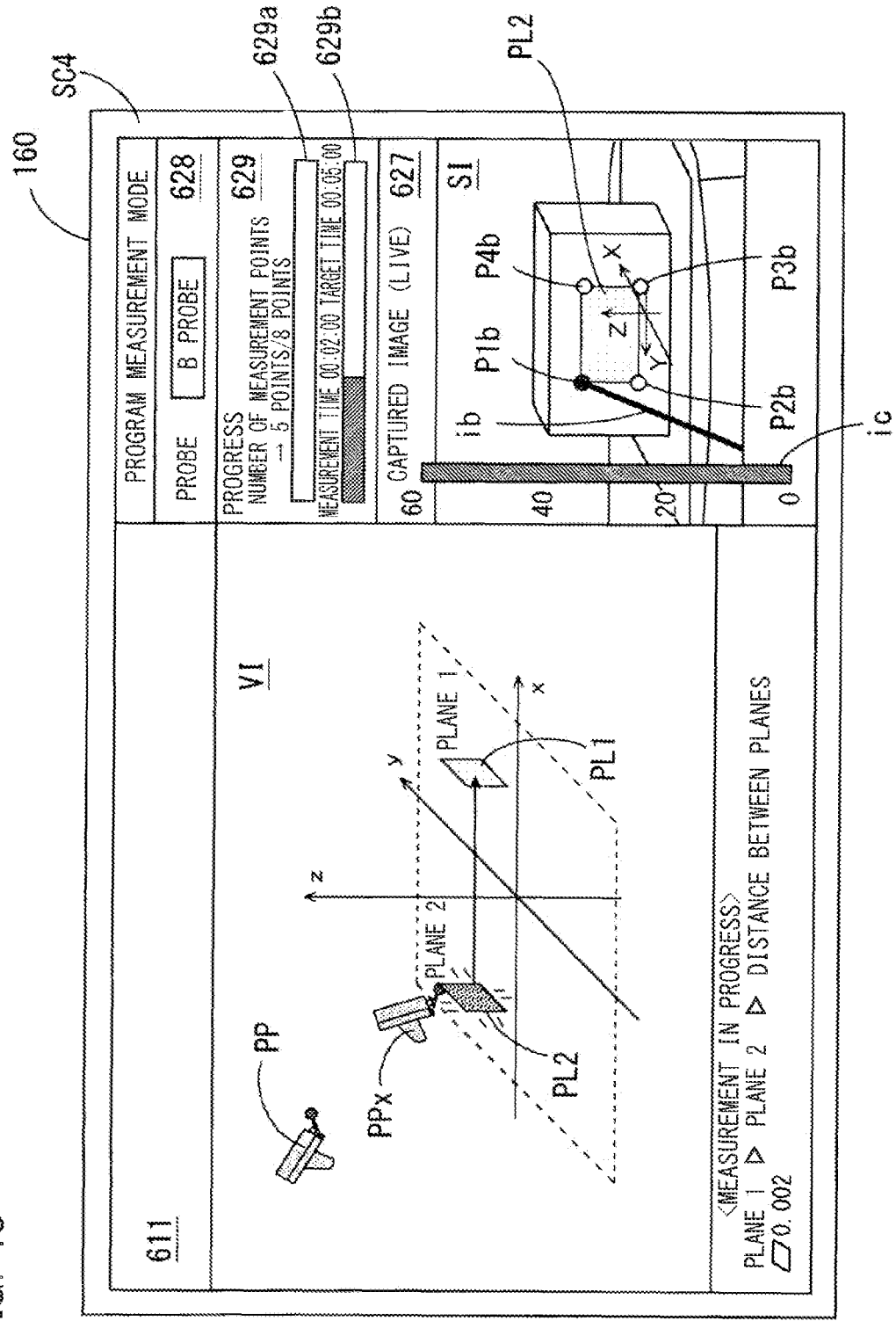
FIG. 45 is a view showing an example in which the captured image is displayed on the display unit in real time.

FIG. 45 is a view showing an example in which the captured image SI is displayed on the display unit 160 in real time. As shown in FIG. 45, in this example, at the time of setting the measurement position, the captured image SI obtained by the sub-imaging unit 150 at a predetermined frame rate is displayed in the second image display field 627 of the display unit 160 in real time.

In this case, the measurement operator changes the position and orientation of the sub-imaging unit 150, and can thereby check, on the screen of the display unit 160, external appearances of the measurement target S viewed from various positions and various directions. Further, the measurement operator can check a plurality of measurement positions and measurement target portions in the measurement target S from various directions.

When the contact part 144a of the stylus 144 does not exist within the imaging range of the sub-imaging unit 150, the image showing the position of the contact part 144a cannot be displayed on the captured image SI as shown in FIG. 45. Therefore, when the measurement operator brings the contact part 144a close to the measurement position, the measurement position gets out of the imaging range of the sub-imaging unit 150.

Hence, when the distance between the contact part 144a and the measurement position to be set is larger than a predetermined threshold, the captured image SI is displayed on the display unit 160 in real time. Further, when the distance between the contact part 144a and the measurement position to be set becomes not larger than the predetermined threshold, the captured image SI obtained immediately before is displayed as a still image on the display unit 160, and the captured image SI is not updated. Thereby, even when the measurement operator brings the contact part 144a close to the measurement position, the image is showing the position of the contact part 144a can be superimposed and displayed on the captured image SI.

(8-2) In the above embodiment, the sub-imaging unit 150 is arranged so as to be adjacent to the stylus 144 of the probe 140. The present invention is not limited thereto, and the sub-imaging unit 150 may be provided in a position away from the stylus 144 as long as the positional relationships with plurality of light emitting units 143 are kept constant.

For example, the sub-imaging unit 150 may be attached to either the housing 141 or the grip part 142 such that the contact part 144a of the stylus 144 is located within the imaging range. In this case, the contact part 144a is constantly displayed on the captured image SI. Therefore, as described in the example of FIG. 45, even when the captured image SI is displayed on the display unit 160 in real time, the measurement operator views the captured image SI, and can thereby easily recognize the current position of the contact part 144a.

(8-3) In the above embodiment, mainly, the positional figure information is superimposed and displayed on the captured image SI. The present invention is not limited thereto, and in the measurement mode, a measurement result in the setting mode may be superimposed and displayed on the captured image SI.

Figure 46:
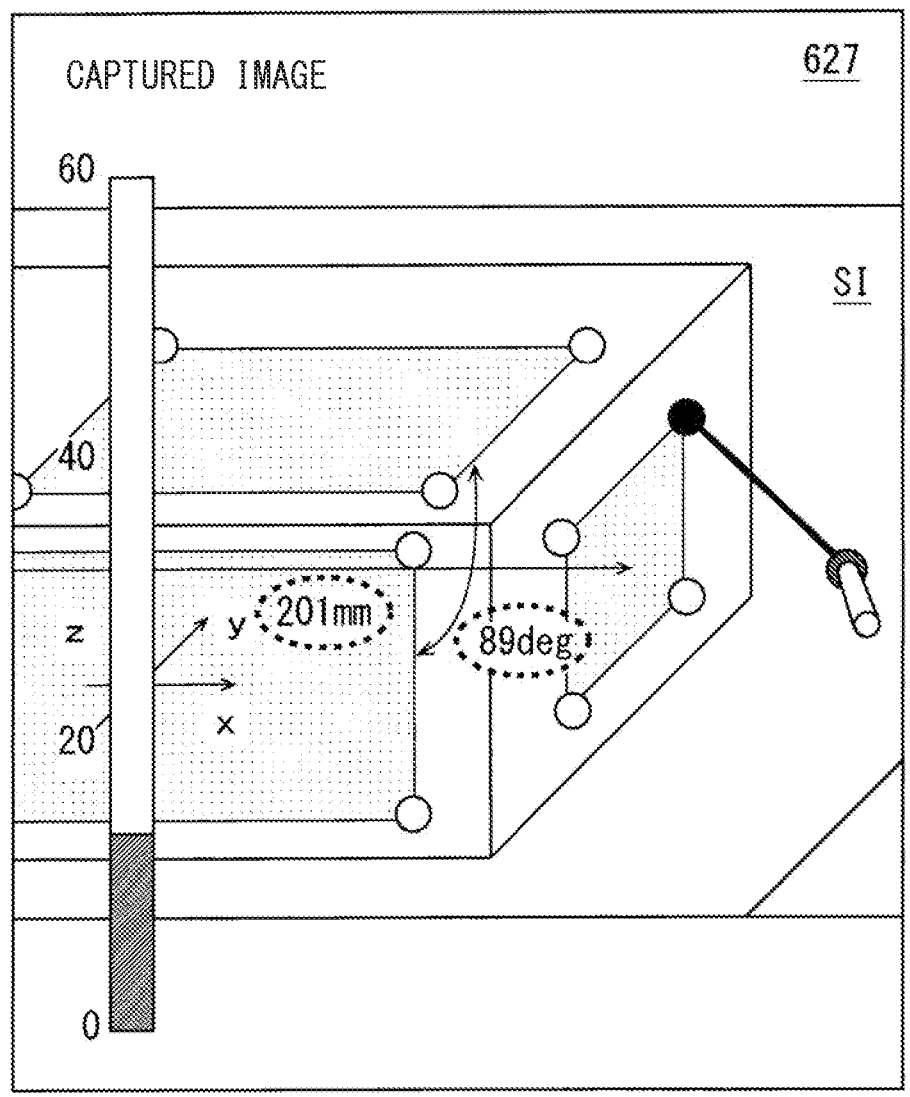
FIG. 46 is a view showing one example of a captured image superimposed with a measurement result in the setting mode.

FIG. 46 is a view showing one example of the captured image SI superimposed with the measurement result in the setting mode. In the example of FIG. 46, in addition to the images showing the measurement positions, the measurement target portions, and the position of the contact part 144a, measurement results in the setting mode are displayed on the captured image SI as shown by thick dotted lines. In this case, the measurement operator views the measurement result in the setting mode, and can thereby predict a measurement result.

(8-4) In the above embodiment, only the sub-imaging unit 150 is used as the imaging unit for obtaining the captured image SI that is displayed on the display unit 160. The present invention is not limited thereto, and as the imaging unit for obtaining the captured image SI, the coordinate measuring device 300 may have another camera device in addition to the sub-imaging unit 150. In this case, the camera device is required to have an imaging unit such as a CCD camera, and a plurality of light emitting units 143 having constant positional relationships with the imaging unit.

Figure 47A:
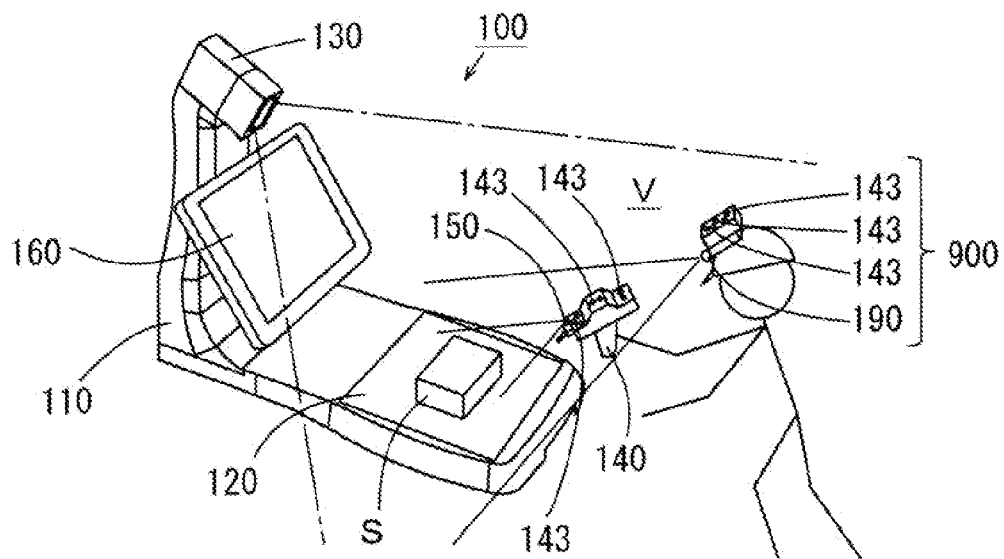
FIGS. 47A to 47C are views showing a usage example of the coordinate measuring device provided with camera device.
Figure 47B:
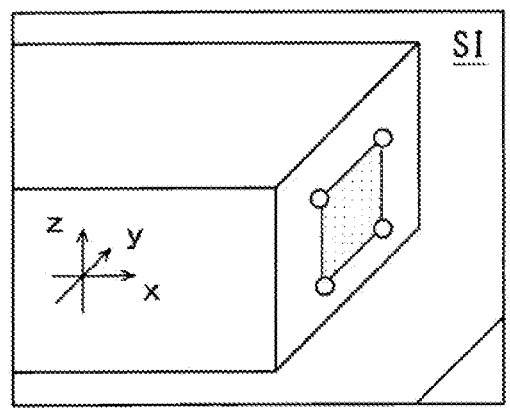
Figure 47C:
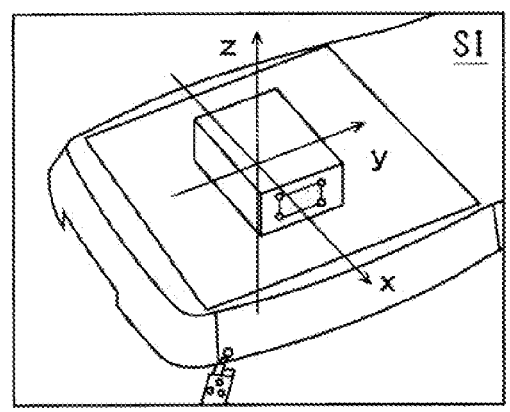

FIGS. 47A to 47C are views showing a usage example of the coordinate measuring device 300 provided with the camera device. As shown in FIG. 47A, a camera device 900 of this example includes a plurality of light emitting units 143 and a CCD camera 190, and is attached to a helmet of the measurement operator, or the like, for example. In the camera device 900, the plurality of light emitting units 143 and the CCD camera 190 are fixed in constant positional relationships.

Further, the positional relationships between the plurality of light emitting units 143 and the CCD camera 190 in the camera device 900, and characteristics (angle of view, distortion, and the like) of the CCD camera 190 are stored as imaging information into the storage unit 210 of FIG. 1.

Accordingly, when the camera device 900 is within the imaging region V, an image of a region captured by the CCD camera 190 is recognized by the control unit 220 of FIG. 1. Therefore, similarly to the image obtained by the sub-imaging unit 150, the image obtained by the CCD camera 190 can also be used as the captured image SI.

FIG. 47B shows an example of the captured image SI obtained by the sub-imaging unit 150 in the example of FIG. 47A. Further, FIG. 47C shows an example of the captured image SI obtained by the CCD camera 190 in the example of FIG. 47A. For example, the control unit 220 of FIG. 1 may switch these captured images SI to the display unit 160 in response to the operation of the operation unit 170 or the operation unit 230 of FIG. 1 by the measurement operator.

This allows the measurement operator to check external appearances of the measurement target S viewed from two mutually different positions by means of the two captured images SI. Further, by displaying the image showing the positional figure information and the position of the contact part 144a on these captured images SI, the measurement operator can more easily and accurately recognize the measurement target portion and the measurement position to be currently set in the measurement target S.

Note that the coordinate measuring device 300 may have two or more camera devices 900. In this case, the measurement operator can check external appearances of the measurement target S viewed from three or more mutually different positions by means of three or more captured images SI.

(8-5) In the above embodiment, as the positional figure information, the spherical image showing the measurement position is superimposed and displayed in the corresponding position in the three-dimensional space on the captured image SI. Further, the image of the plane showing the measurement target portion is superimposed and displayed in the corresponding position in the three-dimensional space on the captured image SI.

The present invention is not limited thereto, and in the measurement mode, instead of displaying the spherical image showing the measurement position on the captured image SI, an image showing a direction from the position of the contact part 144a of the probe 140 toward the measurement position to be currently set may be displayed as the image showing the measurement position on the captured image SI.

Figure 48:
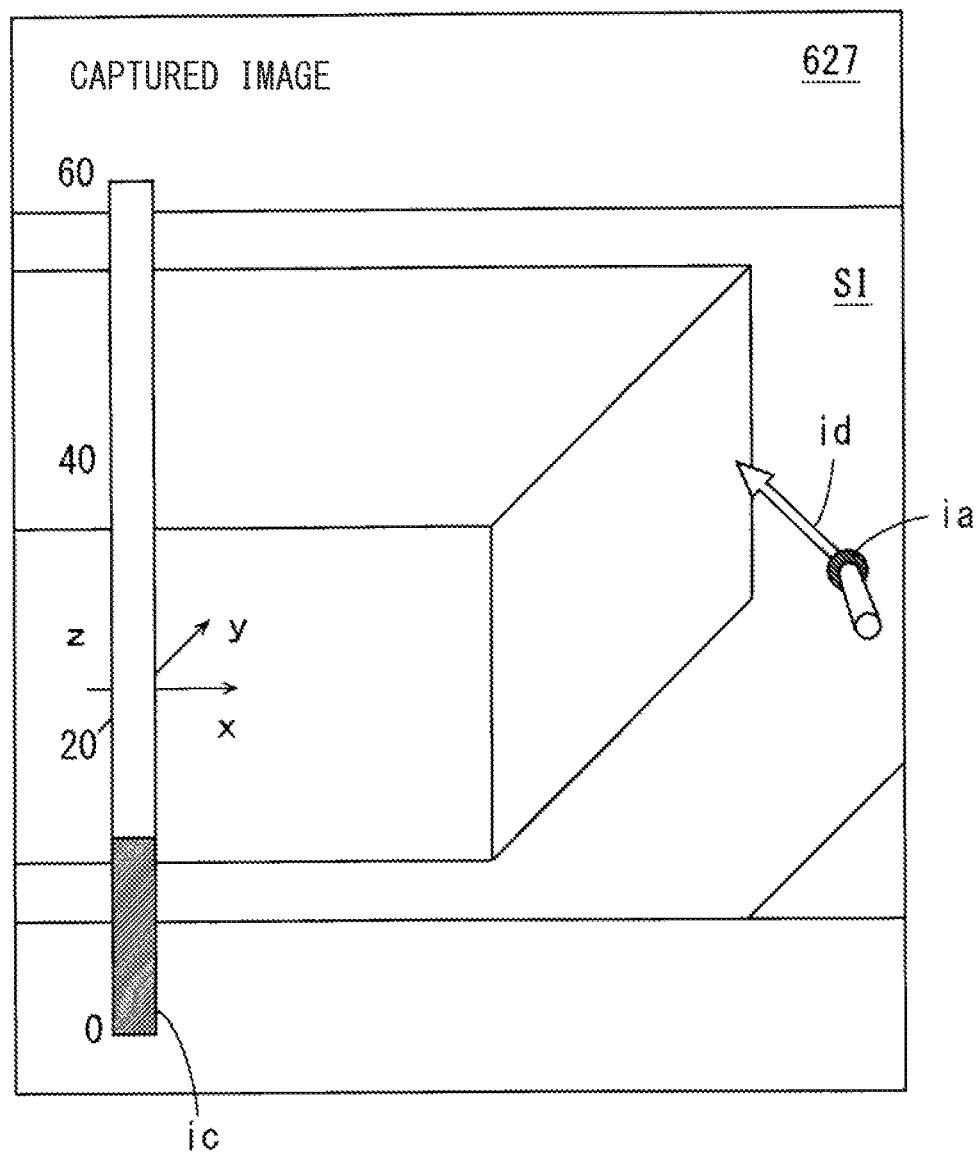
FIG. 48 is a view showing an example in which an image showing a direction in which the contact part of the probe is to be headed is displayed on the captured image.

FIG. 48 is a view showing an example in which an image showing a direction in which the contact part 144a of the probe 140 is to be headed is displayed on the captured image SI. In the example of FIG. 48, the image is showing the position of the contact part 144a and an image id of an arrow showing a direction from the contact part 144a toward the measurement position to be currently set are superimposed and displayed on the captured image SI. In this case, the measurement operator views the image id, and can thereby easily and accurately recognize in which direction the contact part 144a of the probe 140 is to be moved with respect to the measurement target S in order to set the measurement position to be currently set.

In the case of displaying the image id of this example on the captured image SI, a length of the arrow may be changed in accordance with the distance from the contact part 144a to the measurement position to be currently set. For example, when the distance from the contact part 144a to the measurement position to be currently set is long, the arrow is made long. Further, when the distance from the contact part 144a to the measurement position to be currently set is short, the arrow is made short. Accordingly, the measurement operator views the image id, and can thereby easily recognize in which direction and by what distance the probe 140 is to be moved.

(8-6) The above sub-imaging unit 150 may have a bar code reading function. In this case, for example, a bar code showing predetermined information is given to the measurement target S. Hence, the measurement manager or the measurement operator can easily read the bar code given to the measurement target S by the sub-imaging unit 150 while measuring the measurement target S. Note that the sub-imaging unit 150 may not only have the bar code reading function, but also have a QR (Quick Response) code reading function. Further, the sub-imaging unit 150 may have a function such as an OCR (Optical Character Reader).

(8-7) In the above embodiment, the image showing the measurement position and the measurement target portion set by the probe 140 is superimposed and displayed on the captured image SI. The present invention is not limited thereto, and when there exists three-dimensional CAD (Computer-Aided Design) data of a figure represented by three-dimensional coordinates defined in the coordinate measuring device 300, an image based on that CAD data may be displayed on the captured image SI. In this case, it is also possible to produce positional figure information by means of the CAD data instead of measuring the measurement target S in the setting mode. Further, using such CAD data also allows a virtual line such as a reference line to be displayed on the captured image SI in the setting mode.

(8-8) In the above embodiment, the probe 140 and the control board 180 are connected via the cable. The present invention is not limited thereto, and the probe 140 and the control board 180 may be provided so as to be wirelessly communicable with each other. In this case, the operation of the plurality of light emitting units 143 of the probe 140 is controlled by wireless communication from the control board 180. Further, the light reception signal outputted from the sub-imaging unit 150 is transmitted to the control board 180 by the wireless communication. This leads to improvement in operability of the probe 140.

(8-9) In the above embodiment, the positional figure information is displayed on the captured image SI. The present invention is not limited thereto, and the positional figure information may not be displayed on the captured image SI. For example, an image of the portion out of the portion to be measured in the measurement target S may be captured by the sub-imaging unit 150. In this case, the measurement manager can capture an image of the measurement target S by the sub-imaging unit 150 in a state where the probe 140 is arranged outside the imaging region V, and have the captured image displayed on the display unit 160.

(8-10) In the above embodiment, as the unit for acquiring the position and the attitude of the probe 140 and the position and the attitude of the sub-imaging unit 150, the optical system including the plurality of light emitting units 143 and the main imaging unit 130 is used. As the unit for acquiring the position and the attitude of the probe 140 and the position and the attitude of the sub-imaging unit 150, the following configuration may be used instead of using the optical system.

For example, the probe 140 is provided at the front end of a multi-joint arm, while an encoder is provided in each joint portion of the multi-joint arm. In this case, by operating the multi-joint arm to bring the contact part 144a of the probe 140 into contact with the measurement position of the measurement target S, it is possible to acquire the position and the attitude of the probe 140 and the position and the attitude of the sub-imaging unit 150 based on an output from each encoder.

Further, in the case of using two multi-joint arms, the stylus 144 may be attached to the front end of one multi-joint arm, and the sub-imaging unit 150 may be attached to the front end of the other multi-joint arm.

Other than the multi-joint arm, there can be used a configuration in which the probe 140 is held movably in three directions by use of an x-axis rail, a y-axis rail, and a z-axis rail which are orthogonal to each other. In this case, by calculating a movement amount in each direction of the probe 140 by use of three encoders, it is possible to acquire the position and the attitude of the probe 140 and the position and the attitude of the sub-imaging unit 150.

As described above, in the case of acquiring the position and the attitude of the probe 140 based on the output from the encoder, the plurality of light emitting units 143 are not required to be provided in the probe 140. Note that, in the case of acquiring the position and the attitude of the probe 140 based on the output from the encoder, a movable range of the probe 140 corresponds to the acquirement possible region.

(9) Correspondence Relationship Between Each Constitutional Element of Claims and Each Part of Embodiments Hereinafter, the correspondence between each constitutional element of the claims and each constitutional element of the embodiments will be described, but the present invention is not limited to the following examples.

In the above embodiment, the measurement target S is an example of the measurement target, the contact part 144*a* is an example of the contact part, the probe 140 is an example of the probe, the sub-imaging unit 150 is an example of the first imaging unit, and the main imaging unit 130 and the control unit 220 are examples of the position and attitude acquiring unit.

Further, the captured image SI is an example of the captured image, the display unit 160 is an example of the display unit, the images P1*a*, P2*a*, P3*a*, P4*a*, P1*b*, P2*b*, P3*b*, P4*b*, id displayed on the captured image SI are examples of the first indicator, the control unit 220 is an example of the control unit and the calculation unit, and the coordinate measuring device 300 is an example of the coordinate measuring device.

Moreover, the setting information is an example of the setting information, the setting mode is an example of the setting mode, the measurement mode is an example of the measurement mode, the storage unit 210 is an example of the storage unit, the interface part 114 is an example of the interface part, the captured image data is an example of the captured image data, and the character string and the indicators 629*a*, 629*b* displayed in the progress level display field 629 are examples of the second indicator.

Further, the single item measurement mode is an example of the single item measurement mode, the statistical analysis mode is an example of the statistical analysis mode, the coordinates showing the positions of one plane, one straight line, and one point are examples of the previously set specific physical quantities, the apex T of the measurement target S is an example of the arbitrary portion of the measurement target, the reference coordinate system is an example of the reference coordinate system, the imaging region V is an example of the acquirement possible region, the imaging-region virtual image VI is an example of the virtual image, and the image is displayed on the captured image SI is an example of the third indicator.

Furthermore, the operation unit 230 is an example of the operation unit, the plurality of light emitting units 143 are examples of the plurality of markers, and the main imaging unit 130 is an example of the second imaging unit.

As each constitutional element of the claims, there can also be used other various constitutional elements having configurations or functions recited in the claims.

The present invention can be effectively used for measuring sizes and the like of various measurement targets.

What is claimed is:

1. A coordinate measuring device comprising:
 a probe having a contact part configured to contact with a measurement target in order to measure a physical quantity of the measurement target contacted by the contact part;
 a first imaging unit configured to capture an image of at least part of the measurement target;
 a position and attitude acquiring unit configured to acquire a position and an attitude of the probe and a position and an attitude of the first imaging unit;
 a display unit configured to display, as a captured image, the image of at least part of the measurement target obtained by the first imaging unit; and
 a control unit configured to control the display unit to display, on the captured image, a first indicator showing a measurement position to be contacted by the contact part on the measurement target, based on the position and the attitude of the probe and the position and the attitude of the first imaging unit obtained by the position and attitude acquiring unit.

2. The coordinate measuring device according to claim 1, wherein
 the control unit is configured to be operable in a setting mode and a measurement mode, the setting mode for generating setting information that includes a measurement condition and a measurement procedure for measuring a physical quantity of the measurement target, the measurement mode for measuring the physical quantity of the measurement target, and
 the first indicator is displayed on the captured image in the measurement mode based on the setting information generated by the setting mode.

3. The coordinate measuring device according to claim 2, further comprising
 a storage unit,
 wherein the control unit stores the setting information generated by the setting mode into the storage unit, and reads the setting information stored in the storage unit in the measurement mode, and
 the first indicator is displayed on the captured image based on the setting information read in the measurement mode.

4. The coordinate measuring device according to claim 3, further comprising
 an interface part in which the setting information is inputted into and outputted from the storage unit.

5. The coordinate measuring device according to claim 2, wherein
 the setting information includes captured image data generated by capturing an image of at least part of the measurement target which includes a measurement position by the first imaging unit in the setting mode, and
 the control unit has the captured image displayed on the display unit based on the captured image data in the measurement mode.

6. The coordinate measuring device according to claim 2, wherein in the measurement mode, the control unit controls the display unit to display a second indicator showing a progress level of measurement of the physical quantity of the measurement target based on the measurement procedure for the setting information.

7. The coordinate measuring device according to claim 2, wherein the control unit is configured to be operable in a single item measurement mode for measuring the physical quantity of the measurement target without using the setting information in a state where the first indicator is not displayed on the captured image.

8. The coordinate measuring device according to claim 2, wherein
 the storage unit stores a result of the measurement by the measurement mode, and
 the control unit is configured to be operable in a statistical analysis mode for performing a statistical analysis process based on the measurement result stored in the storage unit.

9. The coordinate measuring device according to claim 2, wherein
 the position and attitude acquiring unit calculates coordinates of a contact position between the measurement target and the contact part based on the acquired position and attitude of the probe, to measure the physical quantity of the measurement target based on a result of the calculation, and the control unit sets a reference coordinate system in which an arbitrary portion of the measurement target is taken as a reference by measurement of a previously set specific physical quantity of the measurement target, and controls the position and attitude acquiring unit to measure the physical quantity of the measurement target in the set reference coordinate system.

10. The coordinate measuring device according to claim 9, wherein
the setting information includes a measurement condition and a measurement procedure for measuring the specific physical quantity, and
the first indicator is displayed on the captured image such that the specific physical quantity is measured in the measurement mode.

11. The coordinate measuring device according to claim 1, wherein
the coordinate measuring device includes an acquirement possible region in which the position and the attitude of the probe and the position and the attitude of the first imaging unit can be acquired by the position and attitude acquiring unit, and
the control unit controls the display unit to display a virtual image virtually representing the acquirement possible region viewed from an arbitrary position, and display on the virtual image at least one of the first indicator and a third indicator showing a position of the contact part.

12. The coordinate measuring device according to claim 11, further comprising
an operation unit configured to be operated for changing a viewpoint position for viewing the acquirement possible region,
wherein, when an operation for changing the viewpoint position is performed by the operation unit in a state where the captured image is displayed on the screen of the display unit, the control unit controls the display unit to display a virtual image at the time of viewing the acquirement possible region from an imaging position of the first imaging unit for obtaining the captured image in place of the captured image, and thereafter successively changes the virtual image such that a position for viewing the acquirement possible region moves from the imaging position to the changed viewpoint position.

13. The coordinate measuring device according to claim 1, wherein
the probe has a plurality of markers,
the first imaging unit is provided in the probe to have constant positional relationships with respect to the plurality of markers,
the position and attitude acquiring unit includes a second imaging unit that is fixed to a previously set imaging position and captures images of the plurality of markers of the probe, and a calculation unit that respectively calculates positions of the plurality of markers based on image data showing the images of the plurality of markers obtained by the second imaging unit, and
the control unit controls the display unit to display the first indicator on the captured image based on the positions of the plurality of markers calculated by the calculation unit and the positional relationships of the first imaging unit with respect to the plurality of markers.

* * * * *